(12) United States Patent
Tanaka et al.

(10) Patent No.: US 8,839,130 B2
(45) Date of Patent: Sep. 16, 2014

(54) ELECTRONIC APPARATUS, PROGRAM, AND CONTROL METHOD

(75) Inventors: Tomohisa Tanaka, Tokyo (JP);
Tsuyoshi Ishikawa, Kanagawa (JP);
Qihong Wang, Tokyo (JP); Akihiro Komori, Tokyo (JP)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 13/469,703

(22) Filed: May 11, 2012

(65) Prior Publication Data
US 2012/0297329 A1 Nov. 22, 2012

(30) Foreign Application Priority Data
May 20, 2011 (JP) .................................. 2011-114174

(51) Int. Cl.
*G06F 3/048* (2013.01)
*G06F 3/041* (2006.01)

(52) U.S. Cl.
CPC ................ *G06F 3/041* (2013.01); *G06F 3/048* (2013.01)
USPC ........... 715/769; 715/764; 715/767; 715/770; 715/772

(58) Field of Classification Search
CPC .................................................. G06F 3/0486
USPC ............ 715/769–72, 861–64, 764, 767, 770, 715/772
See application file for complete search history.

(56) References Cited

U.S. PATENT DOCUMENTS

| | | | | |
|---|---|---|---|---|
| 5,608,860 | A * | 3/1997 | Fitzpatrick et al. | 715/826 |
| 2008/0036743 | A1* | 2/2008 | Westerman et al. | 345/173 |
| 2008/0235609 | A1* | 9/2008 | Carraher et al. | 715/769 |
| 2010/0122194 | A1* | 5/2010 | Rogers | 715/769 |
| 2010/0214571 | A1* | 8/2010 | Luo | 358/1.1 |
| 2011/0074830 | A1* | 3/2011 | Rapp et al. | 345/677 |

FOREIGN PATENT DOCUMENTS

JP 2011-70525 4/2011

OTHER PUBLICATIONS

Angelina Marie, MacBook Trackpad One Finger Drag Lock, Nov. 13, 2010.*

* cited by examiner

*Primary Examiner* — Tadeese Hailu
(74) *Attorney, Agent, or Firm* — Sherr & Jiang, PLLC

(57) ABSTRACT

An electronic apparatus includes a display unit, a sensor, and a controller. The display unit includes a screen. The sensor is configured to detect a user operation with respect to the screen and output a signal corresponding to the user operation. The controller is configured to cause a data icon to be displayed on the screen, judge a drag operation with respect to the data icon based on the signal from the sensor, judge, based on the signal from the sensor, a user operation different from the drag operation for one of copying and moving data related to the data icon based on the drag operation, and execute processing for one of copying and moving the data according to the user operation.

19 Claims, 48 Drawing Sheets

| Access authority | Permitted/Unpermitted |
|---|---|
| Edit (change) | Permitted |
| Copy | Permitted |
| Print | Permitted |

ELECTRONIC APPARATUS, PROGRAM, AND CONTROL METHOD

BACKGROUND

The present disclosure relates to a technique used in, for example, an electronic apparatus that detects a user operation with respect to a screen and executes processing corresponding to the user operation.

In recent years, an electronic apparatus that detects a user operation with respect to a screen and executes processing corresponding to the user operation is widely known (see, for example, Japanese Patent Application Laid-open No. 2011-70525).

In such an electronic apparatus, a user touches (taps), drag-and-drops, or flicks a position on the screen at which a GUI (Graphical User Interface) such as an icon is displayed so as to make an input to the electronic apparatus. The method of making an input to a screen is widely adopted in various electronic apparatuses since the method enables intuitive operations to be made.

For example, a case where the user drag-and-drops an icon will be discussed. In this case, the user touches a position on the screen at which the icon is displayed with a finger (or stylus pen etc.) and slides the finger while touching the screen (drag). Then, after positioning the finger on, for example, an arbitrary folder or an arbitrary position on a desktop, the user releases the finger from the screen (drop). As a result, data indicated by the icon is copied or moved to the arbitrary folder or desktop.

SUMMARY

By the method of making an input to a screen, however, there may be a case where, even when the user is not intending to drag-and-drop an icon while dragging it, his/her finger is released from the screen or recognized as having been released though still touching the screen in actuality. In this case, for example, a problem that data indicated by the icon is copied or moved to an unintended folder is caused.

In view of the circumstances as described above, there is a need for a technique with which a user can accurately copy or move data related to an icon to an intended location.

According to an embodiment of the present disclosure, there is provided an electronic apparatus including a display unit, a sensor, and a controller.

The display unit includes a screen.

The sensor is configured to detect a user operation with respect to the screen and output a signal corresponding to the user operation.

The controller is configured to cause a data icon to be displayed on the screen, judge a drag operation with respect to the data icon based on the signal from the sensor, judge, based on the signal from the sensor, a user operation different from the drag operation for one of copying and moving data related to the data icon based on the drag operation, and execute processing for one of copying and moving the data according to the user operation.

In such an electronic apparatus, by the user making a user operation different from the drag operation to the screen, the processing of copying or moving the data related to the data icon as a drag target is executed. In other words, before the user makes a user operation different from the drag operation, the processing of copying or moving the data based on the drag operation is not executed. As a result, a stable operation becomes possible, and the user can accurately copy or move the data related to the data icon to an intended location.

In the electronic apparatus, the controller may cause, while causing the data icon to be displayed at an original drag position, a copy of the data icon to be displayed at a drag position according to the drag operation with respect to the data icon, judge a user operation with respect to a position between the data icon and the copy of the data icon, and execute the processing of copying the data when the user operation is made.

In such an electronic apparatus, by the user making a user operation with respect to a position between the data icon at the original drag position and the copy of the data icon at the drag position on the screen, the data related to the data icon as the drag target is copied. As a result, the user can copy the data to an intended location by an intuitive operation.

In the electronic apparatus, the controller may cause a closed curve surrounding the data icon and the copy of the data icon to be displayed according to the drag operation with respect to the data icon, judge whether the drag position is within an area on the screen where the data can be copied, and change a display state of the closed curve when the drag position is within the area.

In such an electronic apparatus, by visually checking a change of the display state of the closed curve, the user can intuitively recognize whether the current drag position is within the area where the data related to the data icon as the drag target can be copied.

In the electronic apparatus, the controller may judge the user operation with respect to the position between the data icon and the copy of the data icon in the closed curve in a state where the display state of the closed curve is changed, and execute processing of copying the data to a location on a computer corresponding to the area when the user operation is made.

In the electronic apparatus, the controller may control display such that, when the user operation with respect to the position between the data icon and the copy of the data icon in the closed curve is made, the closed curve is separated into a first closed curve surrounding the data icon and a second closed curve surrounding the copy of the data icon.

With this structure, by visually checking the closed curve separated into two on the screen, the user can easily recognize that the processing of copying the data is being executed inside the electronic apparatus.

In the electronic apparatus, the controller may control display such that the first closed curve and the second closed curve contract according to a progress state of the data copy.

With this structure, the user can intuitively recognize the progress state of the data copy.

In the electronic apparatus, the controller may change, when the drag position is within the area, the display state of the closed curve such that a crack is displayed in the closed curve at the position between the data icon and the copy of the data icon.

In the electronic apparatus, the controller may judge a flick operation with respect to the position between the data icon and the copy of the data icon and execute the processing of copying the data when the flick operation is made.

With this structure, the user can copy the data related to the data icon to an intended location by an intuitive operation.

In the electronic apparatus, the controller may cause, while causing the data icon to be displayed at an original drag position, a copy of the data icon to be displayed at a drag position according to the drag operation with respect to the data icon, judge a user operation with respect to the data icon displayed at the original drag position, and execute the processing of moving the data when the user operation is made.

In such an electronic apparatus, by the user making a user operation to the data icon at the original drag position on the screen, the processing of moving the data related to the data icon as the drag target is executed. As a result, the user can move the data to an intended location by an intuitive operation.

In the electronic apparatus, the controller may cause a closed curve surrounding the data icon and the copy of the data icon to be displayed according to the drag operation with respect to the data icon, judge whether the drag position is within an area on the screen where the data can be moved, and change a display state of the closed curve when the drag position is within the area.

In such an electronic apparatus, by visually checking the change of the display state of the closed curve, the user can intuitively recognize whether the current drag position is within the area where the data related to the data icon as the drag target can be moved.

In the electronic apparatus, the controller may judge the user operation with respect to the data icon in a state where the display state of the closed curve is changed, and execute processing of moving the data to a location on a computer corresponding to the area when the user operation is made.

In the electronic apparatus, the controller may control display on the screen such that, when the user operation with respect to the data icon is made, the closed curve contracts while the data icon is moved to a position of the copy of the data icon.

With this structure, by visually checking the state of the screen in which the closed curve contracts while the data icon is being moved to a position of the copy of the data icon, the user can easily recognize that the processing of moving the data is being executed inside the electronic apparatus.

In the electronic apparatus, the controller may control display such that the closed curve contracts while the data icon is moved according to a progress state of the data movement.

With this structure, the user can intuitively recognize the progress state of the data movement.

In the electronic apparatus, the controller may judge a flick operation with respect to the data icon displayed at the original drag position toward the copy of the data icon and execute the processing of moving the data when the flick operation is made.

With this structure, the user can move the data related to the data icon to an intended location by an intuitive operation.

In the electronic apparatus, the controller may cause an access authority editing icon for editing an access authority with respect to data to be one of copied and moved to be displayed according to the drag operation with respect to the data icon, judge a user operation with respect to the access authority editing icon based on the signal from the sensor, and change a state of the access authority with respect to the data to be one of copied and moved according to the user operation.

With this structure, by operating the access authority editing icon, the user can change the access authority state with respect to the data to be copied or moved.

In the electronic apparatus, the controller may judge whether a drag position of the drag operation with respect to the data icon is within an area on the screen where the data can be one of copied and moved and cause the access authority editing icon to be displayed on the screen when the drag position is within the area.

With this structure, the access authority editing icon can be displayed on the screen at an appropriate timing.

According to an embodiment of the present disclosure, there is provided a program that causes an electronic apparatus to execute the steps of:
    detecting a user operation with respect to a screen of a display unit;
    outputting a signal corresponding to the user operation;
    displaying a data icon on the screen;
    judging a drag operation with respect to the data icon based on the signal;
    judging, based on the signal, a user operation different from the drag operation for one of copying and moving data related to the data icon based on the drag operation; and
    executing processing for one of copying and moving the data according to the user operation.

According to an embodiment of the present disclosure, there is provided a control method including detecting a user operation with respect to a screen of a display unit.

A signal corresponding to the user operation is output.

A data icon is displayed on the screen.

A drag operation with respect to the data icon is judged based on the signal.

Based on the signal, a user operation different from the drag operation for one of copying and moving data related to the data icon based on the drag operation is judged.

Processing for one of copying and moving the data is executed according to the user operation.

As described above, according to the embodiments of the present disclosure, a technique with which data related to a data icon can be accurately copied or moved to a location intended by a user can be provided.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Figure 1:
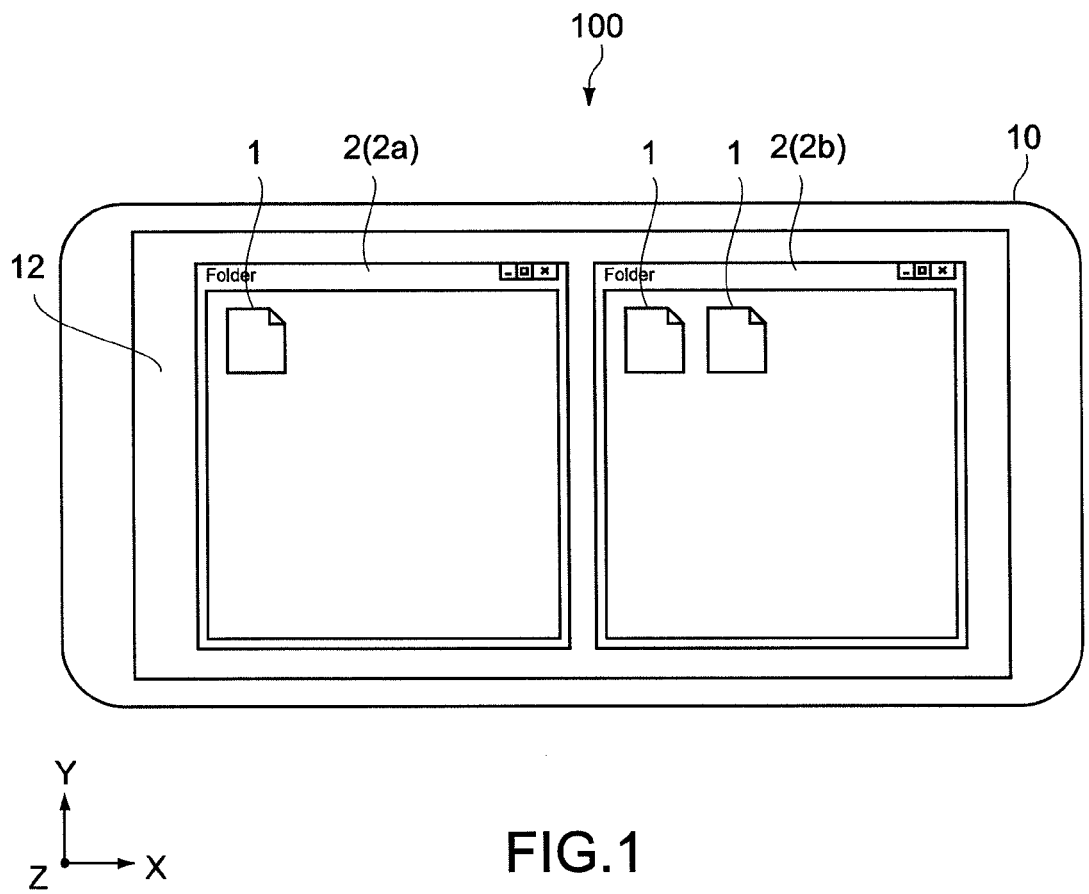
FIG. 1 is a plan view showing an electronic apparatus (tablet PC) according to an embodiment of the present disclosure.

FIG. 1 is a plan view showing an electronic apparatus 100 according to a first embodiment of the present disclosure. In the descriptions of this embodiment, a tablet PC (Personal Computer) 100 will be taken as an example of the electronic apparatus 100.

As shown in FIG. 1, the tablet PC 100 includes a plate-like casing 10 that is thin in a z-axis direction. In the casing 10, a display unit 12 including a screen is provided. In the display unit 12, a touch sensor 13 (see FIG. 2) that detects a contact state of a finger of a user, a stylus pen, and the like is provided.

The display unit 12 is constituted of, for example, a liquid crystal display or an EL (Electro-Luminescence) display. Examples of the touch sensor 13 include a resistive touch sensor and a capacitance touch sensor, though not limited thereto. It should be noted that in the first embodiment, a multi-touch input can be performed on the touch sensor 13.

FIG. 1 shows an example of a GUI (Graphical User Interface) displayed on the screen. In this example, folders 2a and 2b are displayed on the screen, and a file icon 1 is displayed in each of the folders 2a and 2b. As a file type of the file icon 1, there are a document file, an image file, a music file, a moving image file, a program file, and the like.

Figure 2:
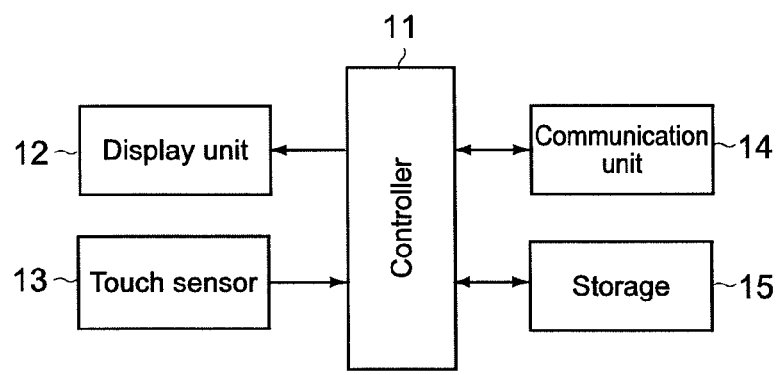
FIG. 2 is a block diagram showing an electrical structure of the tablet PC.

FIG. 2 is a block diagram showing an electrical structure of the tablet PC 100.

As shown in FIG. 2, the tablet PC 100 includes a controller 11, a communication unit 14, and a storage 15 in addition to the display unit 12 and the touch sensor 13.

The controller 11 is constituted of a CPU (Central Processing Unit) and the like. The controller 11 executes various operations based on various programs and collectively controls respective units of the tablet PC 100.

The storage 15 includes a nonvolatile memory (e.g., ROM (Read Only Memory)) that stores various programs requisite for processing of the controller 11 and a volatile memory (e.g., RAM (Random Access Memory)) that is used as a working area of the controller 11. The programs may be read out from a recording medium such as an optical disc and a semiconductor memory.

The communication unit 14 transmits and receives information to/from other apparatuses. The communication unit 14 may use wireless communication or wired communication.

[Explanation of Operation]

Next, processing of the tablet PC 100 according to the first embodiment will be described. FIGS. 3 to 6 and FIGS. 8 to 16 are each a flowchart showing the processing of the tablet PC 100 according to the first embodiment. FIG. 7 is a diagram showing an example of an access authority set to a file corresponding to the file icon 1.

FIGS. 17 to 31 are each a diagram showing a state of the screen at a time corresponding processing is executed by the tablet PC 100 according to a user operation with respect to the screen.

It should be noted that in the first embodiment, the processing will be described based on the assumption that the tablet PC 100 conforms to a multi-touch system.

Figure 3:
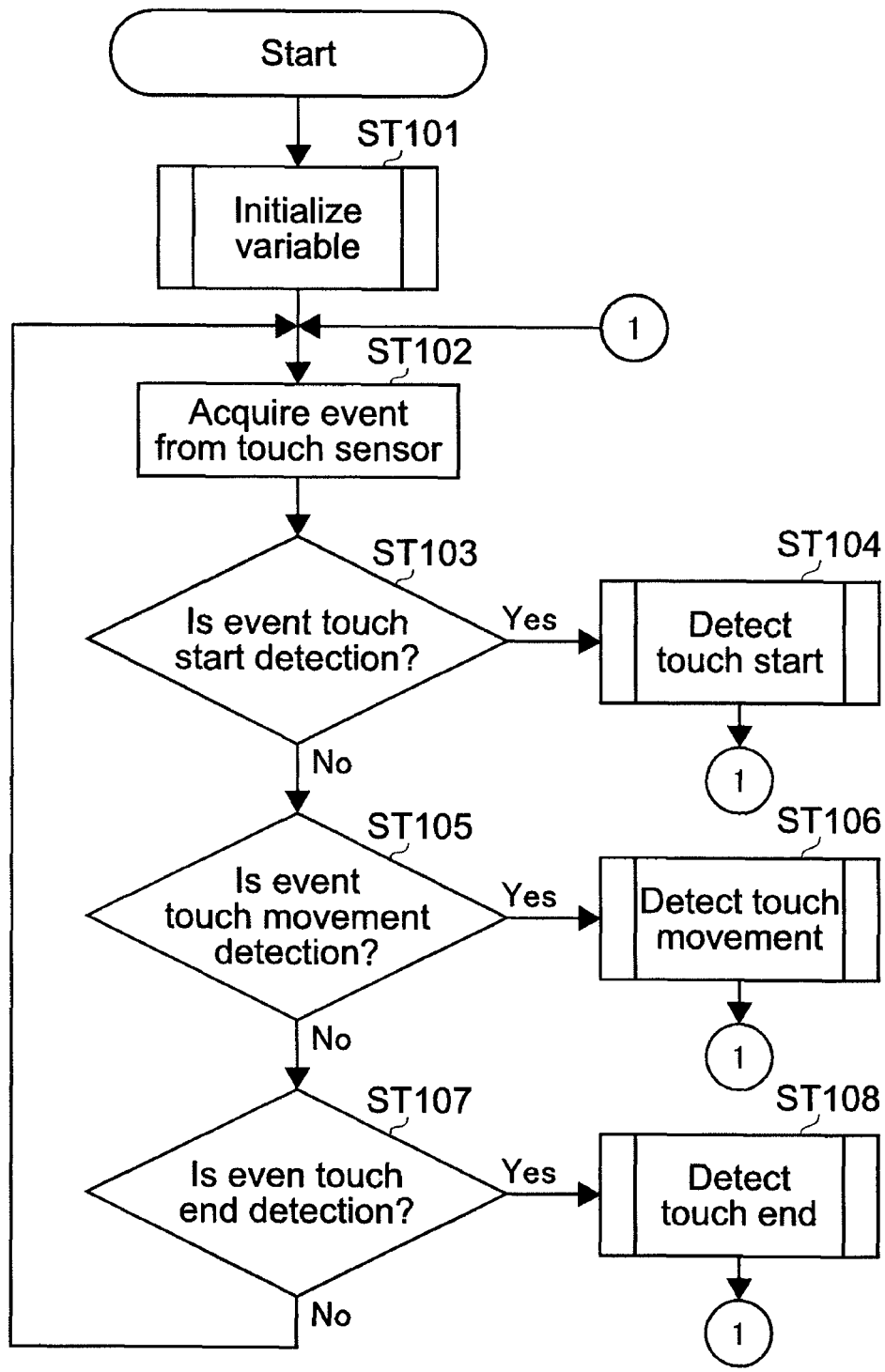
FIG. 3 is a flowchart showing processing of the tablet PC.
Figure 4:
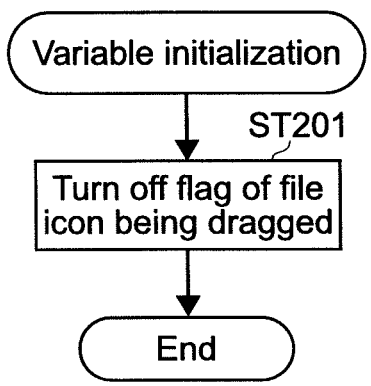
FIG. 4 is a flowchart showing processing of the tablet PC.

Referring to FIG. 3, the controller 11 of the tablet PC 100 first executes a variable initialization (Step 101). Referring to FIG. 4, the controller 11 turns off a flag of a file icon being dragged as the variable initialization (Step 201).

Referring to FIG. 3, the controller 11 next acquires an event from the touch sensor 13 (Step 102). Then, the controller 11 judges whether the even acquired from the touch sensor 13 is a touch start detection (Step 103). When the event is the touch start detection (YES in Step 103), the controller 11 executes processing corresponding to the touch start detection (Step 104). Upon executing the processing corresponding to the touch start detection, the controller 11 returns to Step 102 and acquires an event from the touch sensor 13 again.

On the other hand, when the event acquired from the touch sensor 13 is not the touch start detection (NO in Step 103), the controller 11 judges whether the event is a touch movement detection (Step 105). When the event is the touch movement detection (YES in Step 105), the controller 11 executes processing corresponding to the touch movement detection (Step 106). Upon executing the processing corresponding to the touch movement detection, the controller 11 returns to Step 102 and acquires an event from the touch sensor 13 again.

On the other hand, when the event acquired from the touch sensor 13 is not the touch movement detection (NO in Step 105), the controller 11 judges whether the event is a touch end detection (Step 107). When the event is the touch end detection (YES in Step 107), the controller 11 executes processing corresponding to the touch end detection (Step 108). Upon executing the processing corresponding to the touch end detection, the controller 11 returns to Step 102 and acquires an event from the touch sensor 13 again.

Figure 5:
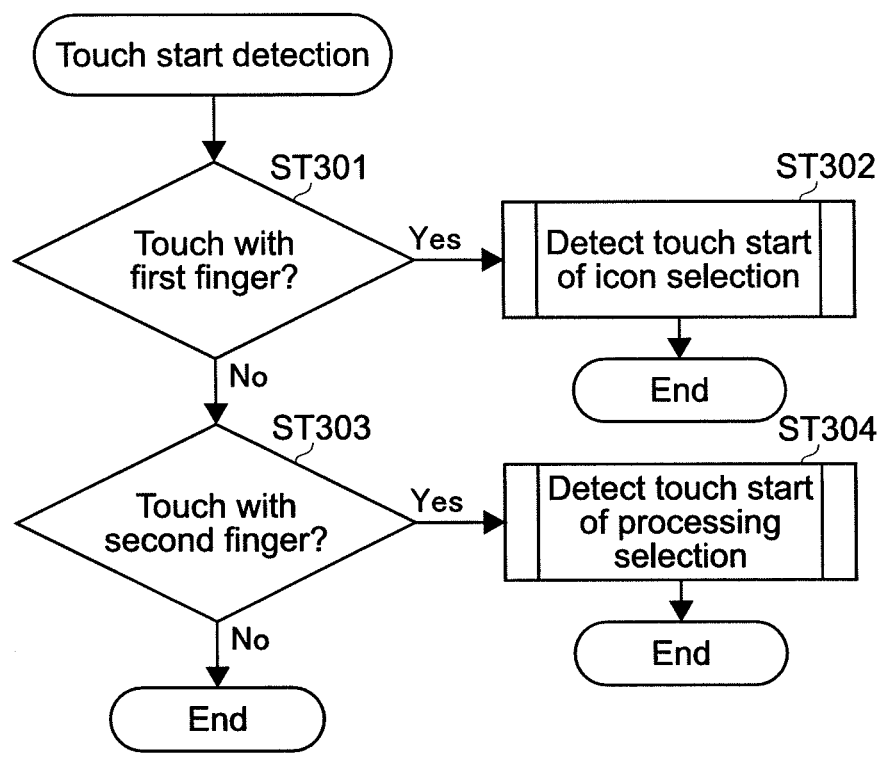
FIG. 5 is a flowchart showing processing of the tablet PC.

Referring to FIG. 5, the processing of Step 104 shown in FIG. 3 (processing carried out when touch start is detected) will be described. When the even acquired from the touch sensor 13 is the touch start detection (YES in Step 103), the controller 11 judges whether the touch start is a touch start of a first finger (or stylus pen etc.; same holds true in descriptions below) (Step 301). When judged as the touch start of a first finger (YES in Step 301), the controller 11 executes processing that is carried out when a touch start is detected at a time the file icon 1 is selected (Step 302).

On the other hand, when judged that the touch start is not the touch start of a first finger (NO in Step 301), the controller 11 judges whether the touch start is a touch start of a second finger (Step 303). When judged as the touch start of a second finger (YES in Step 303), the controller 11 executes processing that is carried out when a touch start is detected at a time the processing is selected (Step 304).

Figure 6:
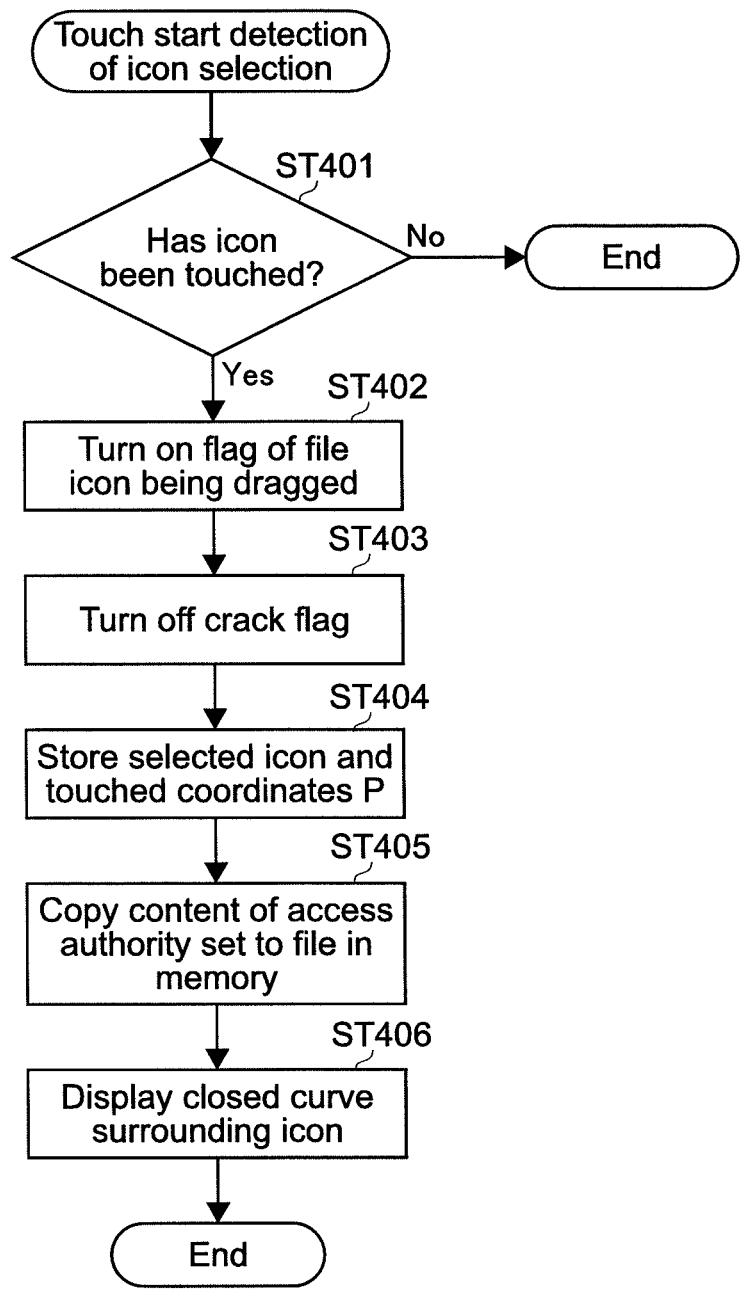
FIG. 6 is a flowchart showing processing of the tablet PC.
Figures 7, 8:
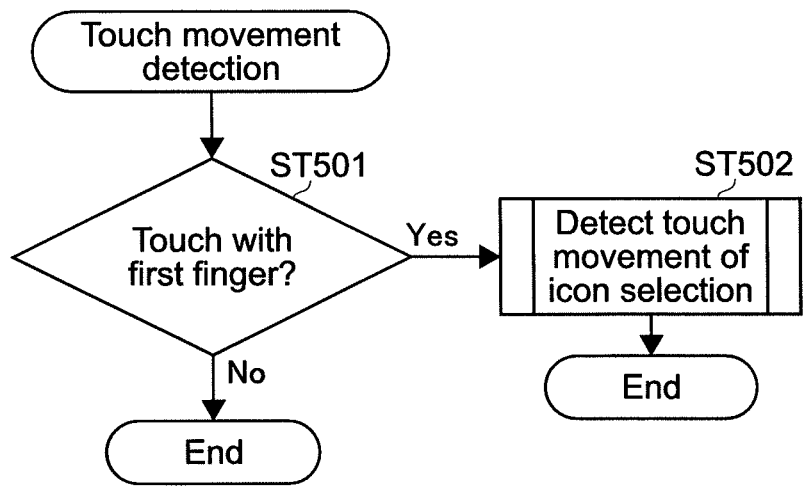
FIG. 7 is a diagram showing an example of an access authority set to a file corresponding to a file icon.
FIG. 8 is a flowchart showing processing of the tablet PC.

Referring to FIG. 6, the processing of Step 302 shown in FIG. 5 (processing carried out when touch start is detected at time file icon 1 is selected) will be described. When the touch start is the touch start of a first finger (YES in Step 301), the controller 11 judges whether a position at which the file icon 1 is displayed on the screen has been touched (Step 401). When judged that the position at which the file icon 1 is displayed has been touched (YES in Step 401), the controller 11 turns on the flag of the file icon being dragged (Step 402). Next, the controller 11 turns off a crack flag (Step 403).

Subsequently, the controller 11 stores the selected file icon 1 and coordinates P obtained at the touch start in the storage 15 (Step 404). Then, the controller 11 copies and stores a content of an access authority set to a file corresponding to the selected file icon 1 in the storage 15 (Step 405).

FIG. 7 shows an example of the access authority set to the file corresponding to the selected file icon 1. In the example shown in FIG. 7, as the access authority, file editing (change) is "permitted", a file copy is "permitted", and a file printing is "permitted.

Upon storing the content of the access authority in the storage 15, the controller 11 displays a closed curve 3 that surrounds the file icon 1 on the screen (Step 406).

Figure 17:
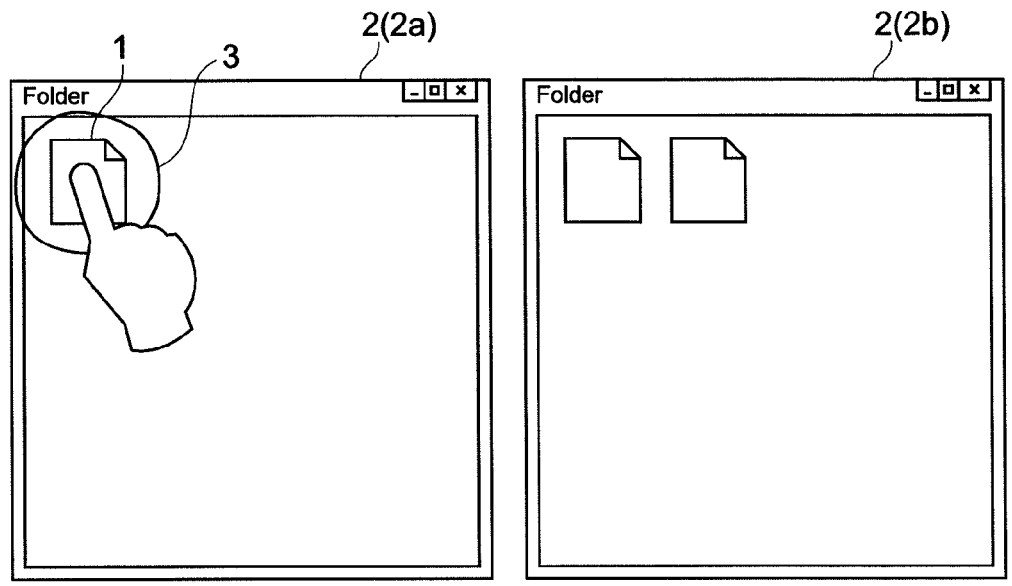
FIG. 17 is a diagram showing a state of a screen at a time a user touches a file icon displayed in a folder.

FIG. 17 shows a state of the screen at a time the user touches the file icon 1 displayed in the folder 2a. As shown in FIG. 17, when the user touches a position on the screen at which the file icon 1 in the folder 2a is displayed, the closed curve 3 surrounding the file icon 1 is displayed on the screen (Step 406).

Referring to FIG. 8, the processing of Step 106 shown in FIG. 3 (processing carried out when touch movement is detected) will be described. When the event acquired from the touch sensor 13 is the touch movement detection (YES in Step 105), the controller 11 judges whether the touch movement is a touch movement by a first finger (Step 501). When the touch movement is the touch movement by a first finger (YES in Step 501), the controller 11 executes processing that is carried out when a touch movement is detected at a time the file icon 1 is selected (Step 502).

Figure 9:
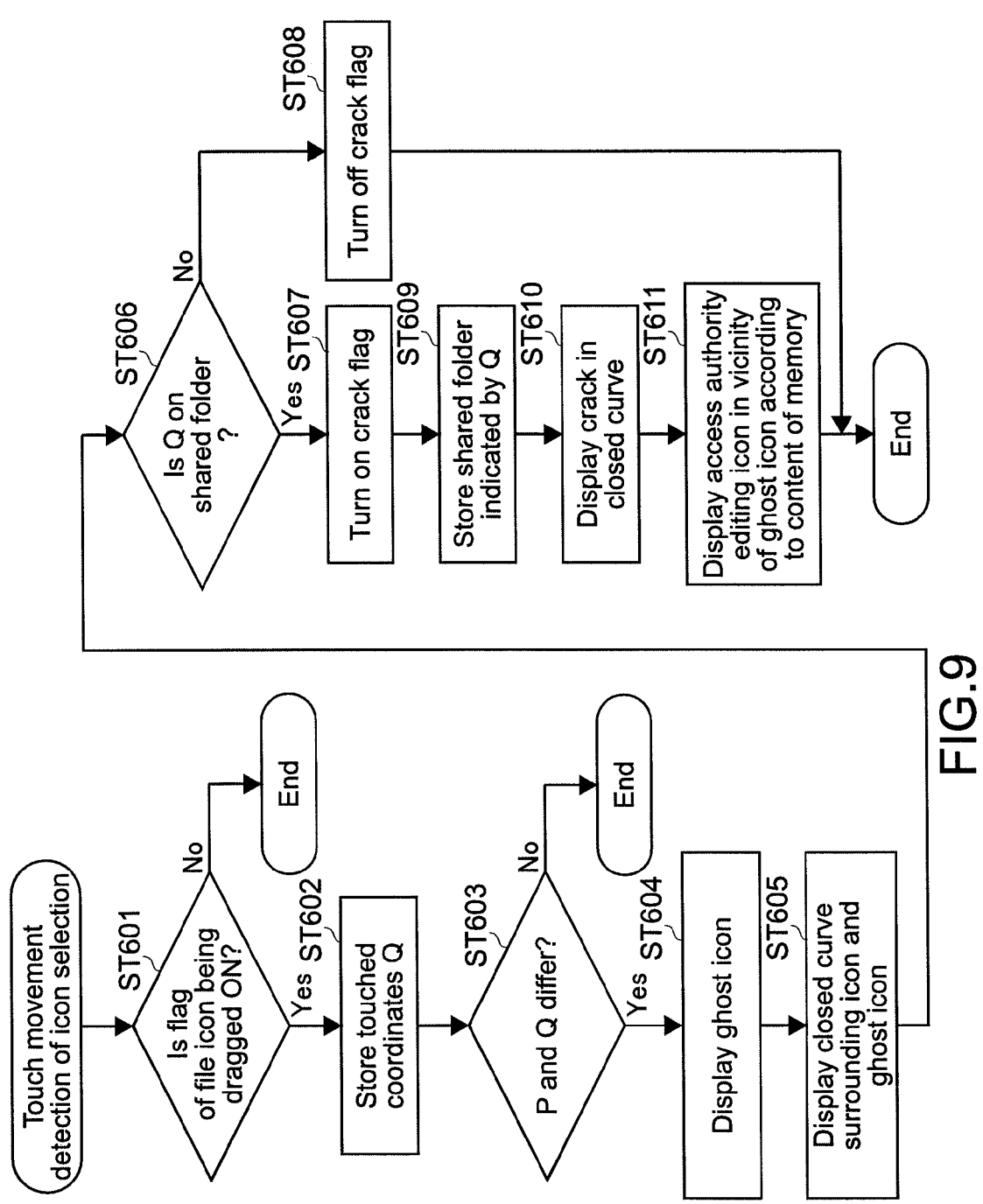
FIG. 9 is a flowchart showing processing of the tablet PC.

Referring to FIG. 9, the processing of Step 502 shown in FIG. 8 (processing carried out when touch movement is detected at time file icon 1 is selected) will be described. When judged that the touch movement is the touch movement by a first finger (YES in Step 501), the controller 11 judges whether the flag of the file icon being dragged is ON (Step 601).

When the flag of the file icon being dragged is ON (YES in Step 601), the controller 11 stores the touched coordinates Q in the storage 15 (Step 602). Next, the controller 11 judges whether the coordinates P obtained when the touch with respect to the file icon 1 has been started (see Step 404 shown in FIG. 6) differ from the coordinates Q that are currently being touched by the user (Step 603).

When the coordinates P and Q differ (when file icon 1 is dragged) (YES in Step 603), the controller 11 displays a ghost icon 4 on the screen (Step 604). Simultaneous with the display of the ghost icon 4, the controller 11 displays the file icon 1 at the original drag position and a closed curve 3 surrounding the ghost icon 4 on the screen (Step 605).

Figure 18:
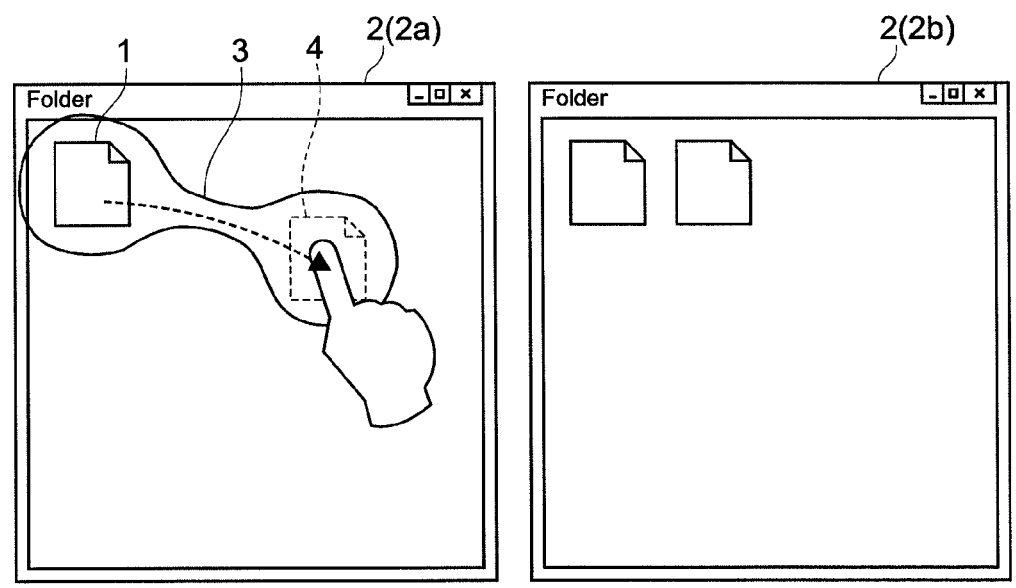
FIG. 18 is a diagram showing a state of the screen at the time the user touches the file icon in the folder with a finger and slides the finger without releasing it from the screen (drag operation)

FIG. 18 shows a state of the screen at a time the user touches the file icon 1 in the folder 2a with a finger and slides the finger without releasing it from the screen (drag operation).

As shown in FIG. 18, when the user drags the file icon 1, the file icon 1, the ghost icon 4, and the closed curve 3 surrounding the file icon 1 and the ghost icon 4 are displayed on the screen (Steps 604 and 605).

In this case, the controller 11 displays the ghost icon 4 at a drag position while displaying the file icon 1 at the original drag position. The controller 11 displays, as the ghost icon 4, an image that has the same shape as the file icon 1 and has, for example, a 50% transparency, on the screen. The ghost icon 4 is displayed at a position obtained by adding (Q-P) to the coordinate position of the file icon 1 at the original drag position.

In the example shown in FIG. 18, the closed curve 3 is round as a whole, and a width thereof between the file icon 1 and the ghost icon 4 is small. The closed curve 3 has such a shape that a starch syrup is stretched more as the drag position (display position of ghost icon 4) moves farther away from the file icon 1 at the original drag position.

Referring back to FIG. 9, upon displaying the ghost icon 4 and the closed curve 3 on the screen, the controller 11 judges whether the coordinates Q currently touched by the user are on a shared folder (Step 606). In Step 606, the controller 11 judges whether the coordinates Q (drag position) are within an area on the screen where a file can be copied or moved. The controller 11 also judges whether the coordinates Q are within an area on the screen where a file is to be opened.

When the coordinates Q currently touched by the user are on a shared folder (YES in Step 606), the controller 11 turns on the crack flag (Step 607). On the other hand, when the coordinates Q currently touched by the user is not on a shared folder (NO in Step 606), the controller 11 turns off the crack flag (Step 608).

Upon turning on the crack flag, the controller 11 stores the shared folder indicated by the coordinates Q in the storage 15 (Step 609). Then, the controller 11 displays a crack 5 in the closed curve 3 (Step 610). In other words, the controller 11 changes a display state of the closed curve 3 when the coordinates Q (drag position) are within the area on the screen where a file can be copied or moved.

Simultaneous with the display of the crack 5 in the closed curve 3, the controller 11 also displays an access authority editing icon 6 in the vicinity of the ghost icon 4 (Step 611). In other words, when the coordinates Q (drag position) are within the area on the screen where a file can be copied or moved (and within area on screen where file can be opened), the controller 11 displays the access authority editing icon 6 in the vicinity of the ghost icon 4. The access authority editing icon 6 is an icon used for the user to edit an access authority set to a file to be copied or moved.

The content of the access authority is stored in the storage 15 at a time a touch of the file icon 1 is started (see Step 405 of FIG. 6, and FIG. 7). Therefore, the controller 11 only needs to display the access authority editing icon 6 based on the content of the access authority stored in the storage 15.

Figure 19:
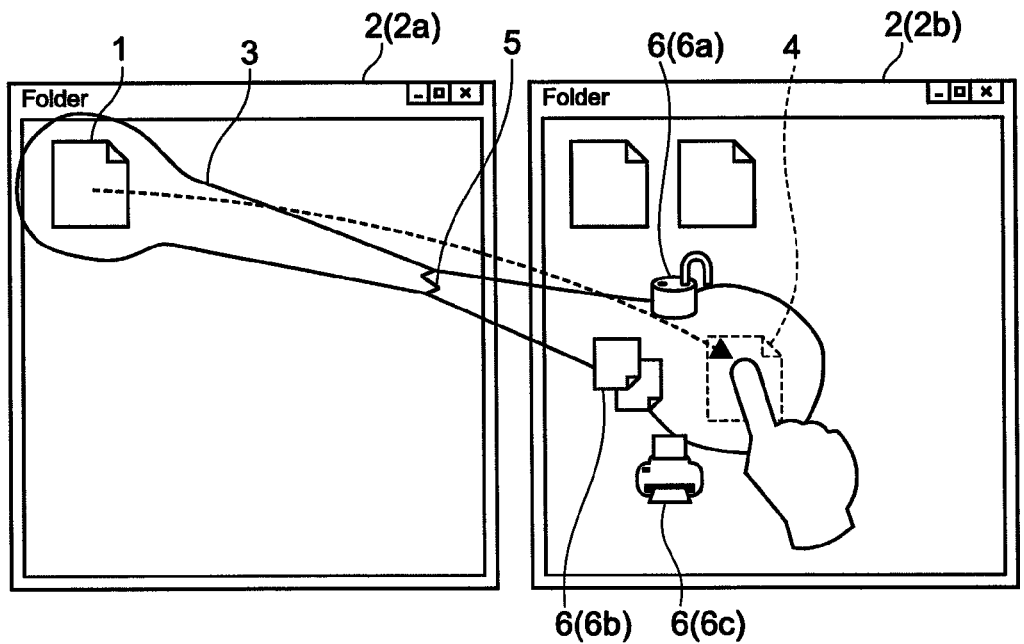
FIG. 19 is a diagram showing a state of the screen at a time the user drags the file icon in the folder and moves the finger to another folder (shared folder)

FIG. 19 shows a state of the screen at a time the user drags the file icon 1 in the folder 2a and positions the finger on the folder 2b (shared folder).

As shown in FIG. 19, when the user drags the file icon 1 in the folder 2a and positions the finger on the folder 2b (shared folder), the crack 5 is displayed in the closed curve 3 (Step 610). The crack 5 is displayed at an intermediate position between the file icon 1 and the ghost icon 4 in a portion where the width of the closed curve 3 becomes small and is displayed in a direction orthogonal to a straight line connecting the file icon 1 and the ghost icon 4.

By displaying the crack 5 in the closed curve 3, the user can easily recognize that the current drag position is within the area on the screen where a file can be copied or moved.

Moreover, as shown in FIG. 19, when the user drags the file icon 1 in the folder 2a and positions the finger on the folder 2b (shared folder), the access authority editing icon 6 is displayed in the vicinity of the ghost icon 4 (Step 611). In the example shown in FIG. 19, an edit authority editing icon 6a, a copy authority editing icon 6b, and a print authority editing icon 6c are displayed as the access authority editing icon 6 in the stated order from the upper side.

The edit authority editing icon 6a is an image of a lock, the copy authority editing icon 6b is an image of two overlapping papers, and the print authority editing icon 6c is an image of a printer. What kind of image is to be allocated to which access authority editing icon 6 is not particularly limited and can be changed as appropriate. Typically, any image can be used as long as the user can conjure up the access authority.

In this embodiment, the access authority editing icon 6 is displayed when the drag position is within the area on the screen where a file can be copied or moved (and within area on screen where file can be opened). Therefore, the access authority editing icon 6 can be displayed on the screen at an appropriate timing.

Figure 10:
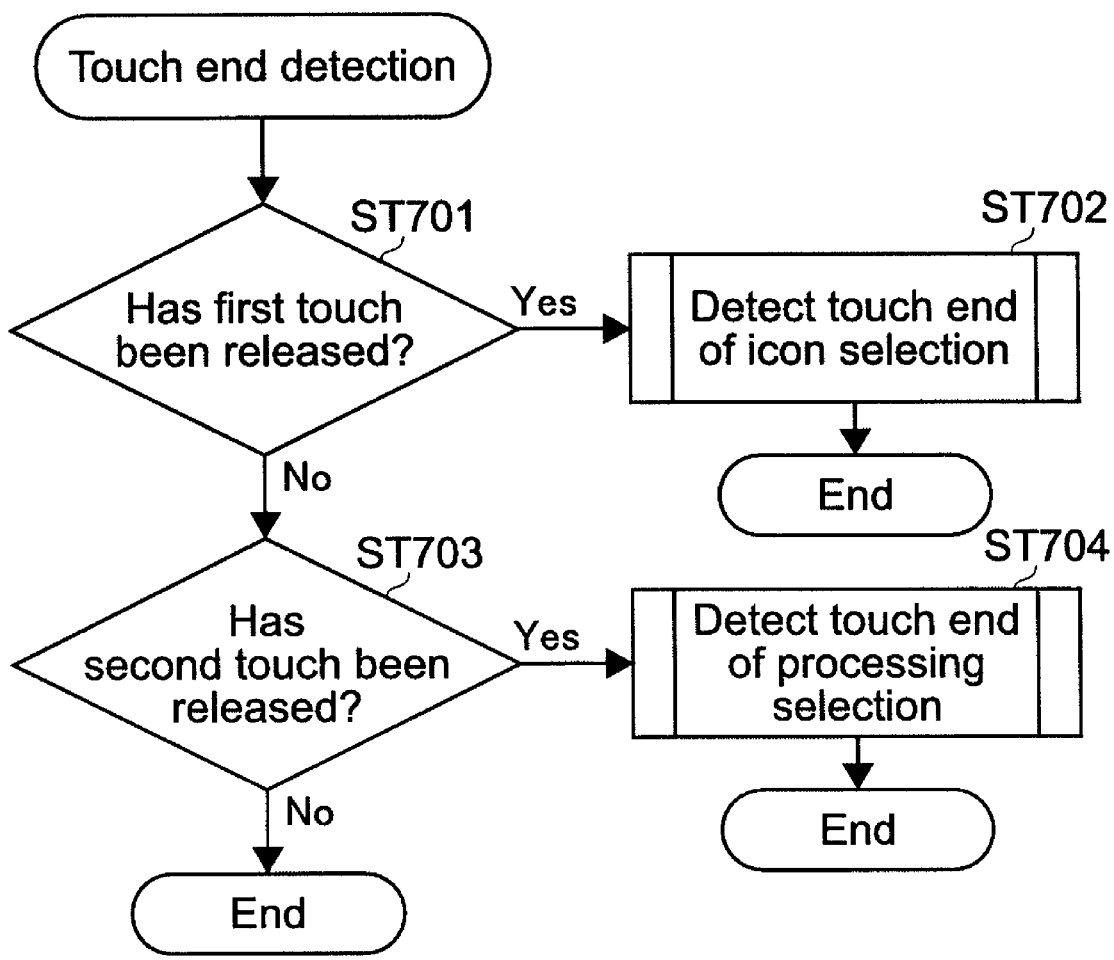
FIG. 10 is a flowchart showing processing of the tablet PC.

Referring to FIG. 10, the processing of Step 108 shown in FIG. 3 (processing carried out when touch end is detected) will be described. When the event acquired from the touch sensor 13 is the touch end detection (YES in Step 107), the controller 11 judges whether the touch end has been detected by a release of the touch by a first finger (Step 701). When judged that the touch end has been detected by a release of the touch by a first finger (YES in Step 107), the controller 11 executes processing that is carried out when a touch end is detected at the time the file icon 1 is selected (Step 702).

On the other hand, when judged that the touch end has not been detected by a release of the touch by a first finger (NO in Step 701), the controller 11 judges whether the touch end has been detected by a release of the touch by a second finger (Step 703). When judged that the touch end has been detected by a release of the touch by a second finger (YES in Step 703), the controller 11 executes processing that is carried out when a touch end is detected at the time processing is selected (Step 704).

Figure 11:
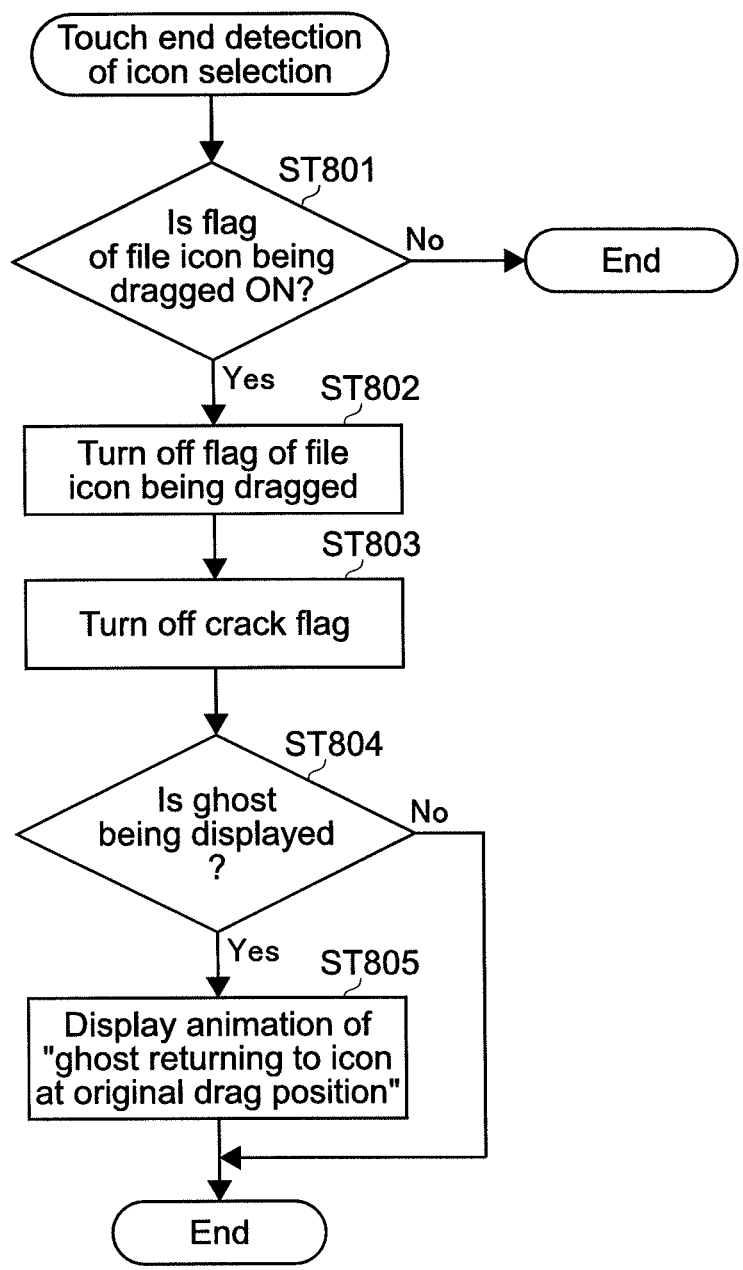
FIG. 11 is a flowchart showing processing of the tablet PC.

Referring to FIG. 11, the processing of Step 702 shown in FIG. 10 (processing carried out when touch end is detected at time file icon 1 is selected) will be described. When judged that the touch end has been detected by a release of the touch by a first finger (YES in Step 701), the controller 11 judges whether the flag of the file icon being dragged is ON (Step 801). When the flag of the file icon being dragged is ON (YES in Step 801), the controller 11 turns off the flag of the file icon being dragged (Step 802). Then, the controller 11 turns off the crack flag (Step 803).

Next, the controller 11 judges whether the ghost icon 4 is displayed on the screen (Step 804). When the ghost icon 4 is displayed (YES in Step 804), the controller 11 controls display on the screen such that the closed curve 3 contracts while moving the ghost icon 4 to the position of the file icon 1 at the original drag position (Step 805).

In this case, when the access authority editing icon 6 is displayed on the screen, the controller 11 controls display such that the access authority editing icon 6 fades out. By the processing as described above, when the user releases the dragging finger from the screen and cancels the drag operation (drop), the drag is canceled.

Figure 20:
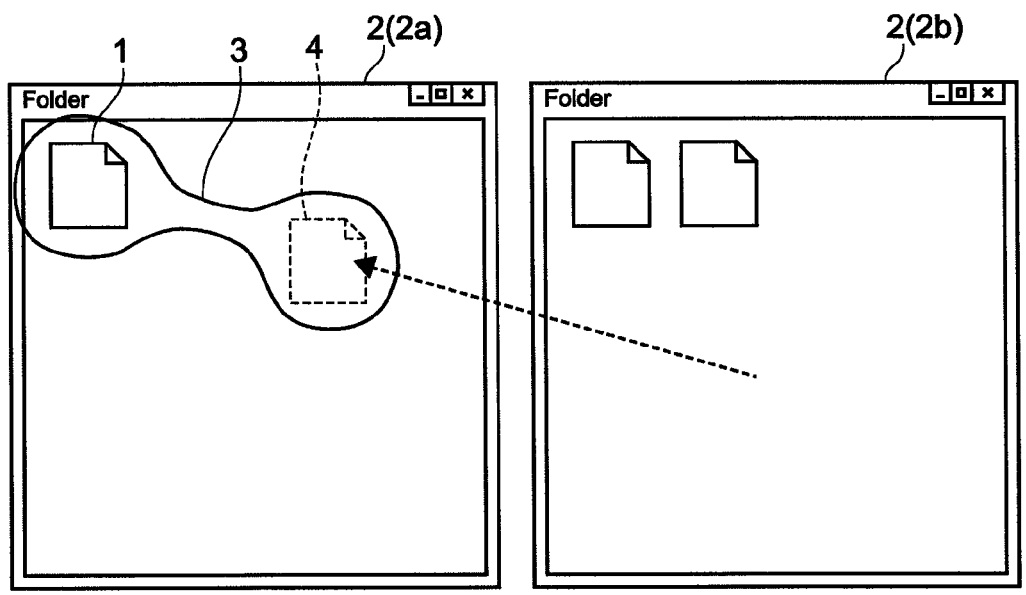
FIG. 20 is a diagram showing a state of the screen in a case where the user releases the finger from the screen (releases drag operation)

FIG. 20 shows a state of the screen at a time the user releases his/her finger from the screen (drag operation is canceled) in the state shown in FIG. 19. As shown in FIG. 20, when the user releases his/her finger from the screen, the closed curve 3 contracts while the ghost icon 4 moves to the position of the file icon 1 at the original drag position (Step 805).

In this case, the access authority editing icon 6 fades out and disappears from the screen. As the ghost icon 4 moves to the position of the file icon 1, the ghost icon 4 overlaps the file icon 1 and disappears, and the closed curve 3 also disappears from the screen. As a result, the drag operation of the file icon 1 by the user is canceled. It should be noted that when the user releases his/her finger dragging the file icon 1 from the screen, the drag operation is canceled irrespective of the position on the screen at which the finger is released (drop position).

By visually checking the state of the screen where the closed curve 3 contracts while the ghost icon 4 is moving to the position of the file icon 1, the user can intuitively recognize that the drag operation has been canceled.

Here, in a general technique, for example, when the user drags the file icon 1 in the folder 2a, positions it on the folder 2b, and releases the dragging finger from the screen (drop), a file is copied or moved at that time point. On the other hand, in this embodiment, even when the user drags the file icon 1 and releases the dragging finger from the screen, a file is not copied nor moved at that time point. In this case, in this embodiment, the drag operation is canceled as described above.

Figure 12:
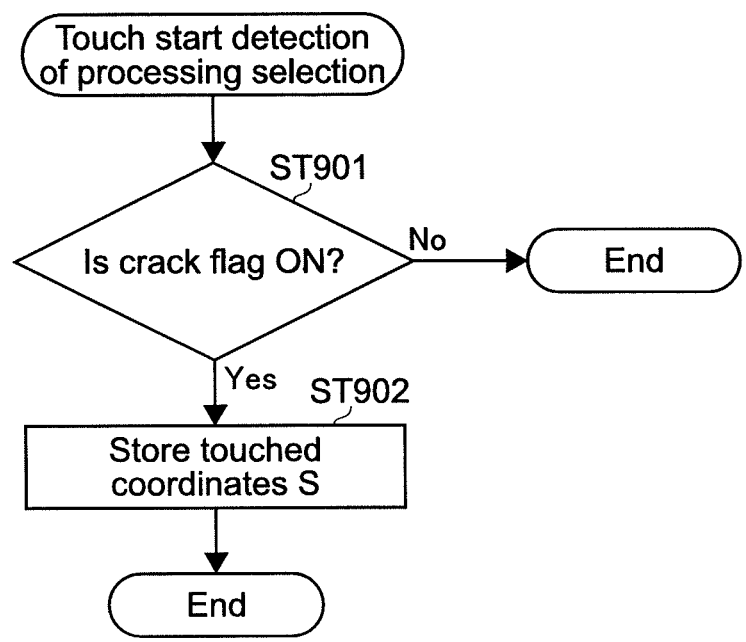
FIG. 12 is a flowchart showing processing of the tablet PC.

Referring to FIG. 12, the processing of Step 304 shown in FIG. 5 (processing carried out when touch start is detected at time processing is selected) will be described. When the touch start is a touch start by a second finger (YES in Step 303), the controller 11 judges whether the crack flag is ON (Step 901). When the crack flag is ON (YES in Step 901), the controller 11 stores coordinates S at which the touch start by a second finger has been detected (Step 902).

Figure 13:
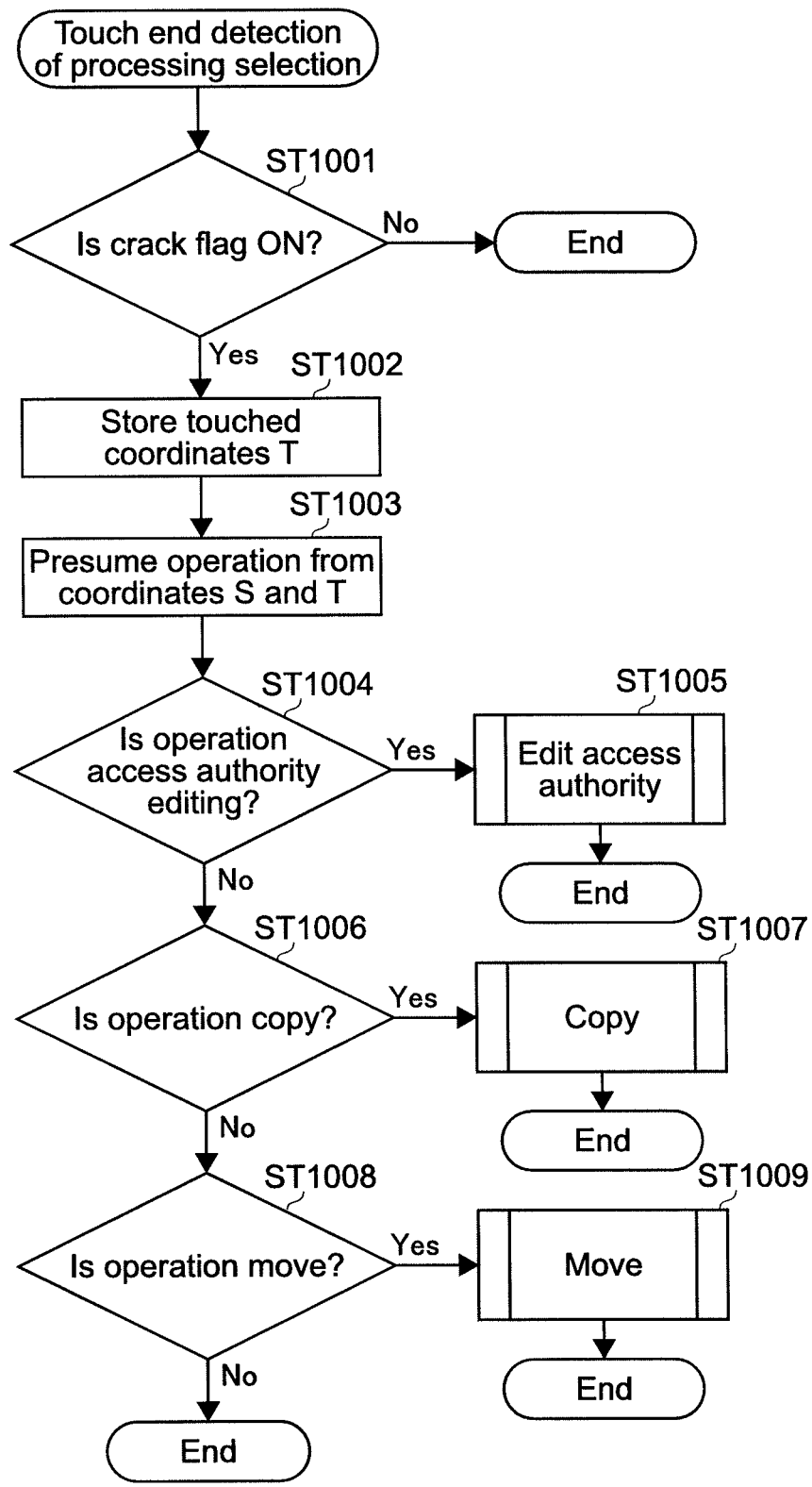
FIG. 13 is a flowchart showing processing of the tablet PC.

Referring to FIG. 13, the processing of Step 704 shown in FIG. 10 (processing carried out when touch end is detected at time processing is selected) will be described. When the touch end is a touch end by a second finger (YES in Step 703), the controller 11 judges whether the crack flag is ON (Step 1001). When the crack flag is ON (YES in Step 1001), the controller 11 stores coordinates T at which the touch end by a second finger has been detected in the storage 15 (Step 1002).

Next, the controller 11 presumes what kind of a user operation has been made on the screen based on the coordinates S obtained when the touch start by a second finger has been detected and the coordinates T obtained when the touch end by a second finger has been detected (Step 1003).

Then, the controller 11 judges whether the presumed user operation is an operation for editing an access authority (Step 1004). When the coordinates S and T match and the coordinates S (coordinates T) match a position at which the access authority editing icon 6 is displayed, the controller 11 presumes that the user operation is the operation for editing an access authority. In other words, the controller 11 presumes that the user operation is the operation for editing an access authority when a tap operation (or touch operation) with respect to the access authority editing icon 6 by a second finger is detected.

When judged that the presumed user operation is the operation for editing an access authority (YES in Step 1004), the controller 11 executes processing related to editing of an access authority with respect to a file to be copied or moved (Step 1005).

When judged that the presumed user operation is not the operation for editing an access authority (NO in Step 1004), the controller 11 judges whether the presumed user operation is an operation for copying a file (Step 1006). The controller 11 presumes that the user operation is the operation for copying a file when a line segment ST passes near the center of the closed curve 3 and is practically orthogonal to a line connecting the file icon 1 at the original drag position and the ghost icon 4.

Specifically, the controller 11 presumes that the user operation is the operation for copying a file when a flick operation by a second finger with respect to the crack 5 is detected in a state where the display state of the closed curve 3 is changed. When judged that the presumed user operation is the operation for copying a file (YES in Step 1006), the controller 11 executes processing related to a file copy (Step 1007).

When the presumed user operation is not the operation for copying a file (NO in Step 1006), the controller 11 judges whether the presumed user operation is an operation for moving a file (Step 1008). The controller 11 presumes that the user operation is the operation for moving a file when the coordinates S are on the file icon 1 at the original drag position, the line segment ST is practically parallel to the line connecting the file icon 1 and the ghost icon 4, and the coordinates T are closer to the center of the closed curve 3 than the coordinates S.

Specifically, the controller 11 presumes that the user operation is the operation for moving a file when a flick operation with respect to the file icon 1 at the original drag position toward the ghost icon 4 is detected in the state where the display state of the closed curve 3 is changed. When judged that the presumed user operation is the operation for moving a file (YES in Step 1008), the controller 11 executes processing related to a file movement (Step 1009).

Figure 14:
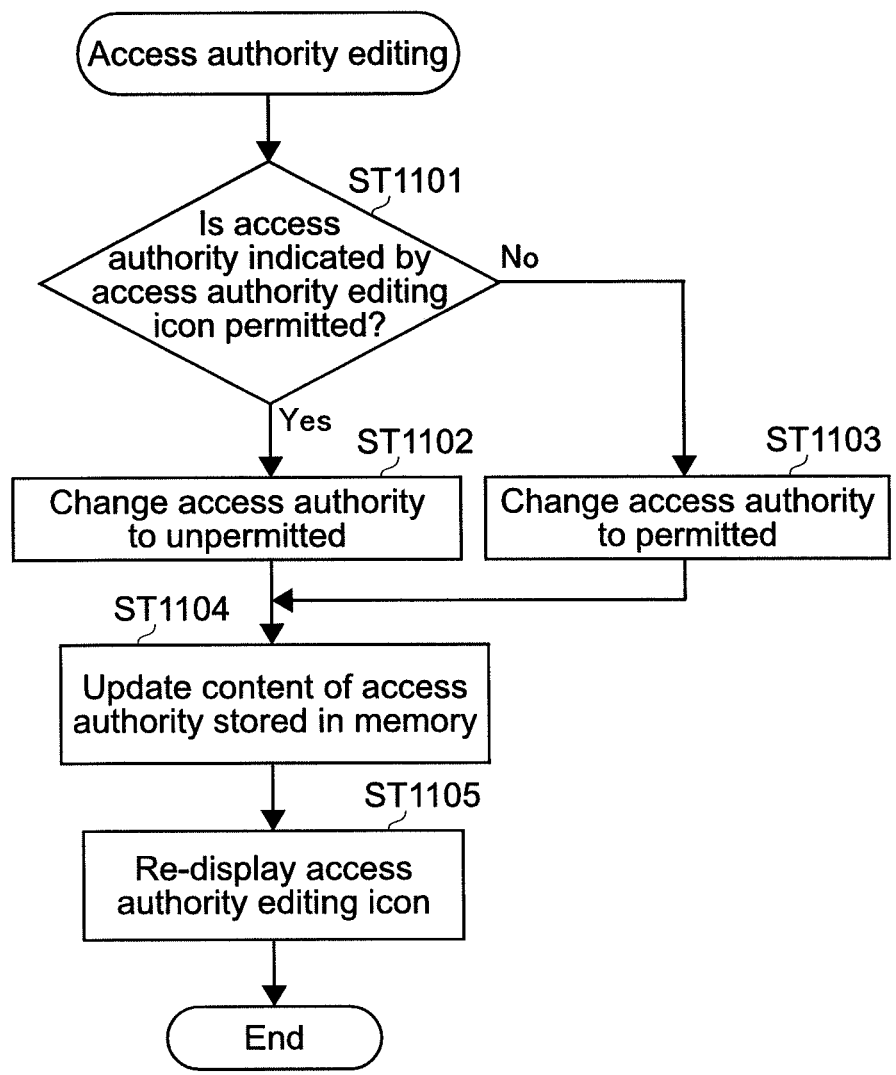
FIG. 14 is a flowchart showing processing of the tablet PC.

Referring to FIG. 14, the processing of Step 1005 shown in FIG. 13 (processing related to edit of access authority) will be described. When a tap operation with respect to the access authority editing icon 6 by a second finger is detected (YES in Step 1004), the controller 11 judges whether an access authority indicated by the access authority editing icon 6 as a target of the tap operation is permitted (Step 1101).

When the access authority is permitted (YES in Step 1101), the controller 11 changes the access authority with respect to the file to be copied or moved to unpermitted (Step 1102). On the other hand, when the access authority is unpermitted (NO in Step 1101), the controller 11 changes the access authority with respect to the file to be copied or moved to permitted (Step 1103).

Next, the controller 11 updates a content of the access authority (see FIG. 7) stored in the storage 15 according to the change of the access authority (Step 1104). Then, according to the change of the access authority, the access authority editing icon 6 is displayed again (Step 1105).

It should be noted that the access authority with respect to a file to be copied or moved is changed by the processing related to edit of an access authority, and a file of the file icon 1 at the original drag position is not affected at all by the processing related to edit of an access authority.

Figure 21:
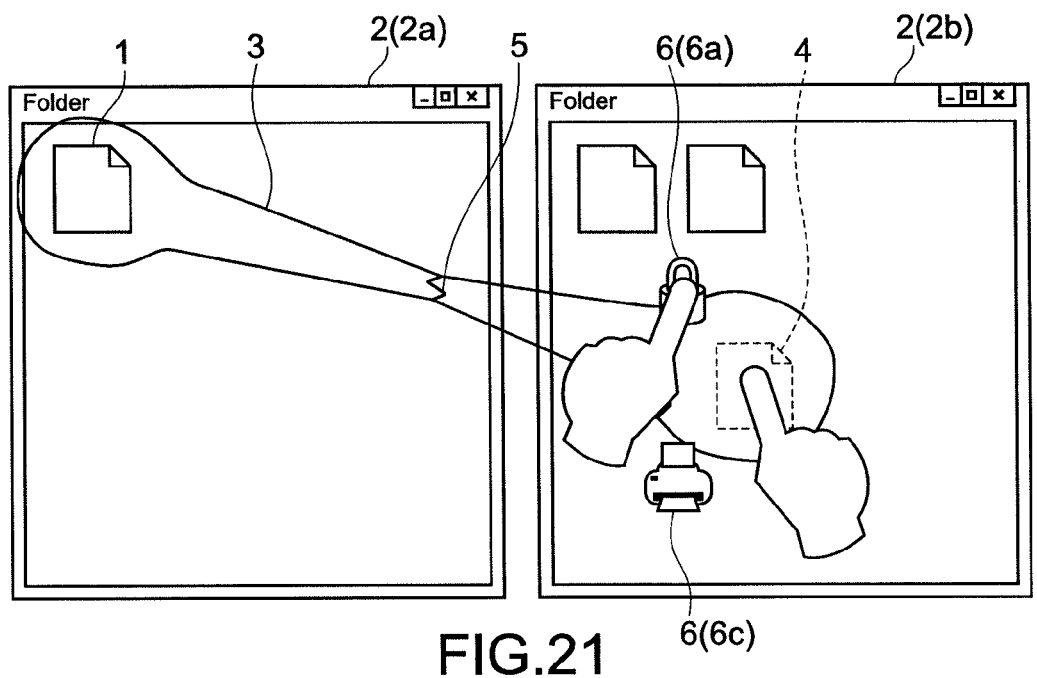
FIG. 21 is a diagram showing a state of the screen at a time the user taps an access authority editing icon with a finger of the other hand.
Figure 22:
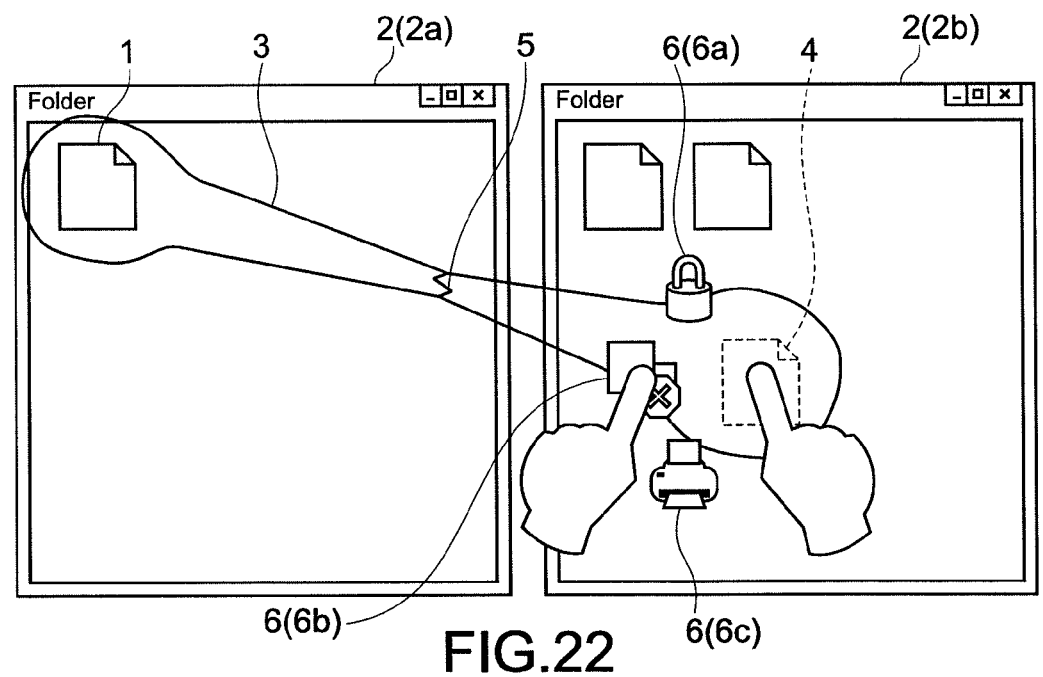
FIG. 22 is a diagram showing a state of the screen at the time the user taps the access authority editing icon with the finger of the other hand.
Figure 23:
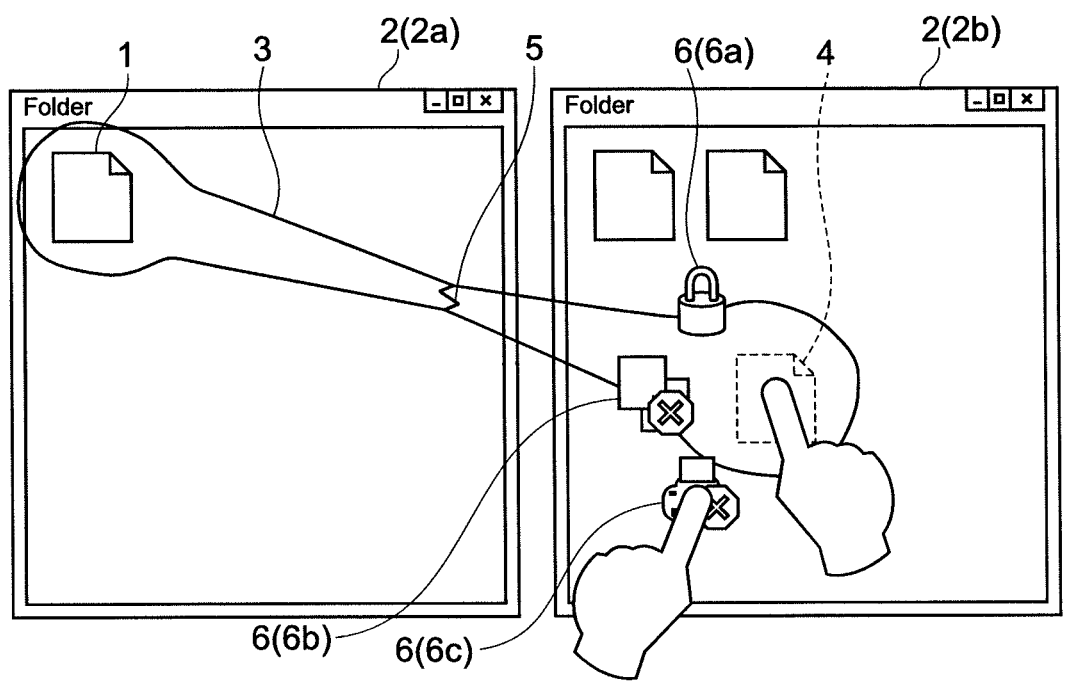
FIG. 23 is a diagram showing a state of the screen at the time the user taps the access authority editing icon with the finger of the other hand.

FIGS. 21 to 23 each show a state of the screen at a time the user drags the file icon 1 in the folder 2a with a finger of one hand, positions the dragging finger on the folder 2b (see FIG. 19), and taps the access authority editing icon 6 with a finger of the other hand.

As shown in FIG. 21, when the user taps the edit authority editing icon 6a (image of lock) with a finger of the other hand, permitted/unpermitted of an edit authority is inverted (toggle operation) (Steps 1101 to 1105). FIG. 21 shows a state where, by the user tapping a position at which an image of an unlocked lock is displayed, the edit authority is changed from permitted to unpermitted and an image indicating a locked state is displayed on the screen.

As shown in FIG. 22, when the user taps the copy authority editing icon 6b (image of two overlapping papers) with a finger of the other hand, permitted/unpermitted of a copy authority is inverted according to the tap operation. FIG. 22 shows a state where, by the user tapping a position at which the image of two overlapping papers is displayed, the copy authority is changed from permitted to unpermitted and an image in which x is added to the two papers is displayed.

As shown in FIG. 23, when the user taps the print authority editing icon 6c (image of printer) with a finger of the other hand, permitted/unpermitted of a print authority is inverted according to the tap operation. FIG. 23 shows a state where, by the user tapping a position at which the image of a printer is displayed, the print authority is changed from permitted to unpermitted and an image in which x is added to the printer is displayed.

As described above, by tapping the access authority editing icon 6, the user can intuitively and easily change the state of the access authority with respect to the file to be copied or moved.

Figure 15:
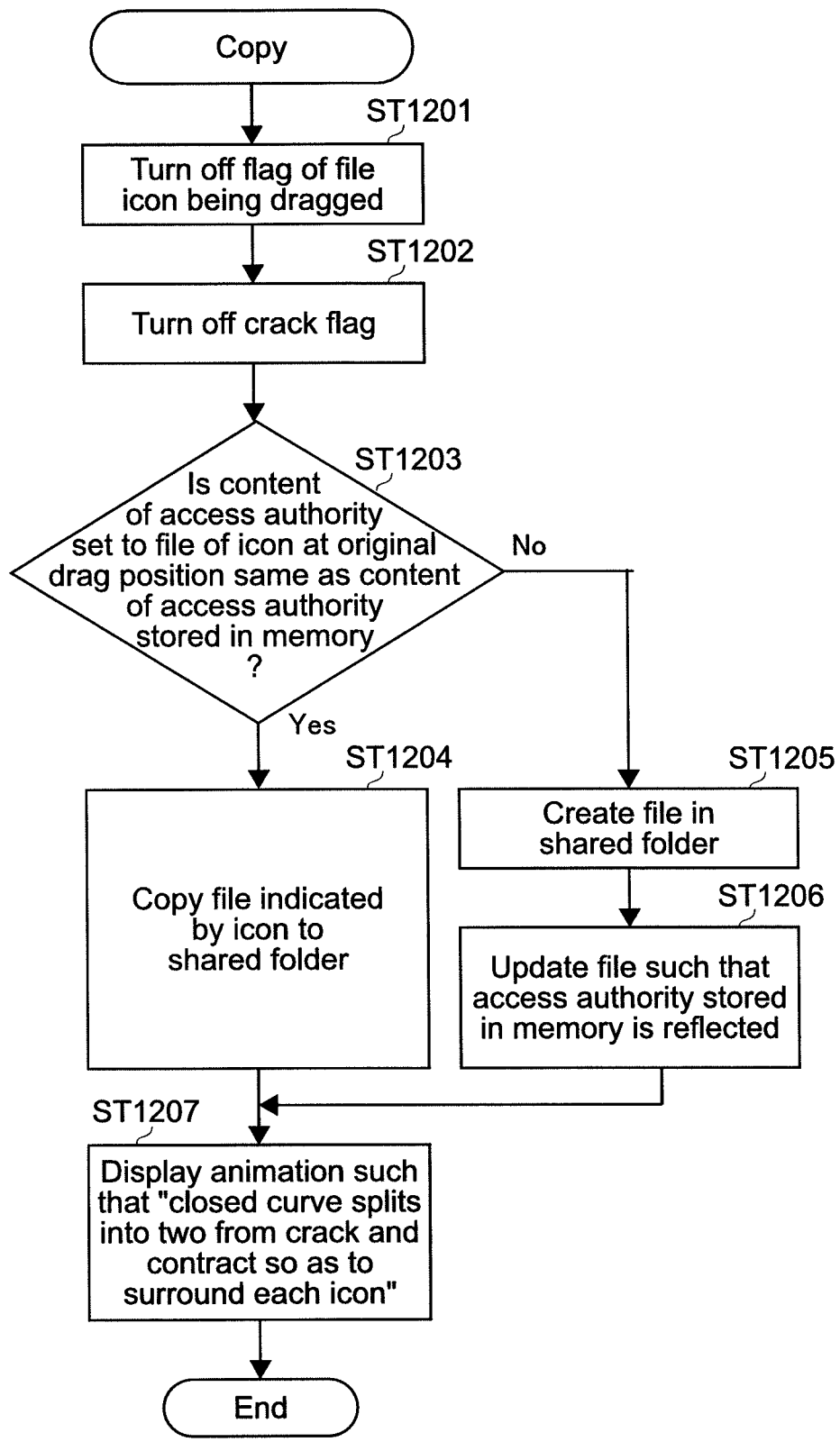
FIG. 15 is a flowchart showing processing of the tablet PC.

Next, referring to FIG. 15, the processing of Step 1007 shown in FIG. 13 (processing related to copy) will be described. When a flick operation with respect to the crack 5 by a second finger is detected (YES in Step 1006), the controller 11 turns off the flag of the file icon being dragged (Step 1201). Then, the controller 11 turns off the crack flag (Step 1202).

Next, the controller 11 judges whether the content of the access authority set to the file of the file icon 1 at the original drag position and the content of the access authority stored in the storage 15 are the same (Step 1203). In Step 1203, the controller 11 judges whether the content of the access authority set to the file of the file icon 1 at the original drag position and the content of the access authority updated by the user operation with respect to the access authority editing icon 6 are the same.

When the contents of the two access authorities are the same (YES in Step 1203), the controller 11 creates a copy of the file indicated by the file icon 1 at the original drag position in the shared folder (location on computer indicated by drag position) (Step 1204).

On the other hand, when the contents of the two access authorities differ (NO in Step 1203), the controller 11 creates a new file in the shared folder (location on computer indicated by drag position) (Step 1205). Then, the controller 11 updates the file so that the content of the access authority stored in the storage 15 (see Step 1104) is reflected (Step 1206). It should be noted that although this file has a different content of the access authority from the file indicated by the file icon 1 at the original drag position, the file content itself is the same as the file indicated by the file icon 1 at the original drag position.

Next, the controller 11 controls display on the screen such that the closed curve 3 splits from the crack 5 to be split into a first closed curve 3a surrounding the file icon 1 and a second closed curve 3b surrounding the ghost icon 4 (Step 1207). Then, the controller 11 controls display on the screen such that the first closed curve 3a contracts so as to surround the file icon 1 and the second closed curve 3b contracts so as to surround the ghost icon 4. At this time, the controller 11 controls display on the screen such that the access authority editing icon 6 fades out.

Figure 24:
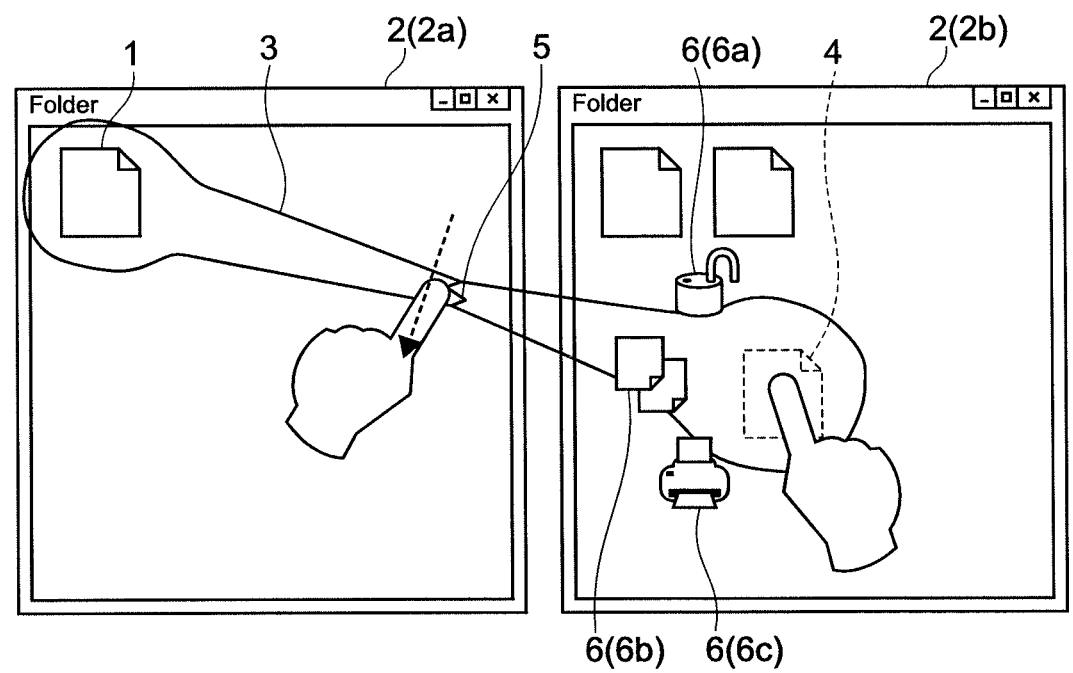
FIG. 24 is a diagram showing a state of the screen at a time the user flicks a crack with the finger of the other hand.
Figure 25:
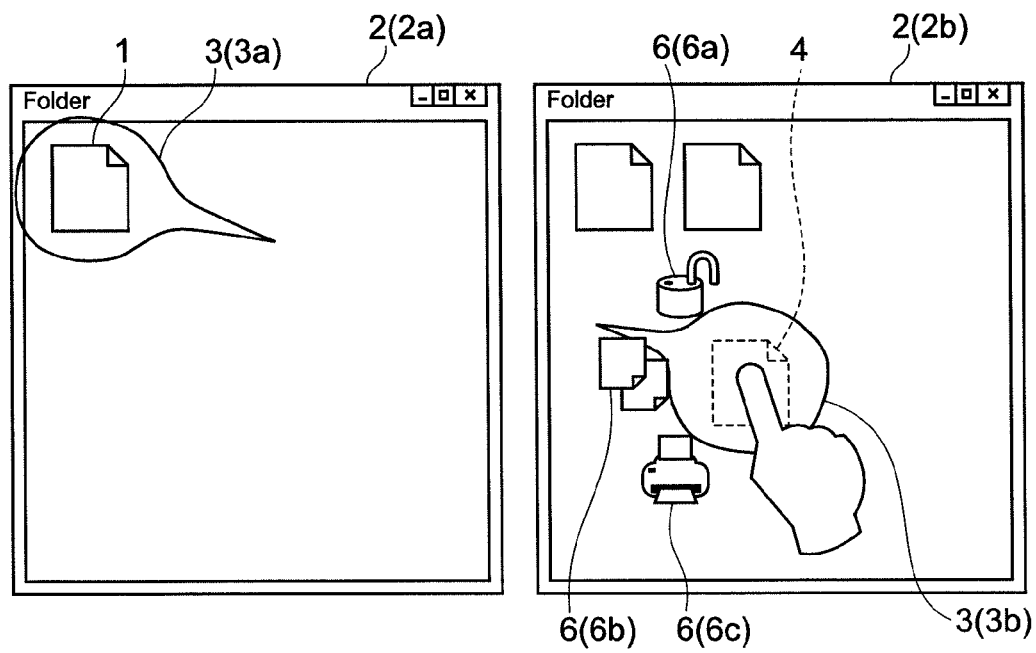
FIG. 25 is a diagram showing a state of the screen at the time the user flicks the crack with the finger of the other hand.
Figure 26:
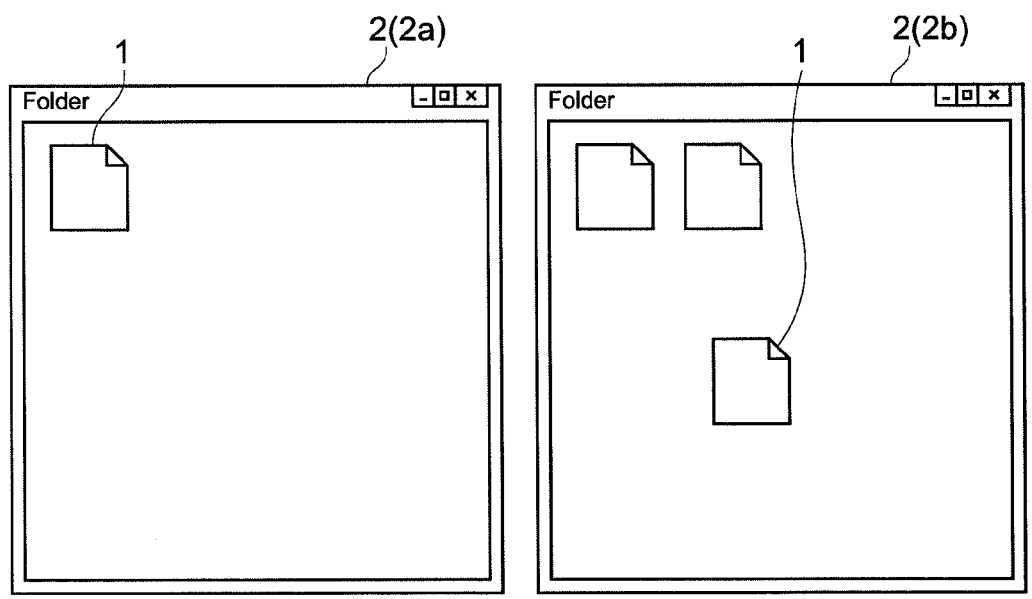
FIG. 26 is a diagram showing a state of the screen at the time the user flicks the crack with the finger of the other hand.

FIGS. 24 to 26 each show a state of the screen at a time the user drags the file icon 1 in the folder 2a with a finger of one hand, positions the dragging finger on the folder 2b (see FIG. 19), and makes a flick operation with respect to the crack 5 with a finger of the other hand. FIGS. 24 to 26 each show an example where the user makes a flick operation with respect to the crack 5 without operating the access authority editing icon 6.

As shown in FIG. 24, when the user makes a flick operation with respect to the crack 5 with a finger of the other hand, the closed curve 3 splits from the crack 5 to be split into the first closed curve 3a surrounding the file icon 1 and the second closed curve 3b surrounding the ghost icon 4 (Step 1201 to YES in Step 1203 to Step 1207). Then, as shown in FIG. 25, the first closed curve 3a contracts so as to surround the file icon 1 at the original drag position and the second closed curve 3b contracts so as to surround the ghost icon 4. At this time, inside the tablet PC 100, processing of copying a file corresponding to the file icon 1 at the original drag position to the folder 2b (shared folder) is executed (Step 1204).

As shown in FIG. 26, the closed curve 3 eventually disappears from the screen, and the image indicating the file icon 1 is displayed in the folder 2b. At this time, the access authority editing icon 6 also disappears from the screen.

As described above, in this embodiment, by the user making a user operation different from the drag operation on the screen, the processing of copying a file of the dragged file icon 1 is executed. In other words, before the user makes a user operation different from the drag operation, the processing of copying a file based on the drag operation is not executed. As a result, a stable operation becomes possible, and the user can accurately copy a file to an intended location.

Further, in this embodiment, by an intuitive operation of flicking the crack 5 displayed between the file icon 1 and the ghost icon 4, the user can copy an arbitrary file to an arbitrary folder (arbitrary location on computer). Since the closed curve 3 is split into the first closed curve 3a and the second closed curve 3b according to the flick operation on the screen, the user can intuitively recognize that the file is being copied.

The controller 11 may control display on the screen such that the first closed curve 3a and the second closed curve 3b contract according to a progress state of the copy processing and the first closed curve 3a and the second closed curve 3b disappear when the copy is ended. In this case, the user can intuitively recognize the progress state of the data copy.

Figure 27:
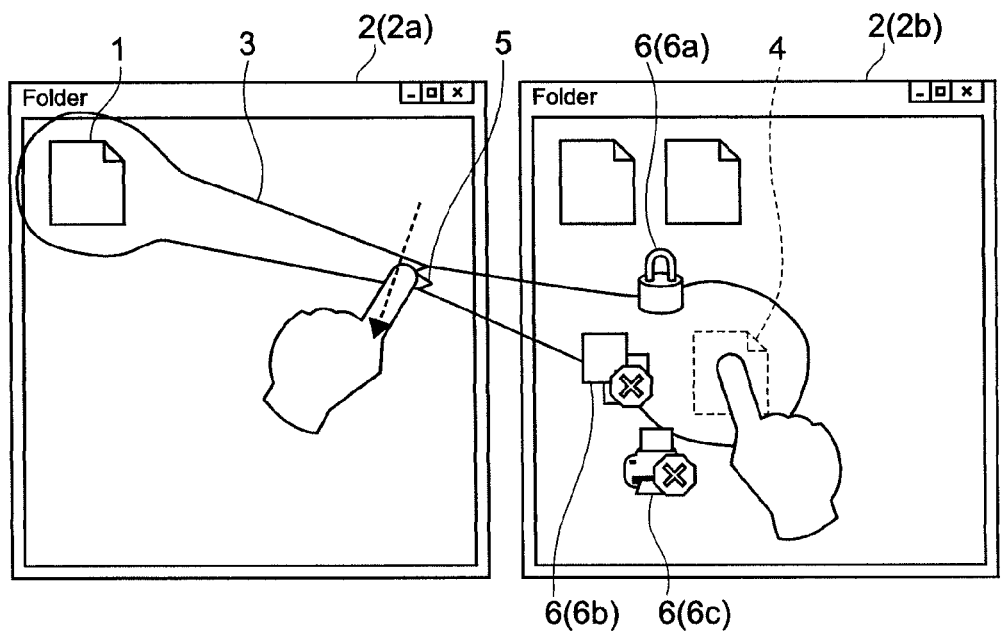
FIG. 27 is a diagram showing a state of the screen at the time the user flicks the crack with the finger of the other hand.
Figure 28:
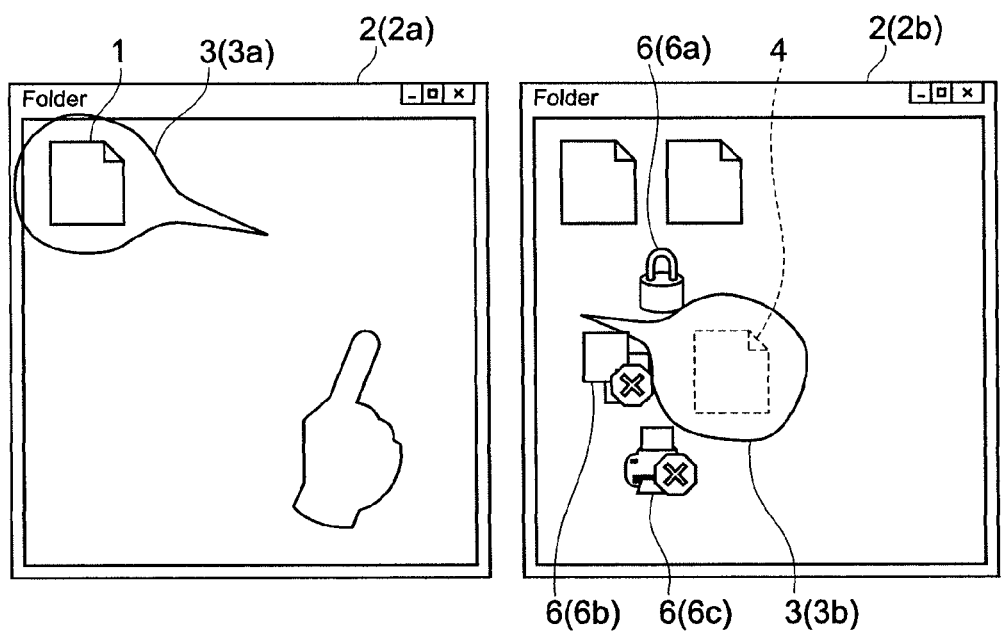
FIG. 28 is a diagram showing a state of the screen at the time the user flicks the crack with the finger of the other hand.

FIGS. 27 and 28 each show a state of the screen at a time the user drags the file icon 1 in the folder 2a with a finger of one hand, positions the dragging finger on the folder 2b, and flicks the crack 5 with a finger of the other hand. FIGS. 27 and 28 each show an example where the user makes a flick operation with respect to the crack 5 after operating the access authority editing icon 6 with a finger of the other hand (see FIGS. 21 to 23).

As shown in FIG. 27, when the user makes a flick operation with respect to the crack 5 with a finger of the other hand, the closed curve 3 splits from the crack 5 to be split into the first closed curve 3a surrounding the file icon 1 and the second closed curve 3b surrounding the ghost icon 4 (Step 1201 to NO in Step 1203 to Step 1207). Then, as shown in FIG. 28, the first closed curve 3a contracts so as to surround the file icon 1 at the original drag position and the second closed curve 3b contracts so as to surround the ghost icon 4. At this time, inside the tablet PC 100, a new file is created in the folder 2b (shared folder) (Step 1205). Then, the file is updated such that the content of the access authority stored in the storage 15 (see Step 1104) is reflected (change of access authority state is reflected) (Step 1206).

In the examples shown in FIGS. 27 and 28, the access authorities of the edit authority editing icon 6a (image of lock), the copy authority editing icon 6b (image of two overlapping papers), and the print authority editing icon 6c (image of printer) are all "unpermitted". Therefore, in this case, a file having the same content as the file of the file icon 1 at the original drag position, for which the edit authority, copy authority, and print authority are set to unpermitted, is created in the folder 2b (shared folder).

As described above, by making a flick operation with respect to the crack 5 displayed between the file icon 1 and the ghost icon 4 after operating the access authority editing icon 6, the user can create a file onto which the access authority state is reflected in an arbitrary folder.

Figure 16:
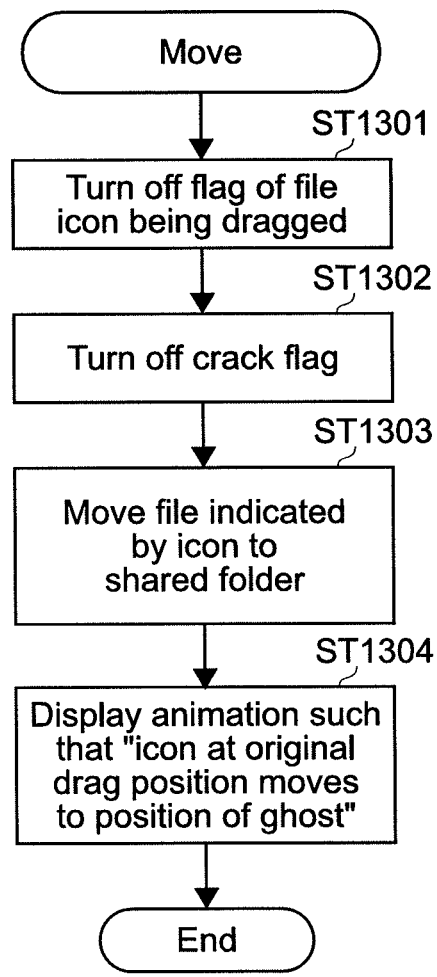
FIG. 16 is a flowchart showing processing of the tablet PC.

Next, referring to FIG. 16, the processing of Step 1009 shown in FIG. 13 (processing related to file movement) will be described. When a flick operation with respect to the file icon 1 at the original drag position by a second finger is detected (YES in Step 1008), the controller 11 turns off the flag of the file icon being dragged (Step 1301). Then, the controller 11 turns off the crack flag (Step 1302).

Next, the controller 11 moves the file corresponding to the file icon 1 at the original drag position to the shared folder (location on computer indicated by drag position) (Step 1303). Then, the controller 11 controls display on the screen such that the closed curve 3 contracts while the file icon 1 at the original drag position moves to the position of the ghost icon 4 (Step 1304). At this time, the controller 11 controls display on the screen such that the access authority editing icon 6 fades out.

A case where the content of the access authority set to the file of the file icon 1 at the original drag position and the content of the access authority stored in the storage 15 (see Step 1104) differ will be discussed. In this case, the controller 11 may create a file onto which the content of the access authority stored in the storage 15 is reflected (change of access authority is reflected) in the shared folder (location on computer indicated by drag position).

Figure 29:
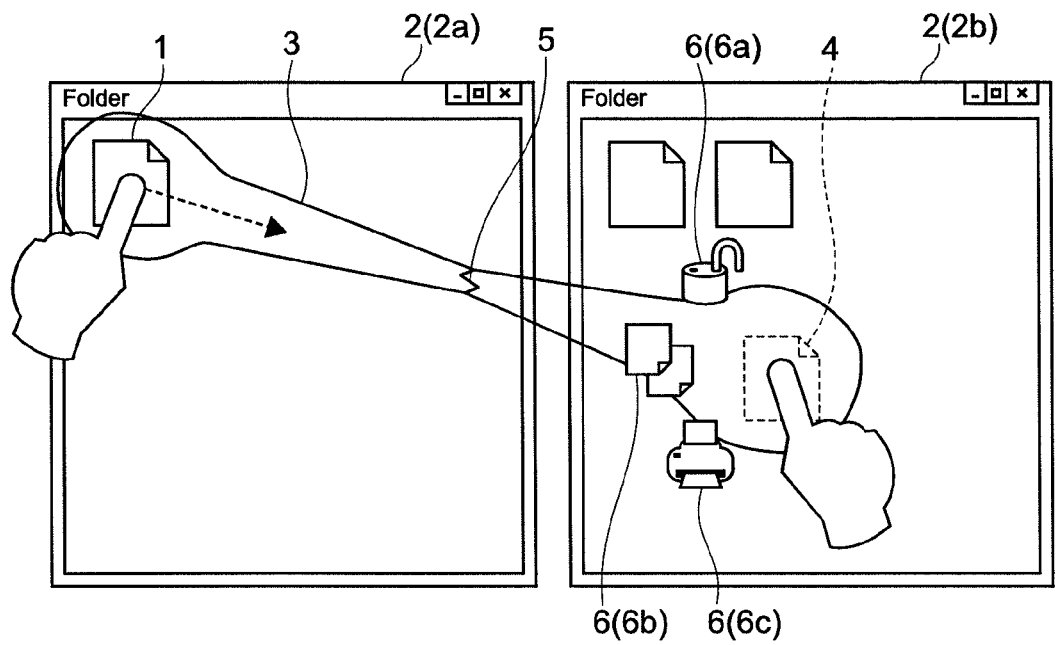
FIG. 29 is a diagram showing a state of the screen at a time the user flicks a file icon at an original drag position toward a ghost icon with the finger of the other hand.
Figure 30:
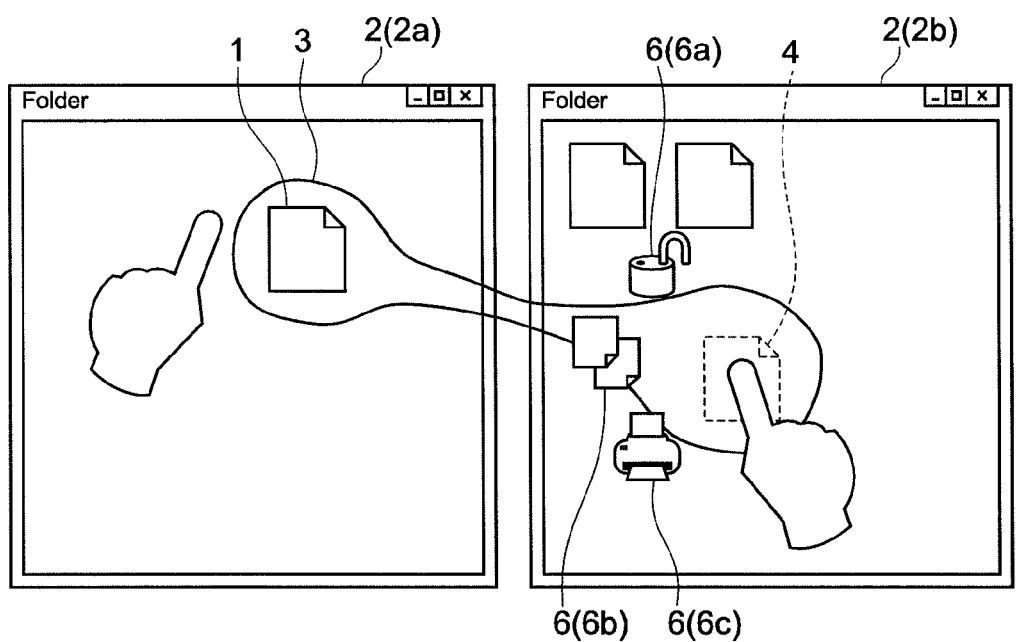
FIG. 30 is a diagram showing a state of the screen at the time the user flicks the file icon at the original drag position toward the ghost icon with the finger of the other hand.
Figure 31:
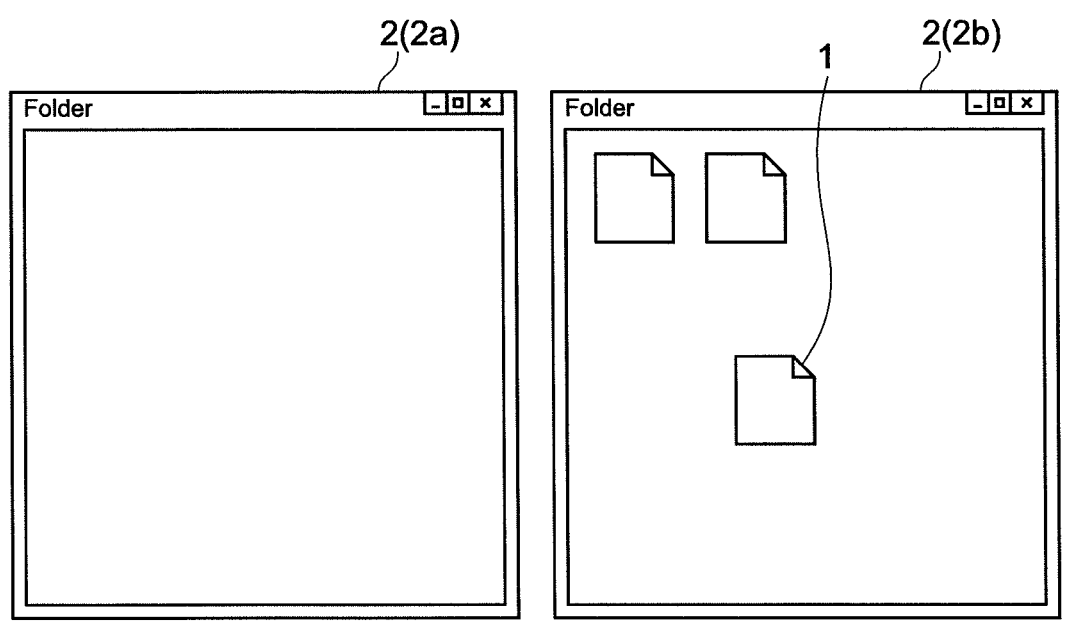
FIG. 31 is a diagram showing a state of the screen at the time the user flicks the file icon at the original drag position toward the ghost icon with the finger of the other hand.

FIGS. 29 to 31 each show an example of a case where the user drags the file icon 1 with a finger of one hand, positions the dragging finger on the folder 2b, and flicks the file icon 1 at the original drag position with a finger of the other hand.

As shown in FIG. 29, when the user flicks the file icon 1 at the original drag position toward the ghost icon 4 with a finger of the other hand, the closed curve 3 contracts while the file icon 1 moves to the position of the ghost icon 4 as shown in FIG. 30 (Step 1304). At this time, inside the tablet PC 100, processing of moving a file corresponding to the file icon 1 from the folder 2a to the folder 2b is executed (Step 1303).

As shown in FIG. 31, after the file icon 1 is moved to the position of the ghost icon 4, the file icon 1 and the ghost icon 4 overlap so that the ghost icon 4 disappears, and the closed curve 3 also disappears from the screen. At this time, the access authority editing icon 6 also disappears from the screen.

As described above, in this embodiment, by the user making a user operation different from the drag operation on the screen, the processing of moving a file corresponding to the file icon 1 as a drag target is executed. As a result, a stable operation becomes possible, and the user can accurately move a file to an intended location.

Further, in this embodiment, by an intuitive operation of flicking the file icon 1 toward the ghost icon 4, the user can move an arbitrary file to an arbitrary folder (arbitrary location on computer). Since the closed curve 3 contracts while the file icon 1 moves to the position of the ghost icon 4 according to the flick operation on the screen, the user can intuitively recognize that the file is being moved.

The controller 11 may control display on the screen such that the closed curve 3 contracts while the file icon 1 moves to the position of the ghost icon 4 according to a progress state of the processing of moving a file. In this case, the file icon 1 and the ghost icon 4 overlap each other at the time the file movement ends, and the ghost icon 4 and the closed curve 3 disappear from the screen. In this case, the user can intuitively recognize the progress state of the data movement.

Furthermore, in this embodiment, the user can arbitrarily select whether to copy or move a file. When the user wishes to copy a file, the user only needs to drag the file icon 1 with a finger of one hand, position the dragging finger at an arbitrary location on the screen, and flick the crack 5 with a finger of the other hand. On the other hand, when the user wishes to move a file, the user only needs to drag the file icon 1 with a finger of one hand, position the dragging finger at an arbitrary location on the screen, and make a flick operation with respect to the file icon 1 at the original drag position with a finger of the other hand. As described above, in this embodiment, by an intuitive operation, the user can arbitrary select whether to copy or move a file.

Second Embodiment

Next, a second embodiment of the present disclosure will be described. In the descriptions on the second and subsequent embodiments, parts having the same functions and structures as those of the first embodiment above will be denoted by the same symbols, and descriptions thereof will be simplified or omitted.

In the first embodiment above, an example of the case where a multi-touch system is adopted in the tablet PC 100 has been described. In the second embodiment, however, descriptions will be given on an example where a single-touch system is adopted in the tablet PC 100.

FIGS. 32 to 45 are each a flowchart showing processing of the tablet PC 100 according to the second embodiment. FIGS. 46 to 62 are each a diagram showing a state of the screen at a time the corresponding processing is executed by the tablet PC 100.

Figure 32:
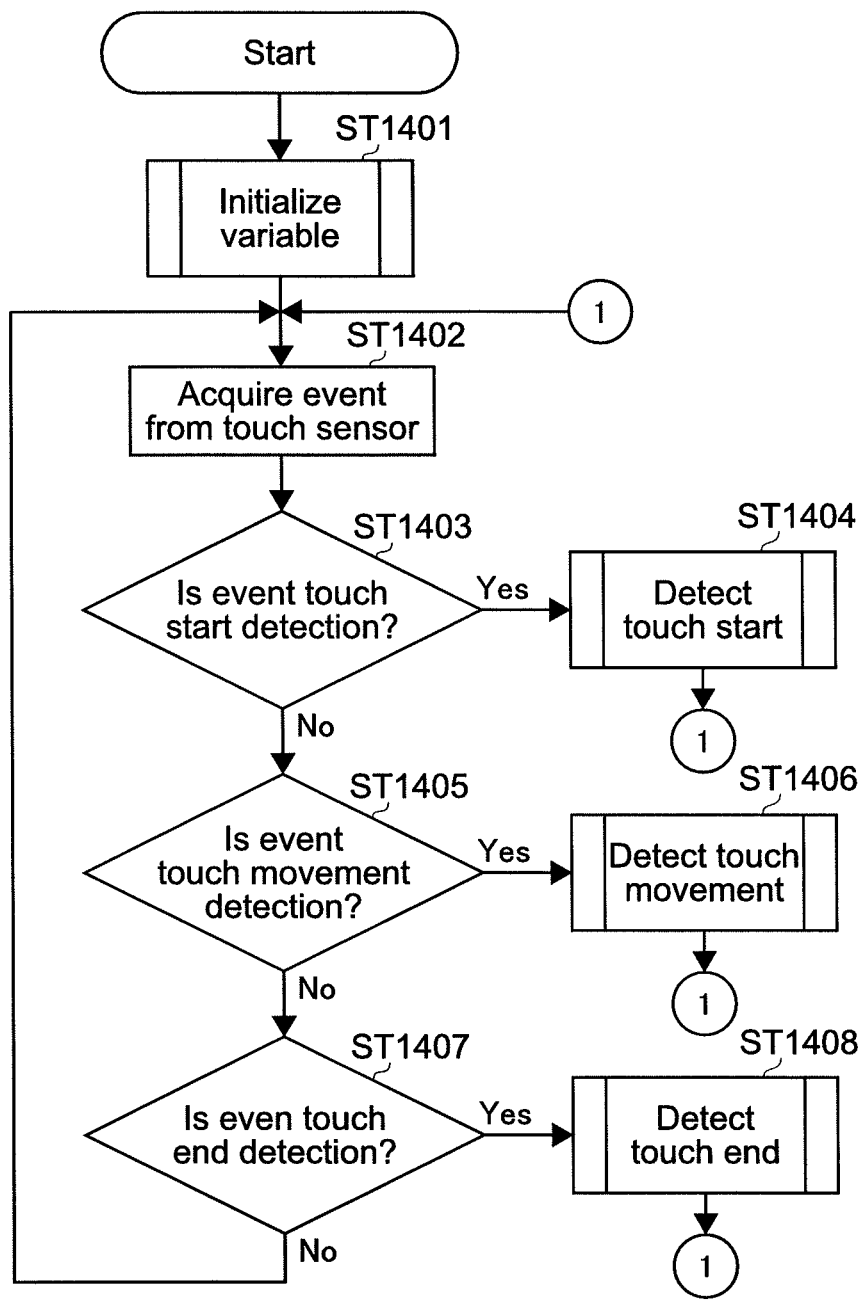
FIG. 32 is a flowchart showing processing of the tablet PC.
Figure 33:
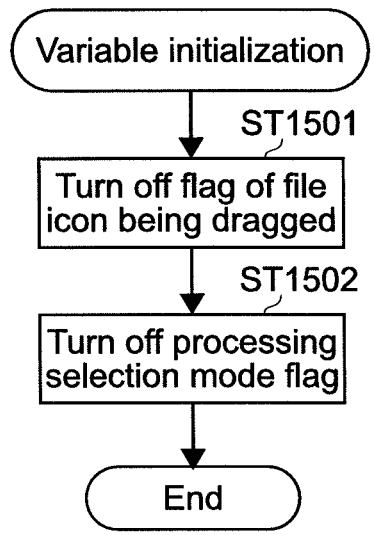
FIG. 33 is a flowchart showing processing of the tablet PC.

Referring to FIG. 32, the controller 11 of the tablet PC 100 first executes a variable initialization (Step 1401). Referring to FIG. 33, the controller 11 turns off the flag of the file icon being dragged as the variable initialization (Step 1501). Next, the controller 11 turns off a flag of a processing selection mode (Step 1502).

Referring to FIG. 32, the controller 11 next acquires an event from the touch sensor 13 (Step 1402). When the event is a touch start detection (YES in Step 1403), the controller 11 executes processing corresponding to the touch start detection (Step 1404).

When the event acquired from the touch sensor 13 is a touch movement detection (NO in Step 1405), the controller 11 executes processing corresponding to the touch movement detection (Step 1406). When the event acquired from the touch sensor 13 is a touch end detection (YES in Step 1407), the controller 11 executes processing corresponding to the touch end detection (Step 1408).

Figure 34:
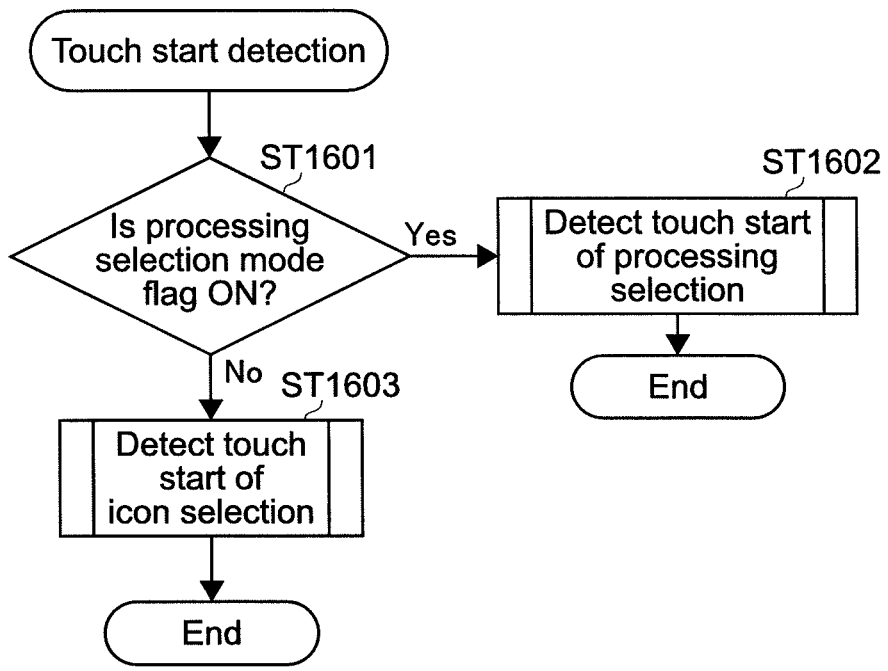
FIG. 34 is a flowchart showing processing of the tablet PC.

Referring to FIG. 34, the processing of Step 1404 shown in FIG. 32 (processing carried out when touch start is detected) will be described. When the even acquired from the touch sensor 13 is the touch start detection (YES in Step 1403), the controller 11 judges whether the flag of the processing selection mode is ON (Step 1601). When the flag of the processing selection mode is ON (YES in Step 1601), the controller 11 executes processing that is carried out when a touch start is detected at a time the processing is selected (Step 1602). On the other hand, when the flag of the processing selection mode is OFF (NO in Step 1601), the controller 11 executes processing that is carried out when a touch start is detected at the time the file icon 1 is selected (Step 1603).

Figure 35:
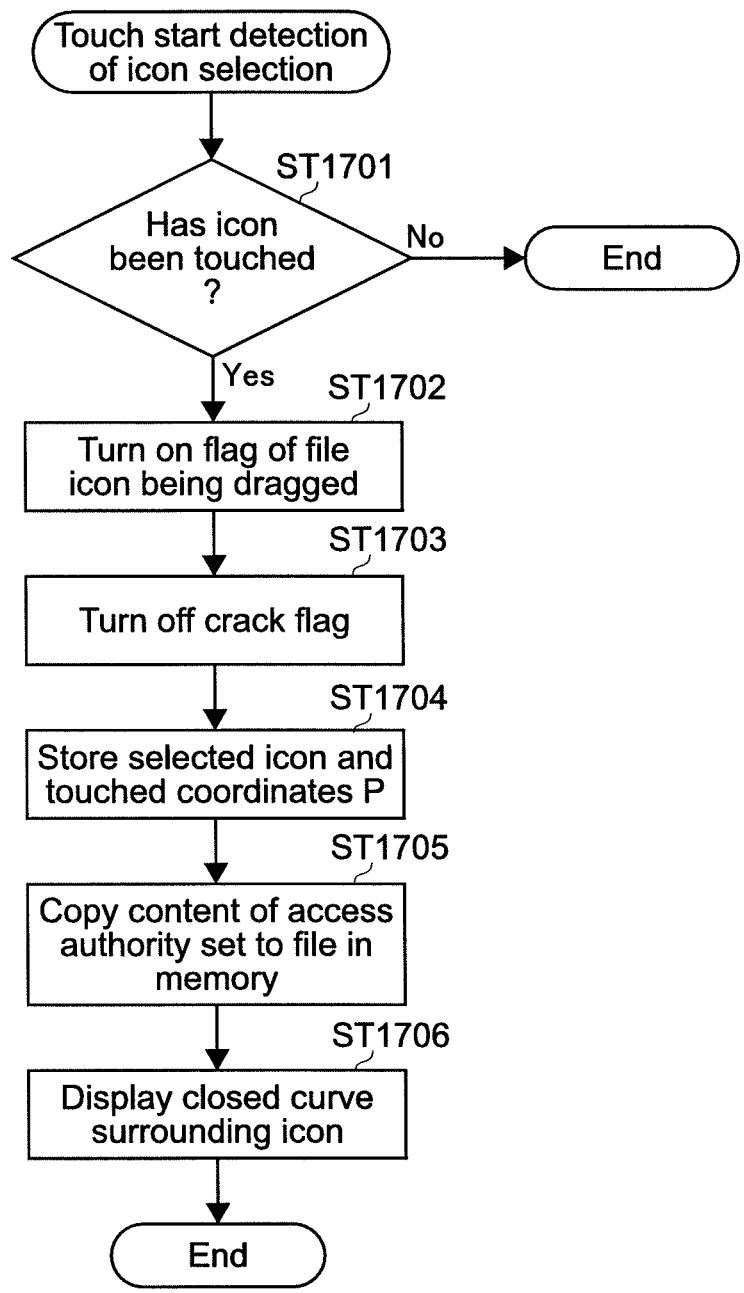
FIG. 35 is a flowchart showing processing of the tablet PC.

Referring to FIG. 35, the processing of Step 1603 shown in FIG. 34 (processing carried out when touch start is detected at time file icon 1 is selected) will be described. When the event acquired from the touch sensor 13 is the touch start detection and the processing selection mode flag is OFF (NO in Step 1601), the controller 11 judges whether the display position of the file icon 1 has been touched (Step 1701). When judged that the display position of the file icon 1 has been touched (YES in Step 1701), the controller 11 turns on the flag of the file icon being dragged (Step 1702) and turns off the crack flag (Step 1703).

Next, the controller 11 stores the selected file icon 1 and the coordinates P obtained when the touch is started in the storage 15 (Step 1704). Then, the controller 11 copies and stores a content of the access authority set to the file corresponding to the selected file icon 1 in the storage 15 (Step 1705) (See FIG. 7). Next, the controller 11 causes the closed curve 3 surrounding the file icon 1 to be displayed on the screen (Step 1706).

Figure 46:
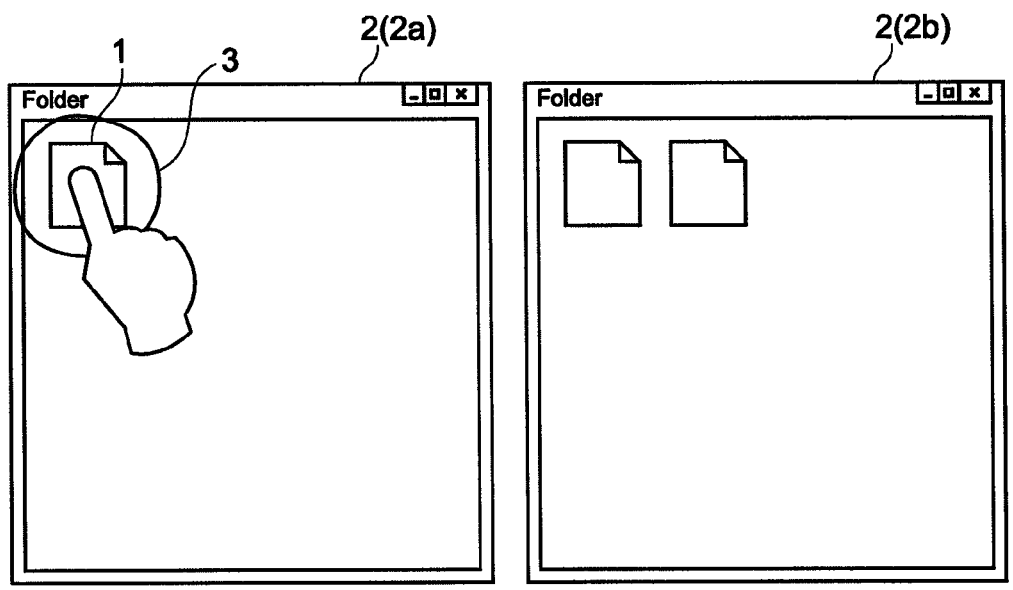
FIG. 46 is a diagram showing a state of the screen at a time the user touches the file icon displayed in the folder.

As a result, when the user touches the position at which the file icon 1 in the folder 2a is displayed on the screen as shown in FIG. 46, the closed curve 3 surrounding the file icon 1 is displayed on the screen (Step 1706).

Figure 36:
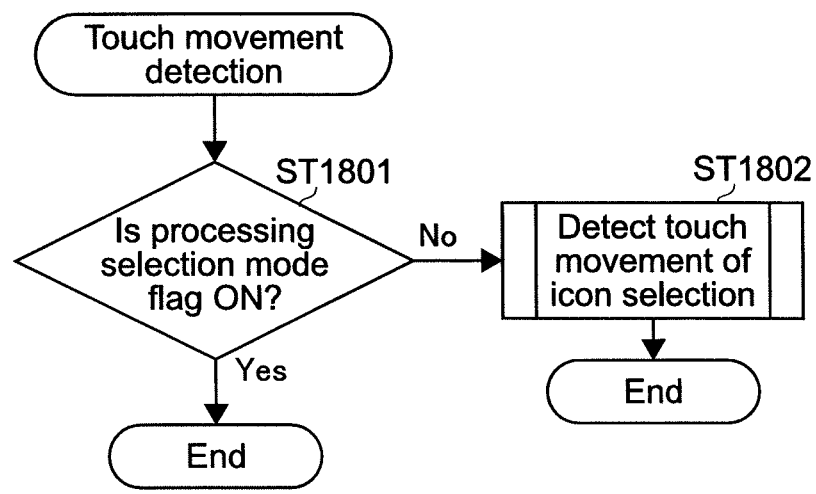
FIG. 36 is a flowchart showing processing of the tablet PC.

Referring to FIG. 36, the processing of Step 1406 shown in FIG. 32 (processing corresponding to touch movement detection) will be described. When the event acquired from the touch sensor 13 is the touch movement detection (YES in Step 1405), the controller 11 judges whether the processing selection mode flag is ON (Step 1801). When the processing selection mode flag is OFF (NO in Step 1801), the controller 11 executes processing that is carried out when the touch movement is detected at the time the file icon 1 is selected (Step 1802).

Figure 37:
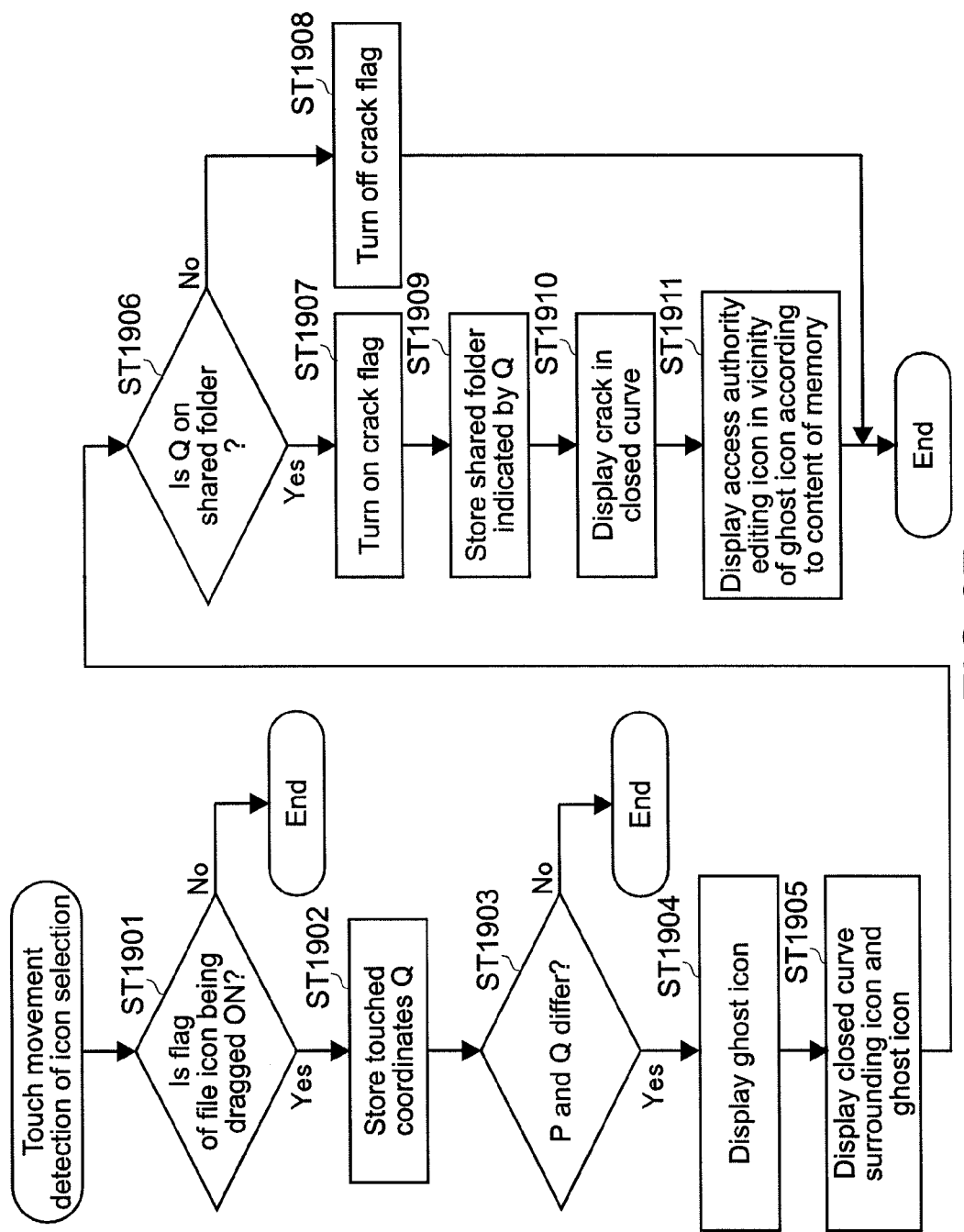
FIG. 37 is a flowchart showing processing of the tablet PC.

Referring to FIG. 37, the processing of Step 1802 shown in FIG. 36 (processing carried out when touch movement is detected at time file icon 1 is selected) will be described. When the event acquired from the touch sensor 13 is the touch movement detection and the processing selection mode flag is OFF (NO in Step 1801), the controller 11 judges whether the flag of the file icon being dragged is ON (Step 1901).

When the flag of the file icon being dragged is ON (YES in Step 1901), the controller 11 stores the coordinates Q currently touched by the user in the storage 15 (Step 1902). Next, the controller 11 judges whether the coordinates P obtained when the touch with respect to the file icon 1 is started and the coordinates Q currently touched by the user differ (Step 1903).

When the coordinates P and Q differ, the controller 11 causes the ghost icon 4 to be displayed on the screen (Step 1904) and also causes the closed curve 3 surrounding the file icon 1 and the ghost icon 4 to be displayed on the screen (Step 1905).

Figure 47:
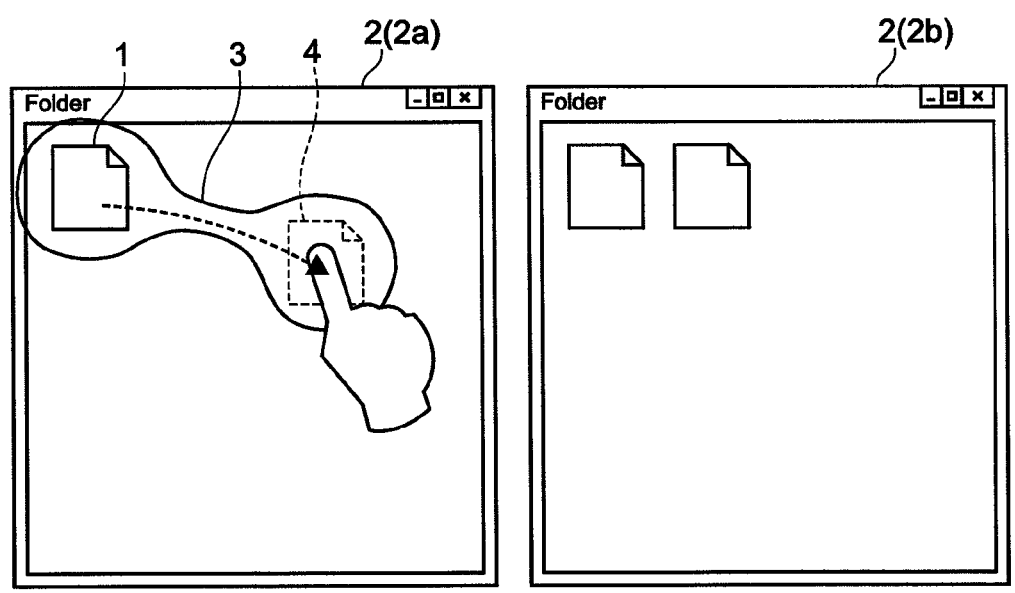
FIG. 47 is a diagram showing a state of the screen at the time the user touches the file icon in the folder with a finger and slides the finger without releasing it from the screen (drag operation)

FIG. 47 shows a state of the screen at a time the user touches the file icon 1 in the folder 2a with a finger and slides the finger without releasing it from the screen (drag). In this case, the file icon 1, the ghost icon 4, and the closed curve 3 are displayed on the screen (Steps 1904 and 1905).

Referring back to FIG. 37, the controller 11 next judges whether the coordinates Q on the screen currently touched by the user are on the shared folder (Step 1906). When the coordinates Q currently touched by the user are on the shared folder (YES in Step 1906), the controller 11 turns on the crack flag (Step 1907). On the other hand, when the coordinates Q currently touched by the user are not on the shared folder (NO in Step 1906), the controller 11 turns off the crack flag (Step 1908).

Upon turning on the crack flag, the controller 11 next stores the shared folder indicated by the coordinates Q in the storage 15 (Step 1909). Then, the controller 11 displays the crack 5 in the closed curve 3 (Step 1910). Simultaneous with the display of the crack 5 in the closed curve 3, the controller 11 displays the access authority editing icon 6 in the vicinity of the ghost icon 4 based on the content of the access authority stored in the storage 15 (Step 1911).

Figure 48:
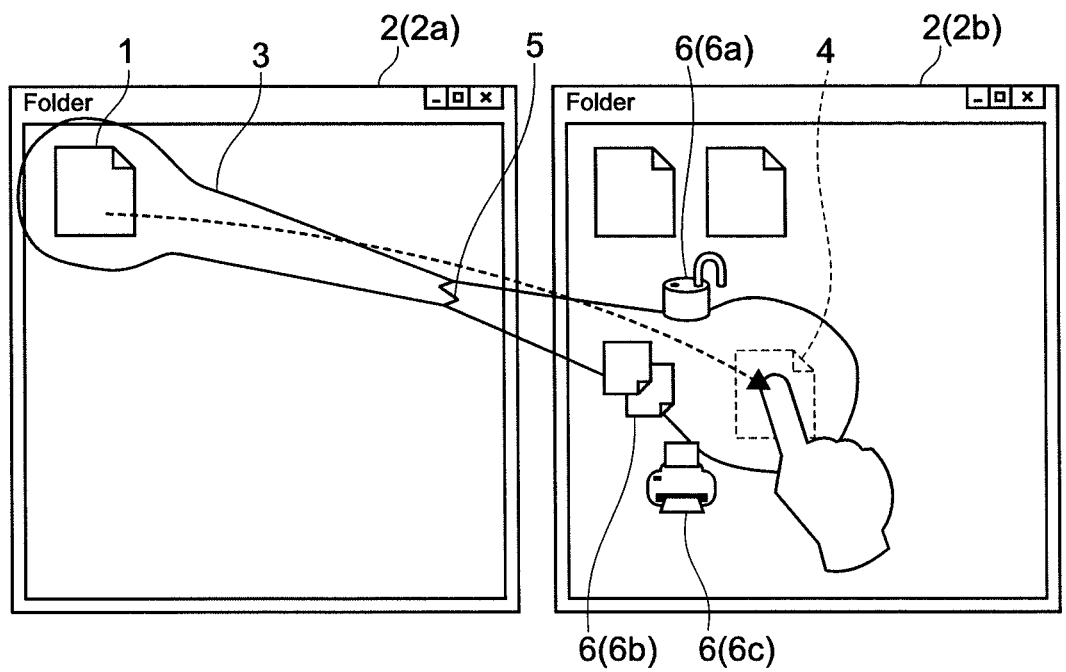
FIG. 48 is a diagram showing a state of the screen at the time the user drags the file icon in the folder and moves the finger to another folder (shared folder)

FIG. 48 shows a state of the screen at a time the user drags the file icon 1 in the folder 2a and positions the finger on the folder 2b (shared folder). In this case, as shown in FIG. 48, the crack 5 is displayed in the closed curve 3 (Step 1910), and the access authority editing icon 6 is displayed in the vicinity of the ghost icon 4 (Step 1911).

Figure 38:
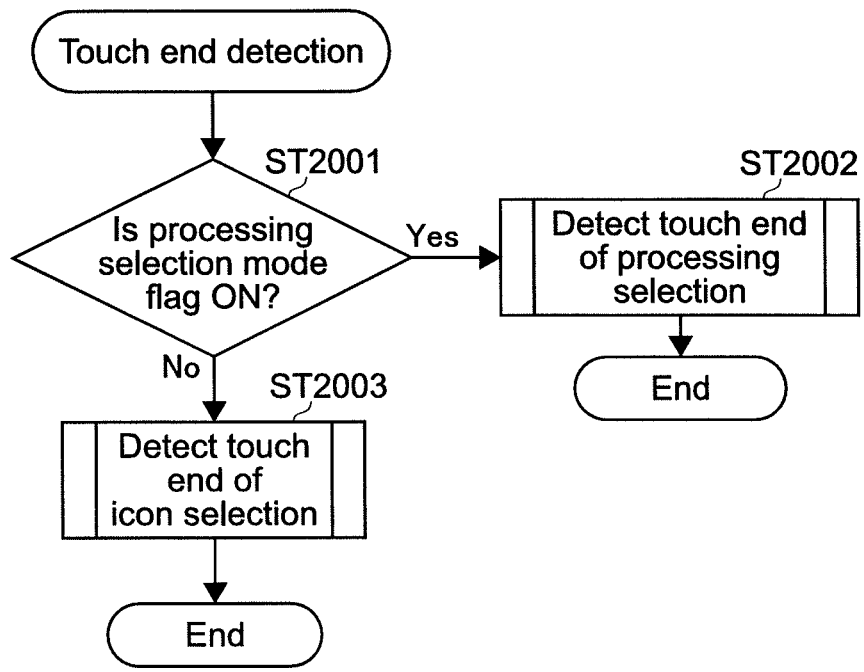
FIG. 38 is a flowchart showing processing of the tablet PC.

Referring to FIG. 38, the processing of Step 1408 shown in FIG. 32 (processing corresponding to touch end detection) will be described. When the event acquired from the touch sensor 13 is the touch end detection (YES in Step 1407), the controller 11 judges whether the processing selection mode flag is ON (Step 2001).

When the processing selection mode flag is ON (YES in Step 2001), the controller 11 executes processing that is carried out when a touch end is detected at a time processing is selected (Step 2002). On the other hand, when the processing selection mode flag is OFF (NO in Step 2001), the controller 11 executes processing that is carried out when a touch end is detected at the time the file icon 1 is selected (Step 2003).

Figure 39:
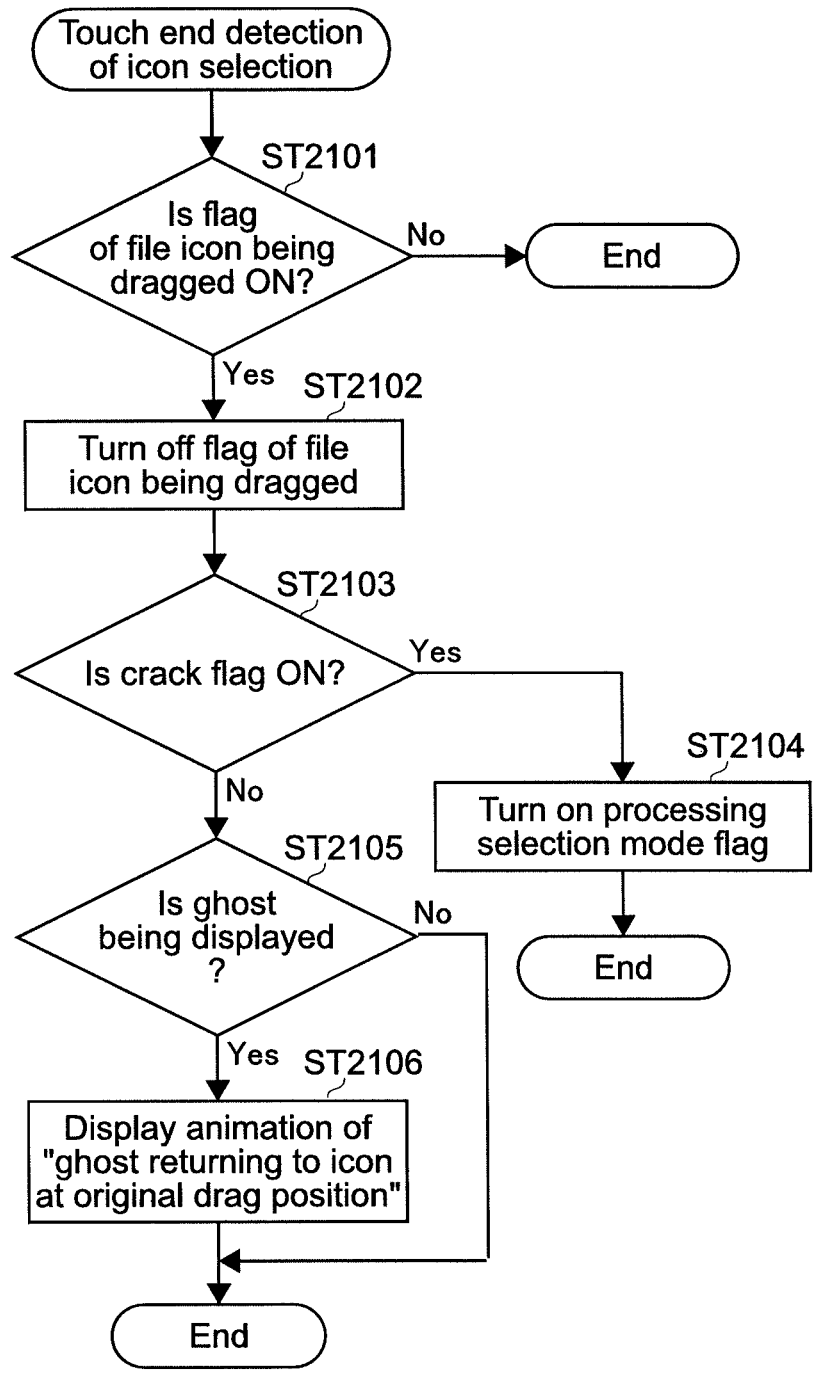
FIG. 39 is a flowchart showing processing of the tablet PC.

Referring to FIG. 39, the processing of Step 2003 shown in FIG. 38 (processing carried out when touch end is detected at time file icon 1 is selected) will be described. When the event acquired from the touch sensor 13 is the touch end detection and the processing selection mode flag is OFF (NO in Step 2001), the controller 11 judges whether the flag of the file icon being dragged is ON (Step 2101).

When the flag of the file icon being dragged is ON (YES in Step 2101), the controller 11 turns off the flag of the file icon being dragged (Step 2102). Next, the controller 11 judges whether the crack flag is ON (Step 2103).

When the crack flag is OFF (NO in Step 2103), the controller 11 judges whether the ghost icon 4 is being displayed (Step 2105). When the ghost icon 4 is being displayed (YES in Step 2105), the controller 11 causes the closed curve 3 to contract while moving the ghost icon 4 to the position of the file icon 1 (Step 2106). By the processing as described above, the drag operation is canceled when the user releases the dragging finger from the screen (drop) in a state where the crack 5 is not displayed in the closed curve 3 (state where drag position is not within area where file can be copied or moved).

On the other hand, when the crack flag is ON (YES in Step 2103), the controller 11 turns on the processing selection mode flag (Step 2104). By the processing as described above, when the user releases the dragging finger from the screen (drop) in a state where the crack 5 is displayed in the closed curve 3 (state where drag position is within area where file can be copied or moved), the mode is put to a processing-selectable mode. In this case, the drag operation is not canceled. Also in this case, regarding the file icon 1 at the original drag position, the ghost icon 4, the closed curve 3, and the access authority editing icon 6 displayed on the screen, even when the user releases his/her finger from the screen, the display state is maintained at that time point.

Figure 49:
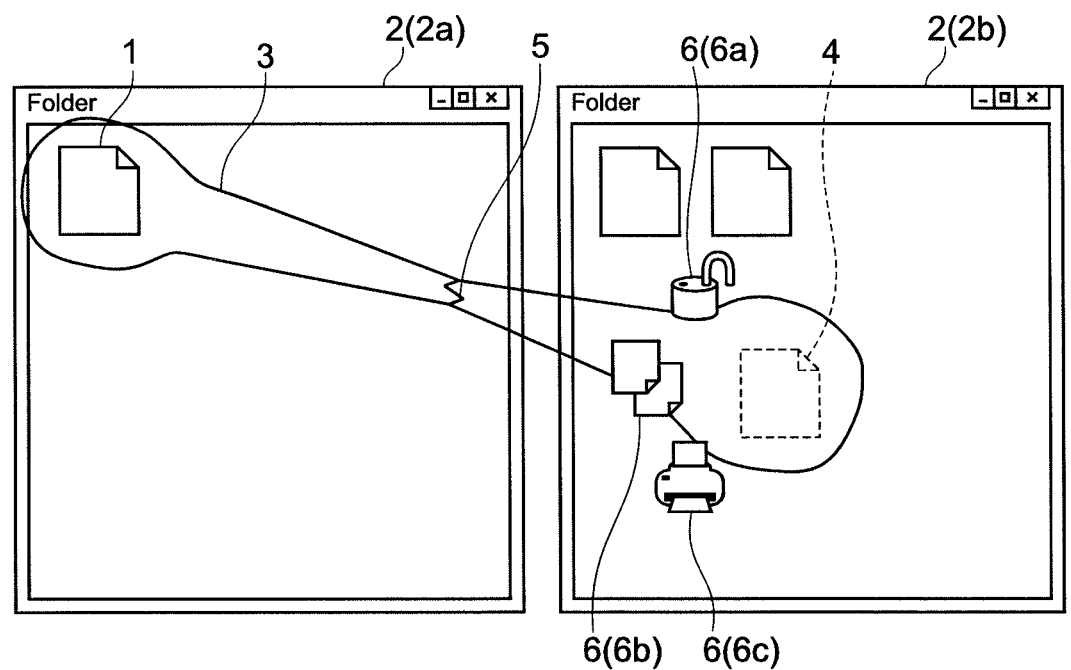
FIG. 49 is a diagram showing a state of the screen at the time the user releases the finger from the screen.

FIG. 49 shows a state of the screen at a time the user drags the file icon 1 in the folder 2a, positions the dragging finger on the folder 2b (see FIG. 48), and releases the finger from the screen.

As shown in FIG. 49, even when the user releases the dragging finger from the screen in the state where the crack 5 is displayed in the closed curve 3 (state where drag position is within area where file can be copied or moved), the display state of the screen at the time the user releases the finger is maintained.

Figure 40:
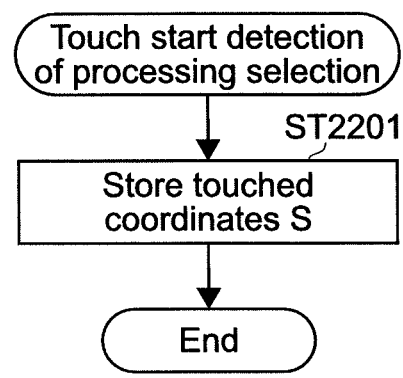
FIG. 40 is a flowchart showing processing of the tablet PC.

Referring to FIG. 40, the processing of Step 1602 shown in FIG. 34 (processing carried out when touch start is detected at time processing is selected) will be described. When the event acquired from the touch sensor 13 is the touch start detection and the processing selection mode flag is ON (YES in Step 1601), the controller 11 stores the coordinates S obtained when the touch has been started in the storage 15 (Step 2201).

Figure 41:
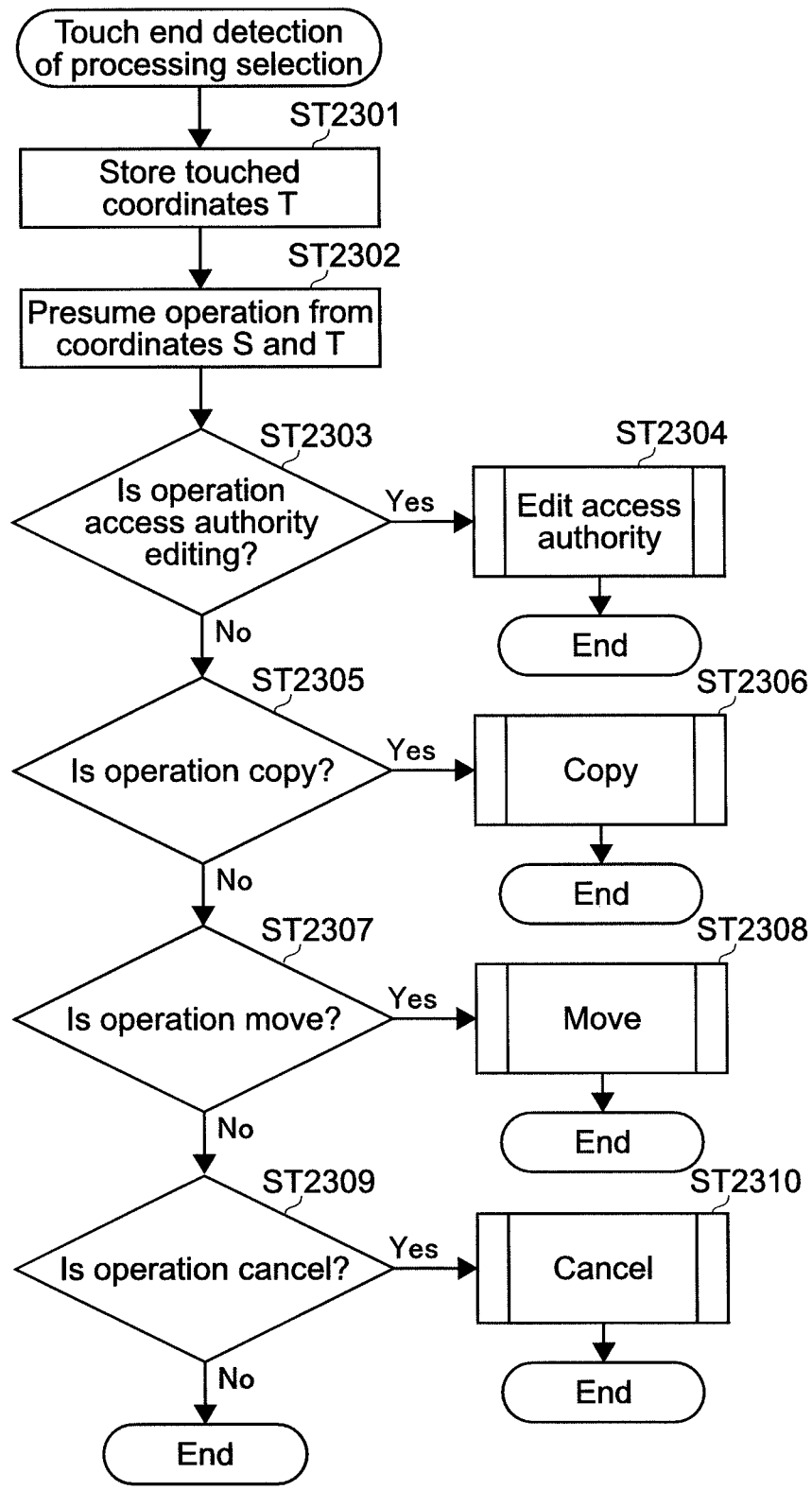
FIG. 41 is a flowchart showing processing of the tablet PC.

Referring to FIG. 41, the processing of Step 2002 shown in FIG. 38 (processing carried out when touch end is detected at time processing is selected) will be described. When the event acquired from the touch sensor 13 is the touch end detection and the processing selection mode flag is ON (YES in Step 2001), the controller 11 stores the coordinates T obtained when the touch has ended in the storage 15 (Step 2301).

Next, the controller 11 presumes what kind of a user operation has been made on the screen based on the coordinates S obtained when the touch has been started and the coordinates T obtained when the touch has ended (Step 2302).

The presumption of a user operation based on the coordinates S and T will be described. For example, when the coordinates S and T match and the coordinates S (coordinates T) match the display position of the access authority editing icon 6, the controller 11 presumes that the user operation is an operation for editing an access authority. In other words, the controller 11 presumes that the user operation is the operation for editing an access authority when a tap operation (or touch operation) is made with respect to the access authority editing icon 6.

For example, the controller 11 presumes that the user operation is an operation for copying a file when the line segment ST passes near the center of the closed curve 3 and is practically orthogonal to the line connecting the file icon 1 at the original drag position and the ghost icon 4. In other words, the controller 11 presumes that the user operation is an operation for copying a file when a flick operation is made with respect to the crack 5.

For example, the controller 11 presumes that the user operation is an operation for moving a file when the coordinates S are on the file icon 1 at the original drag position, the line segment ST is practically parallel to the line connecting the file icon 1 and the ghost icon 4, and the coordinates T are closer to the center of the closed curve 3 than the coordinates S. In other words, the controller 11 presumes that the user operation is the operation for moving a file when a flick operation is made with respect to the file icon 1 at the original drag position toward the ghost icon 4.

For example, the controller 11 presumes that the user operation is a cancel operation when the coordinates S are on the ghost icon 4, the line segment ST is practically parallel to the line connecting the file icon 1 and the ghost icon 4, and the coordinates T are closer to the center of the closed curve 3 than the coordinates S. In other words, the controller 11 presumes that the user operation is the cancel operation when a flick operation is made with respect to the ghost icon 4 toward the file icon 1 at the original drag position.

When judged that the presumed user operation is the operation for editing an access authority (YES in Step 2303), the controller 11 executes processing related to editing of an access authority with respect to a file to be copied or moved (Step 2304). When judged that the presumed user operation is the operation for copying a file (YES in Step 2305), the controller 11 executes processing related to a file copy (Step 2306).

When judged that the presumed user operation is the operation for moving a file (YES in Step 2307), the controller 11 executes processing related to a file movement (Step 2308). When judged that the presumed user operation is the cancel operation (YES in Step 2309), the controller 11 executes processing related to drag cancel (Step 2310).

Figure 42:
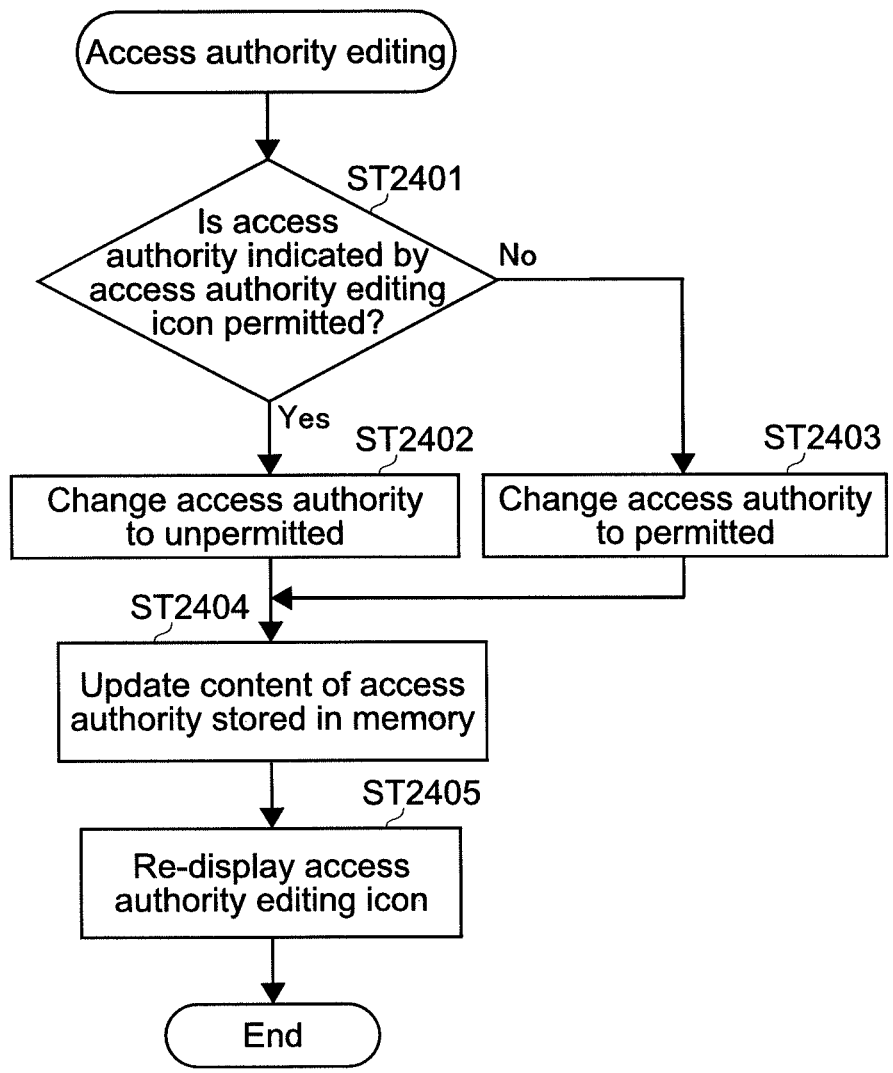
FIG. 42 is a flowchart showing processing of the tablet PC.

Referring to FIG. 42, the processing of Step 2304 shown in FIG. 41 (processing related to editing of access authority) will be described. When a tap operation with respect to the access authority editing icon 6 is detected (YES in Step 2303), the controller 11 judges whether the access authority indicated by the access authority editing icon 6 as the tap operation target is permitted (Step 2401).

When the access authority is permitted (YES in Step 2401), the controller 11 changes the access authority of the file to be copied or moved to unpermitted (Step 2402). On the other hand, when the access authority is unpermitted (NO in Step 2401), the controller 11 changes the access authority of the file to be copied or moved to permitted (Step 2403).

Next, the controller 11 updates the content of the access authority stored in the storage 15 according to the change of the access authority (Step 2404). Then, according to the access authority, the access authority editing icon 6 is displayed again (Step 2405).

Figure 50:
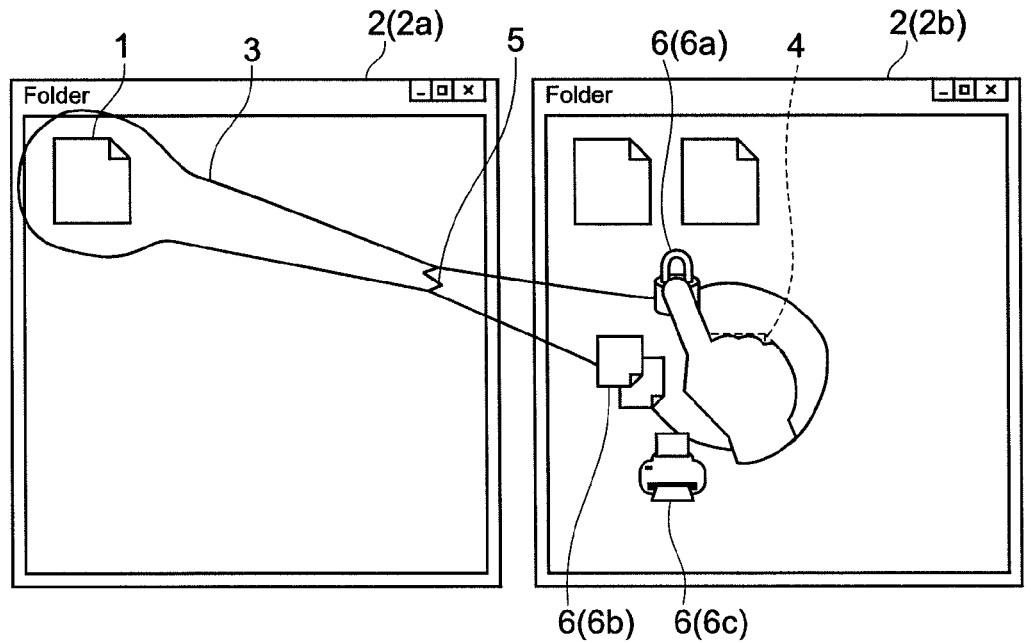
FIG. 50 is a diagram showing a state of the screen at the time the user taps the access authority editing icon with the finger.
Figure 51:
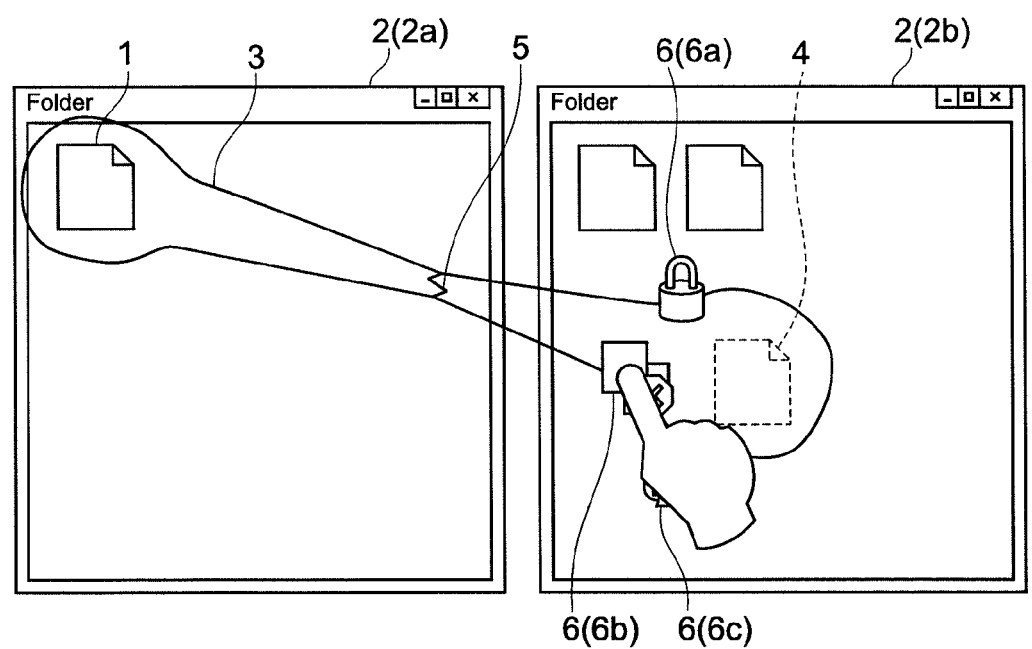
FIG. 51 is a diagram showing a state of the screen at the time the user taps the access authority editing icon with the finger.
Figure 52:
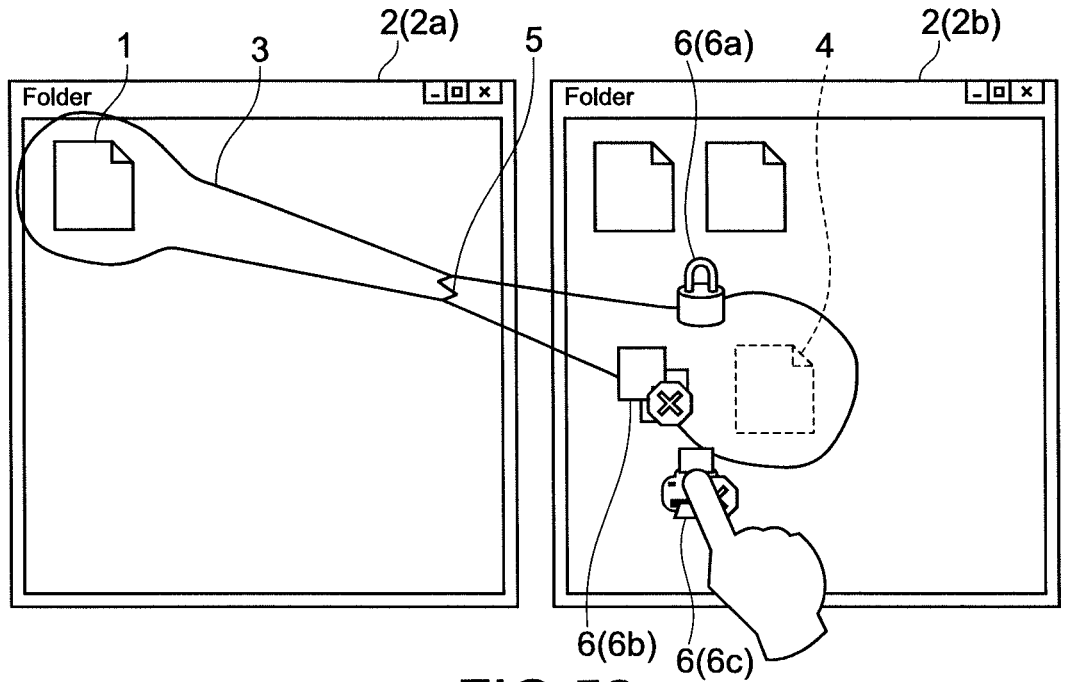
FIG. 52 is a diagram showing a state of the screen at the time the user taps the access authority editing icon with the finger.

FIGS. 50 to 52 each show a state where the user drags the file icon 1 in the folder 2a with a finger, positions the dragging finger on the folder 2b, releases the finger from the screen (see FIG. 49), and taps the access authority editing icon 6 with the same finger.

As shown in FIGS. 50 to 52, when the user taps the edit authority editing icon 6a, the copy authority editing icon 6b, or the print authority editing icon 6c with his/her finger, permitted/unpermitted of the access authority is inverted according to the tap operation (Steps 2401 to 2405).

Figure 43:
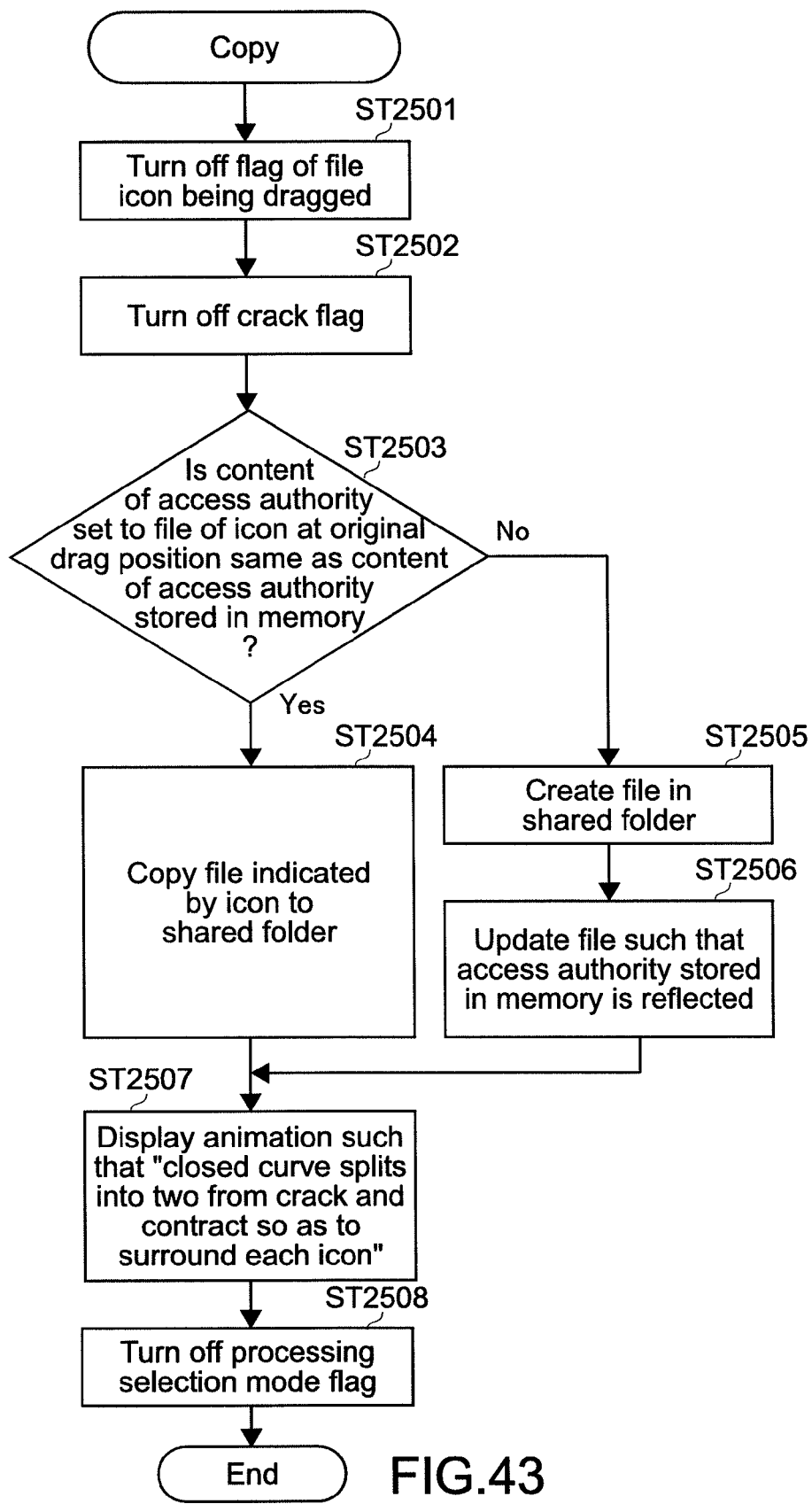
FIG. 43 is a flowchart showing processing of the tablet PC.

Referring to FIG. 43, the processing of Step 2306 shown in FIG. 41 (processing related to copy) will be described. When a flick operation with respect to the crack 5 is detected (YES in Step 2305), the controller 11 turns off the flag of the file icon being dragged (Step 2501). Next, the controller 11 turns off the crack flag (Step 2502).

Then, the controller 11 judges whether the content of the access authority set to the file of the file icon 1 at the original drag position is the same as the content of the access authority stored in the storage 15 (Step 2503). When the contents of the two access authorities are the same (YES in Step 2503), the controller 11 creates a copy of the file indicated by the file icon 1 at the original drag position in the shared folder (Step 2504).

On the other hand, when the contents of the two access authorities differ (NO in Step 2503), the controller 11 creates a new file in the shared folder (Step 2505). Then, the controller 11 updates the file such that the content of the access authority stored in the storage 15 (see Step 2404) is reflected (Step 2506). It should be noted that although this file has a different content of the access authority from the file indicated by the file icon 1 at the original drag position, the file content itself is the same as the file indicated by the file icon 1 at the original drag position.

Next, the controller 11 controls display on the screen such that the closed curve 3 splits from the crack 5 to be split into the first closed curve 3a surrounding the file icon 1 and the second closed curve 3b surrounding the ghost icon 4 (Step 2507). Then, the controller 11 controls display on the screen such that the first closed curve 3a contracts so as to surround the file icon 1 and the second closed curve 3b contracts so as to surround the ghost icon 4. At this time, the controller 11 controls display on the screen such that the access authority editing icon 6 fades out. Next, the controller 11 turns off the processing selection mode flag (Step 2508).

Figure 53:
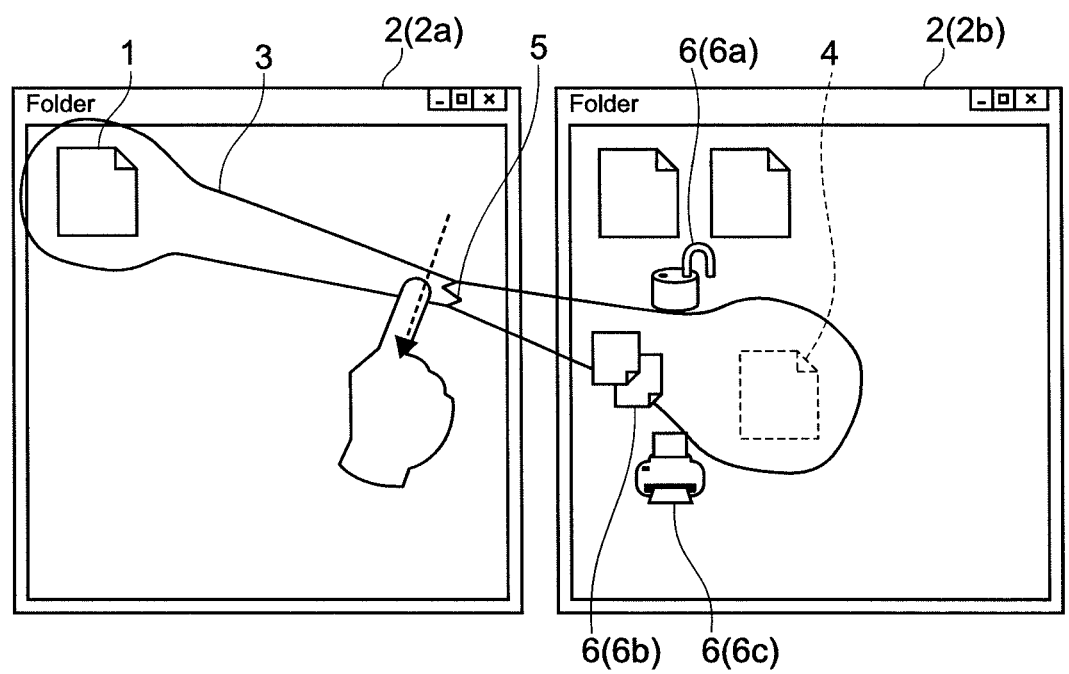
FIG. 53 is a diagram showing a state of the screen at the time the user flicks the crack with the finger.
Figure 54:
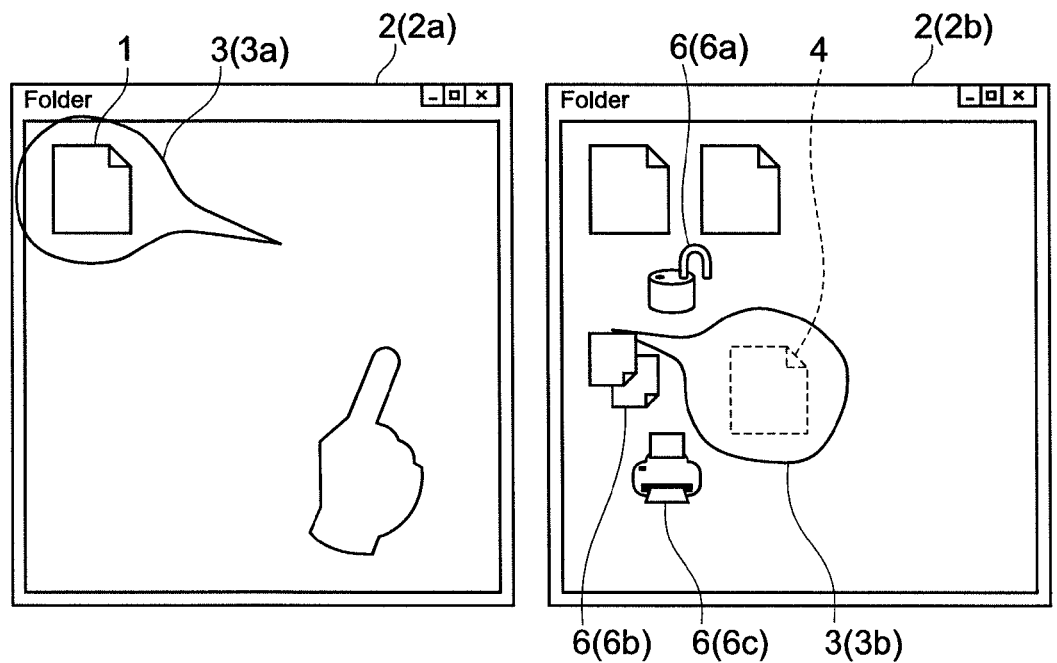
FIG. 54 is a diagram showing a state of the screen at the time the user flicks the crack with the finger.
Figure 55:
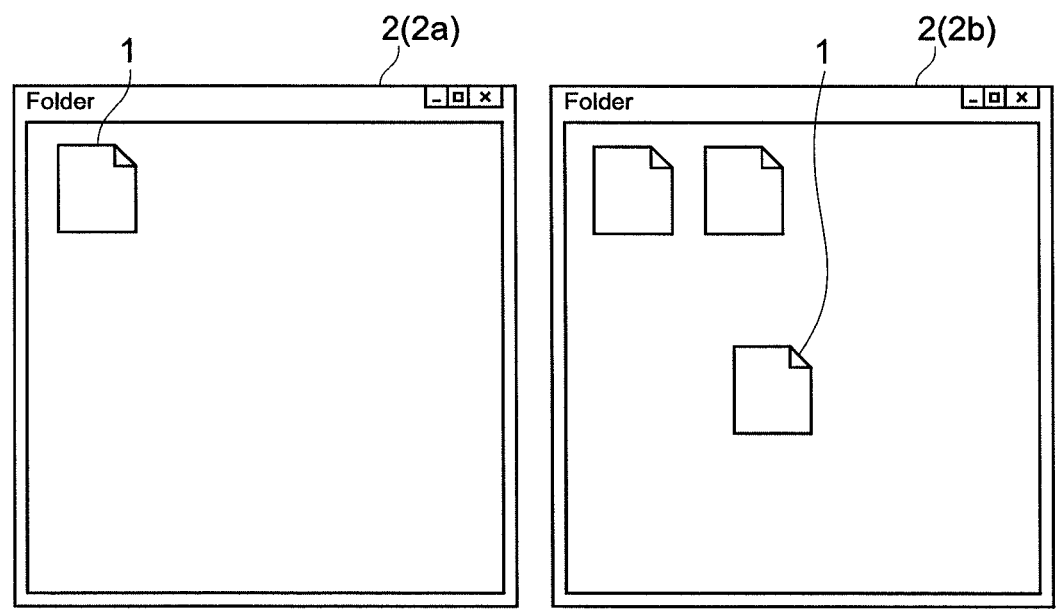
FIG. 55 is a diagram showing a state of the screen at the time the user flicks the crack with the finger.

FIGS. 53 to 55 each show a state of the screen at a time the user drags the file icon 1 in the folder 2a with a finger, positions the dragging finger on the folder 2b, releases the finger from the screen (see FIG. 49), and makes a flick operation with respect to the crack 5 with the same finger. FIGS. 53 to 55 each show an example where the user makes a flick operation with respect to the crack 5 without operating the access authority editing icon 6.

As shown in FIG. 53, when the user makes a flick operation with respect to the crack 5 with a finger, the closed curve 3 splits from the crack 5 to be split into the first closed curve 3a surrounding the file icon 1 and the second closed curve 3b surrounding the ghost icon 4 (YES in Step 2501 to YES in Step 2503 to Step 2508). Then, as shown in FIG. 54, the first closed curve 3a contracts so as to surround the file icon 1 at the original drag position and the second closed curve 3b contracts so as to surround the ghost icon 4. At this time, inside the tablet PC 100, processing of copying a file corresponding to the file icon 1 at the original drag position to the folder 2b (shared folder) is executed (Step 2504).

As shown in FIG. 55, the closed curve 3 eventually disappears from the screen, and the image indicating the file icon 1 is displayed in the folder 2b. At this time, the access authority editing icon 6 also disappears from the screen.

Figure 56:
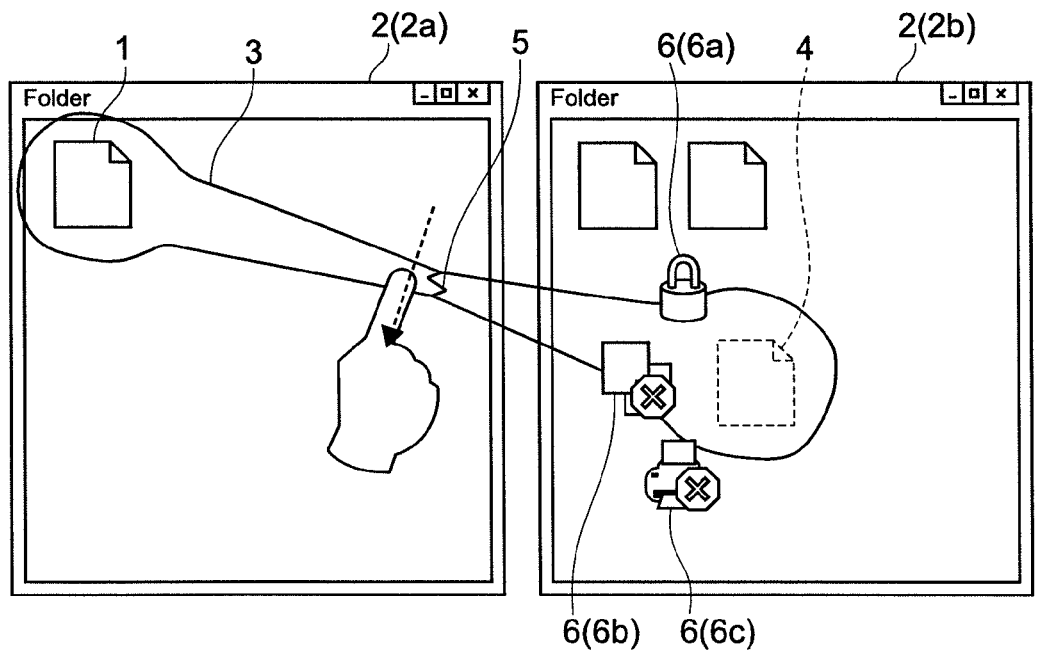
FIG. 56 is a diagram showing a state of the screen at the time the user flicks the crack with the finger.
Figure 57:
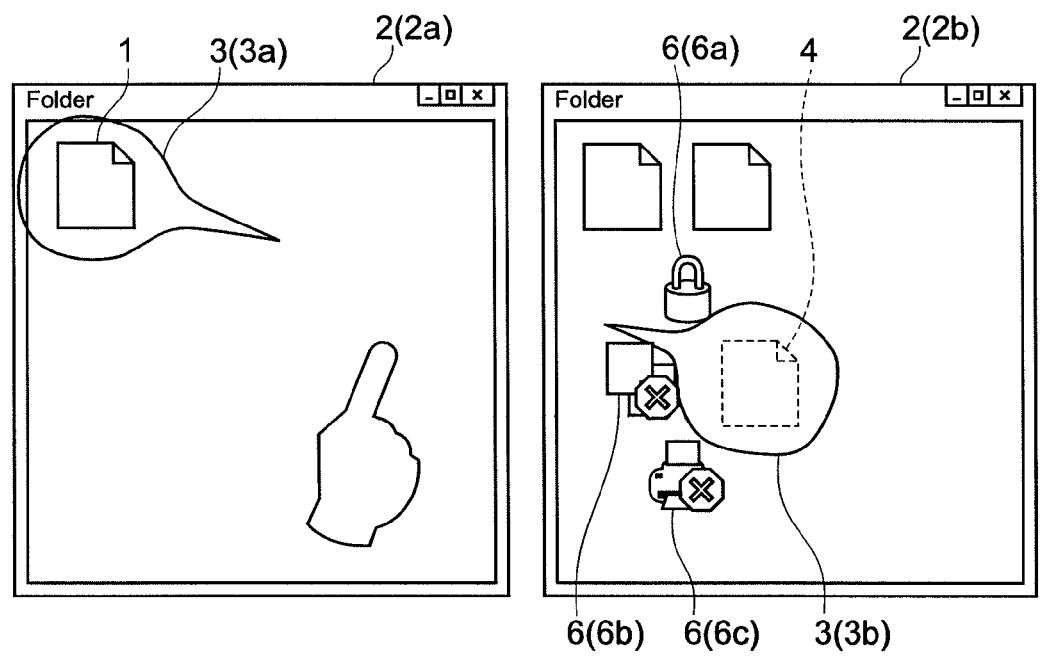
FIG. 57 is a diagram showing a state of the screen at the time the user flicks the crack with the finger.

FIGS. 56 and 57 each show a state of the screen at a time the user drags the file icon 1 in the folder 2a with a finger, positions the dragging finger on the folder 2b, releases the finger from the screen, and flicks the crack 5 with the same finger. FIGS. 56 and 57 each show an example where the user makes a flick operation with respect to the crack 5 after tapping the access authority editing icon 6 (see FIGS. 50 to 52).

As shown in FIG. 56, when the user makes a flick operation with respect to the crack 5 with a finger, the closed curve 3 splits from the crack 5 to be split into the first closed curve 3a surrounding the file icon 1 and the second closed curve 3b surrounding the ghost icon 4 (Step 2501 to NO in Step 2503 to Step 2508). Then, as shown in FIG. 57, the first closed curve 3a contracts so as to surround the file icon 1 at the original drag position and the second closed curve 3b contracts so as to surround the ghost icon 4. At this time, inside the tablet PC 100, a new file is created in the folder 2b (shared folder) (Step 2505). Then, the file is updated such that the content of the access authority stored in the storage 15 (see Step 2404) is reflected (Step 2506).

In the examples shown in FIGS. 56 and 57, the access authorities of the edit authority editing icon 6a, the copy authority editing icon 6b, and the print authority editing icon 6c are all "unpermitted". Therefore, in this case, a file having the same content as the file of the file icon 1 at the original drag position, for which the edit authority, copy authority, and print authority are set to unpermitted, is created in the folder 2b (shared folder).

Figure 44:
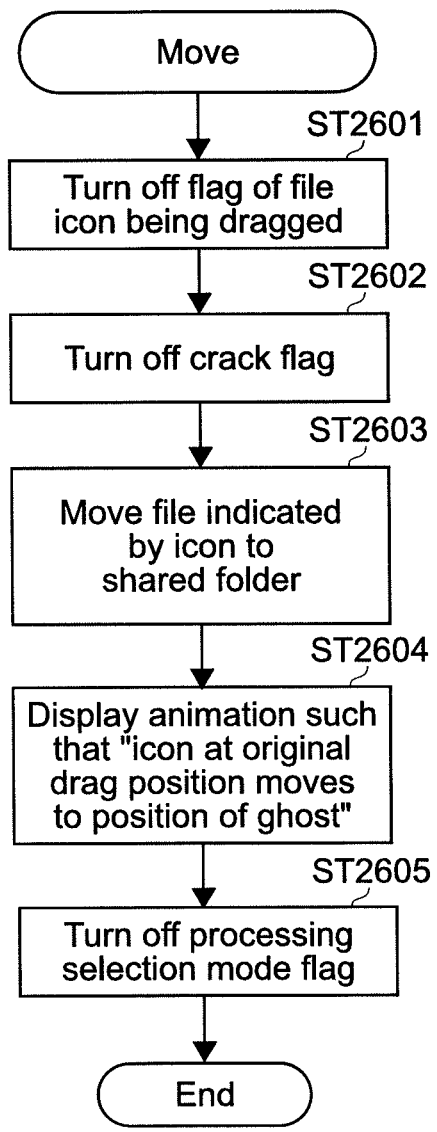
FIG. 44 is a flowchart showing processing of the tablet PC.

Next, referring to FIG. 44, the processing of Step 2308 shown in FIG. 41 (processing related to file movement) will be described. When a flick operation with respect to the file icon 1 is detected (YES in Step 2307), the controller 11 turns off the flag of the file icon being dragged (Step 2601). Then, the controller 11 turns off the crack flag (Step 2602).

Next, the controller 11 moves the file corresponding to the file icon 1 at the original drag position to the shared folder (Step 2603). Then, the controller 11 controls display on the screen such that the closed curve 3 contracts while the file icon 1 at the original drag position moves to the position of the ghost icon 4 (Step 2604). At this time, the controller 11 controls display on the screen such that the access authority editing icon 6 fades out. Next, the controller 11 turns off the processing selection mode flag (Step 2605).

A case where the content of the access authority set to the file of the file icon 1 at the original drag position and the content of the access authority stored in the storage 15 differ will be discussed. In this case, the controller 11 may create a file onto which the content of the access authority stored in the storage 15 is reflected in the shared folder.

Figure 58:
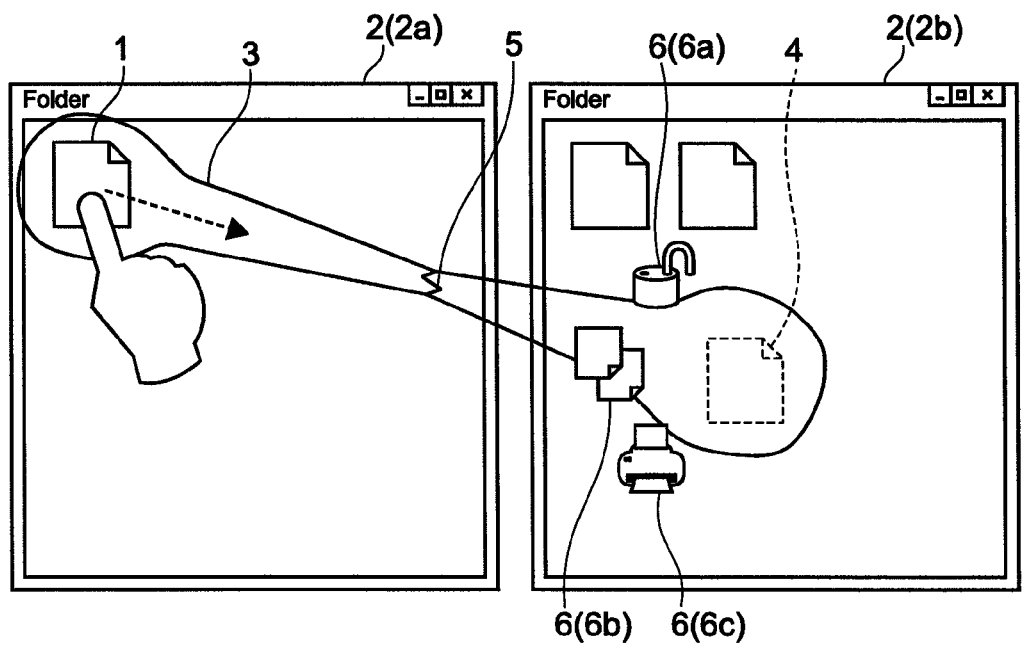
FIG. 58 is a diagram showing a state of the screen at the time the user flicks the file icon at the original drag position toward the ghost icon with the finger.
Figure 59:
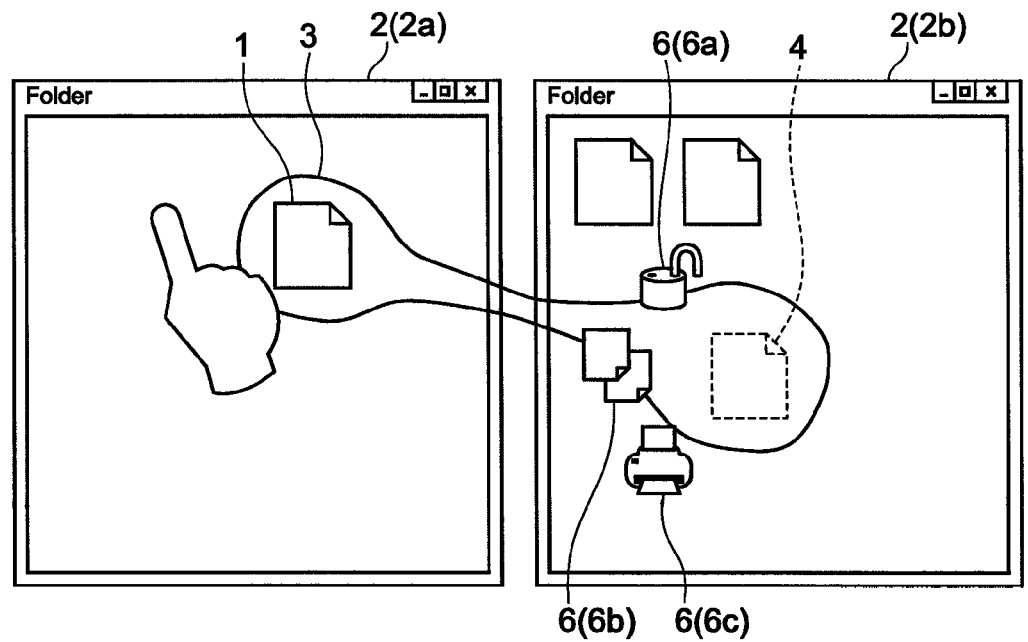
FIG. 59 is a diagram showing a state of the screen at the time the user flicks the file icon at the original drag position toward the ghost icon with the finger.
Figure 60:
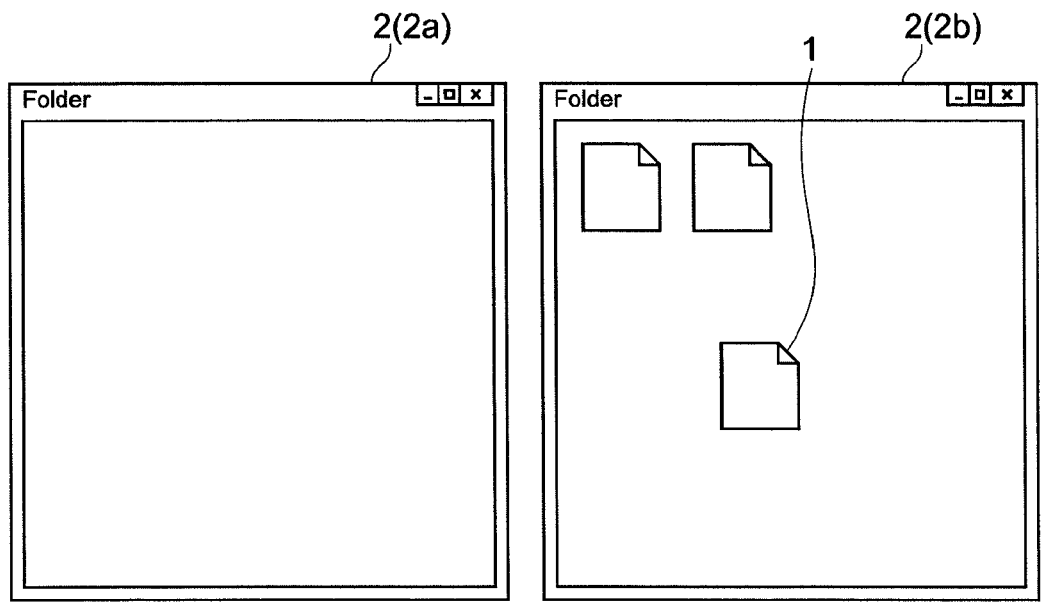
FIG. 60 is a diagram showing a state of the screen at the time the user flicks the file icon at the original drag position toward the ghost icon with the finger.

FIGS. 58 to 60 each show a state of the screen at a time the user drags the file icon 1 in the folder 2a with a finger, positions the dragging finger on the folder 2b, releases the finger from the screen, and flicks the file icon 1 at the original drag position with the same finger.

As shown in FIG. 58, when the user flicks the file icon 1 at the original drag position toward the ghost icon 4 with a finger, the closed curve 3 contracts while the file icon 1 moves to the position of the ghost icon 4 as shown in FIG. 59 (Step 2604). At this time, inside the tablet PC 100, processing of moving a file corresponding to the file icon 1 from the folder 2a to the folder 2b is executed (Step 2603).

As shown in FIG. 60, after the file icon 1 is moved to the position of the ghost icon 4, the file icon 1 and the ghost icon 4 overlap so that the ghost icon 4 disappears, and the closed curve 3 also disappears from the screen. At this time, the access authority editing icon 6 also disappears from the screen.

Figure 45:
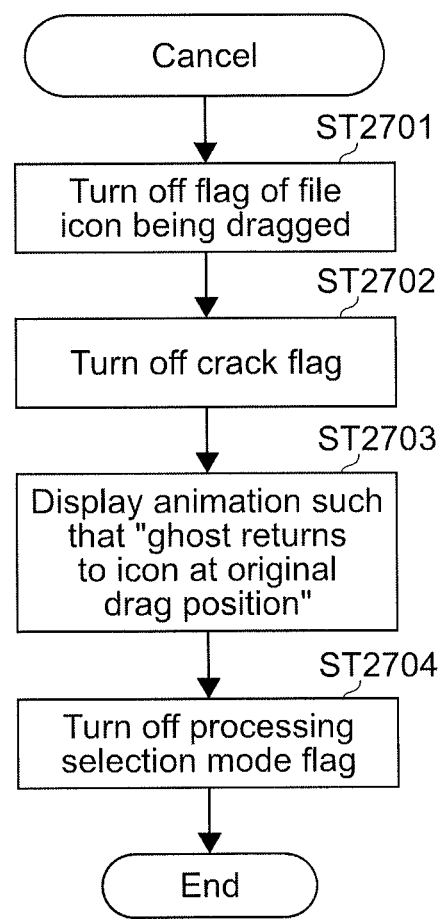
FIG. 45 is a flowchart showing processing of the tablet PC.

Referring to FIG. 45, the processing of Step 2310 shown in FIG. 41 (processing related to drag cancel) will be described. When a flick operation with respect to the ghost icon 4 toward the file icon 1 at the original drag position is detected (YES in Step 2309), the controller 11 turns off the flag of the file icon being dragged (Step 2701). Next, the controller 11 turns off the crack flag (Step 2702).

Then, the controller 11 controls display on the screen such that the closed curve 3 contracts while the ghost icon 4 moves to the position of the file icon 1 at the original drag position (Step 2703). At this time, the controller 11 controls display on the screen such that the access authority editing icon 6 fades out. Next, the controller 11 turns off the processing selection mode flag (Step 2704).

Figure 61:
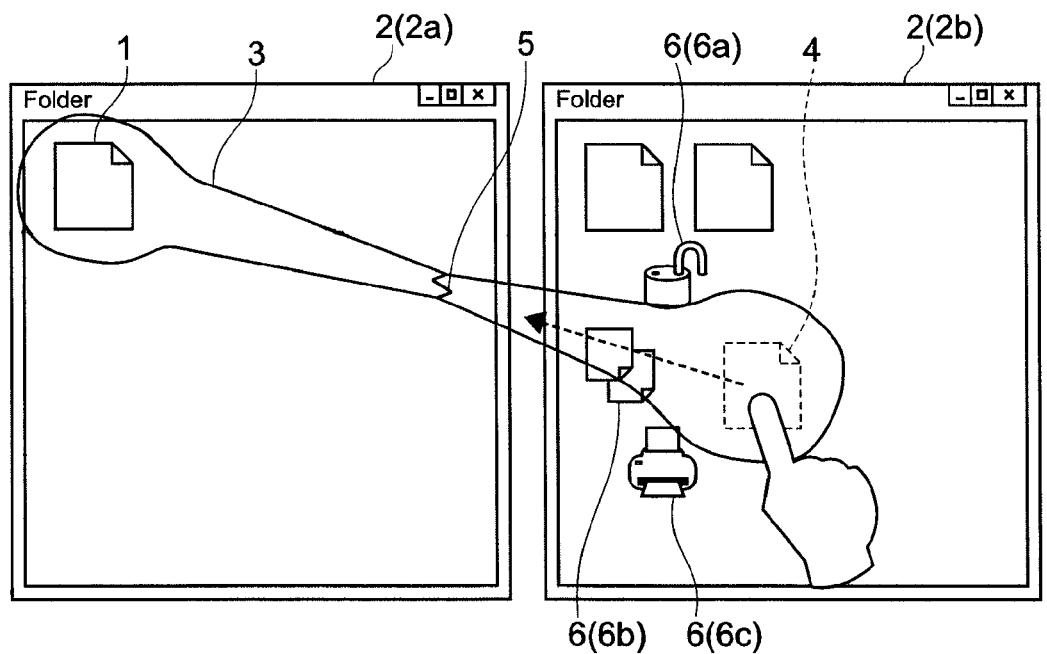
FIG. 61 is a diagram showing a state of the screen at the time the user flicks the ghost icon toward the file icon at the original drag position with the finger.
Figure 62:
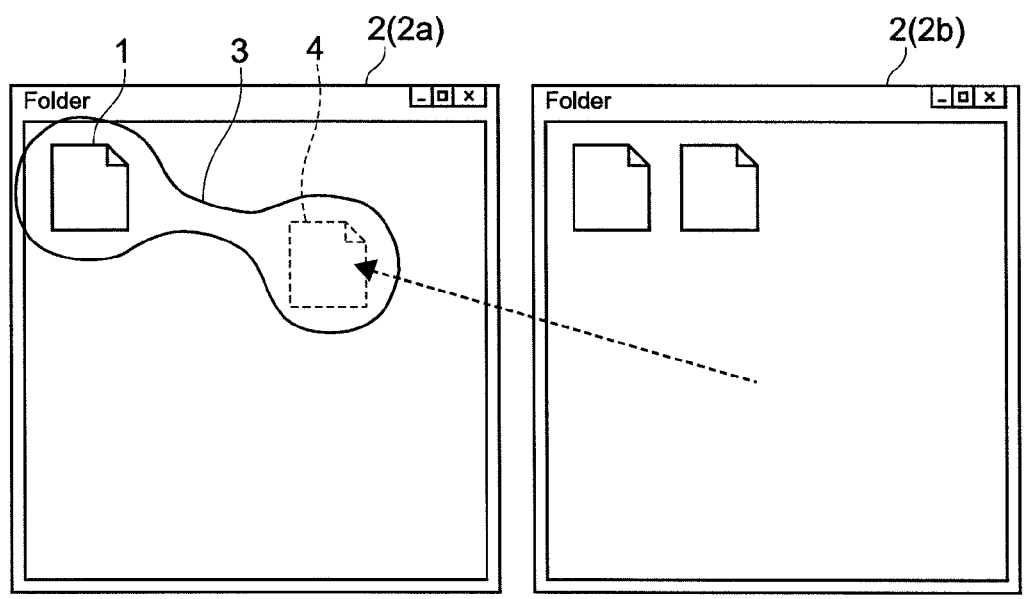
FIG. 62 is a diagram showing a state of the screen at the time the user flicks the ghost icon toward the file icon at the original drag position with the finger.

FIGS. 61 and 62 each show a state of the screen at a time the user drags the file icon 1 in the folder 2a with a finger, positions the dragging finger on the folder 2b, releases the finger from the screen, and makes a flick operation with respect to the ghost icon 4 with the same finger.

As shown in FIG. 61, when the user makes a flick operation with respect to the ghost icon 4 toward the file icon 1 at the original drag position with a finger, the closed curve 3 contracts while the ghost icon 4 moves to the position of the file icon 1 at the original drag position as shown in FIG. 62 (Step 2703). At this time, the access authority editing icon 6 disappears from the screen. After the ghost icon 4 is moved to the position of the file icon 1 at the original drag position, the file icon 1 and the ghost icon 4 overlap so that the ghost icon 4 disappears, and the closed curve 3 also disappears from the screen.

By the processing as described above, it becomes possible to cope with the electronic apparatus 100 such as the tablet PC 100 adopting a single-touch system.

Various Modified Examples

In the above embodiments, the descriptions have been given on the case where permitted/unpermitted of an access authority set to a file to be copied or moved is changed according to a tap operation with respect to the access authority editing icon 6. However, the processing of changing permitted/unpermitted of an access authority is not limited thereto.

For example, the processing of changing the access authority may be executed when a user operation of moving the access authority editing icon 6 away from the ghost icon 4 is made.

Figure 63:
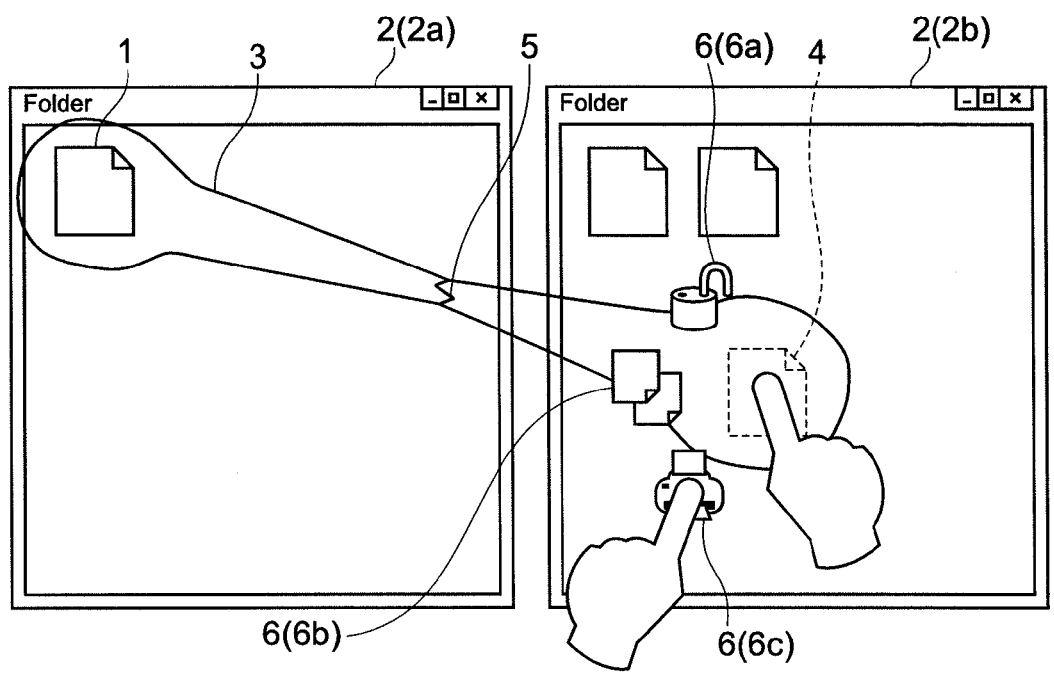
FIG. 63 is a diagram showing a state of the screen in a case where the user flicks the access authority editing icon with the finger of the other hand in a direction that draws apart from the ghost icon.
Figure 64:
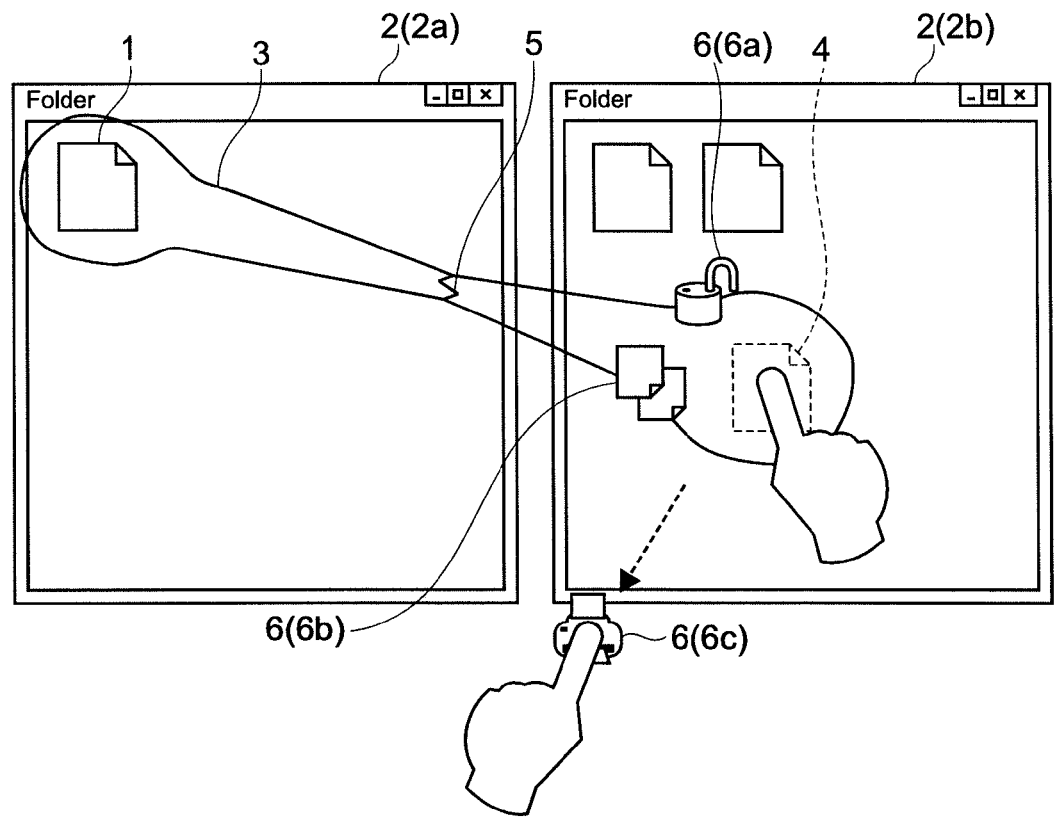
FIG. 64 is a diagram showing a state of the screen in the case where the user flicks the access authority editing icon with the finger of the other hand in the direction that draws apart from the ghost icon.
Figure 65:
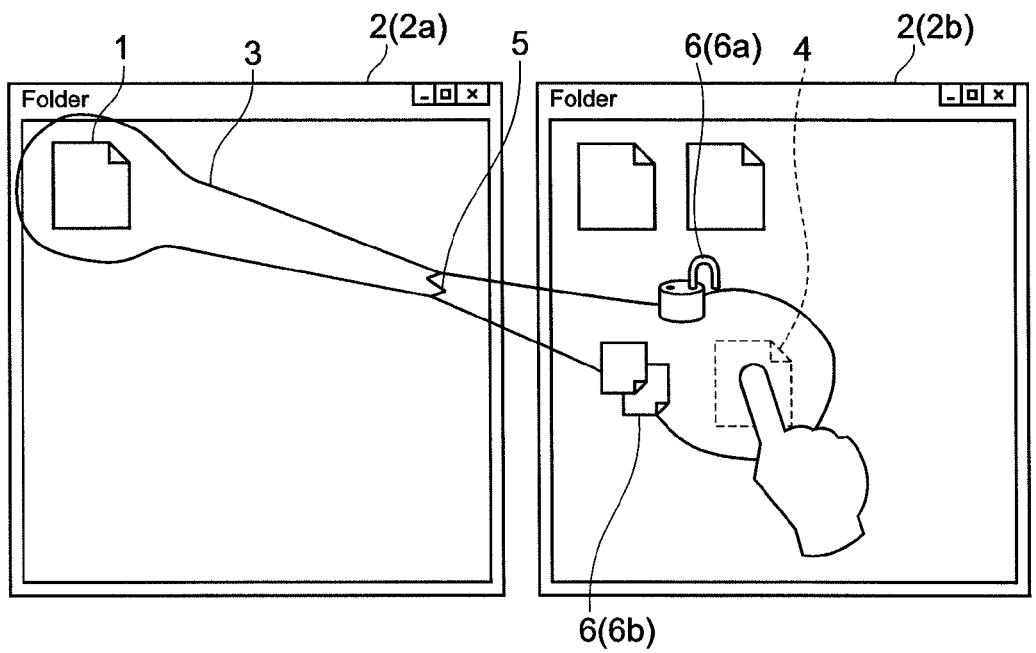
FIG. 65 is a diagram showing a state of the screen in the case where the user flicks the access authority editing icon with the finger of the other hand in the direction that draws apart from the ghost icon.
Figure 66:
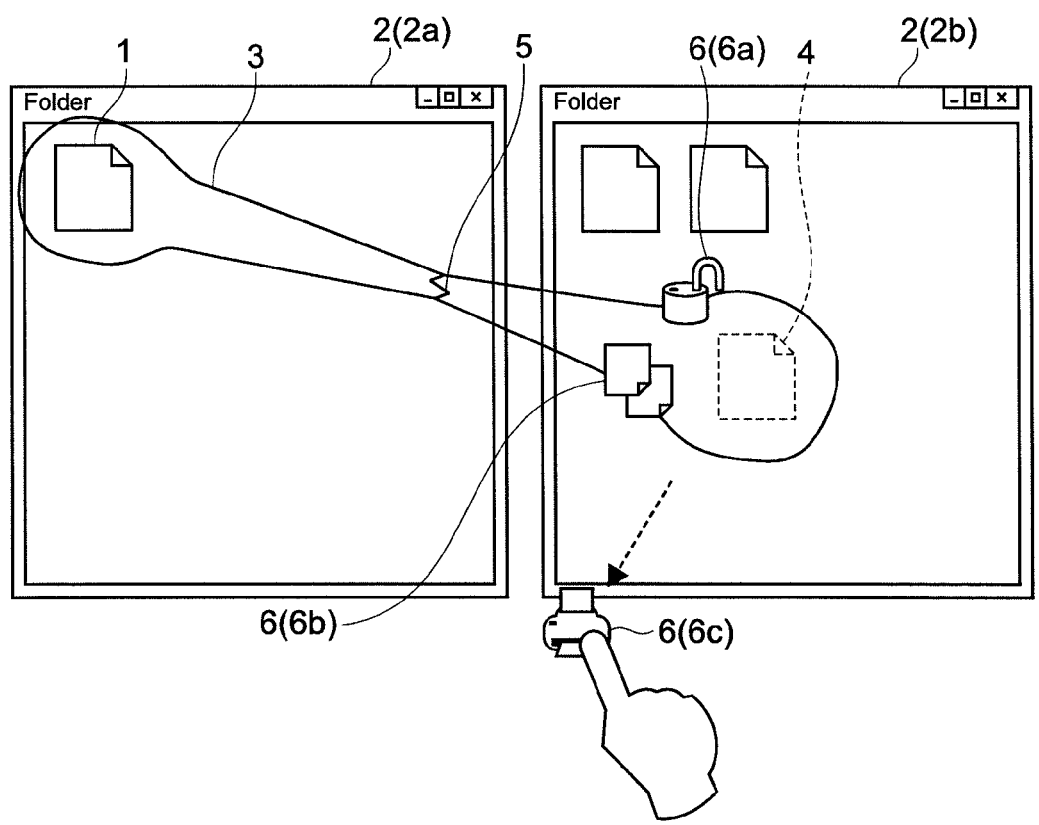
FIG. 66 is a diagram showing a state of the screen in the case where the user flicks the access authority editing icon with the finger in the direction that draws apart from the ghost icon.

FIGS. 63 to 66 each show an example of a case where, when a user operation of moving the access authority editing icon 6 away from the ghost icon 4 is made, the access authority is changed according to the user operation. FIGS. 63 to 65 show an example where a multi-touch system is adopted, and FIG. 66 shows an example where a single-touch system is adopted.

Referring to FIG. 63, when the user drags the file icon 1 in the folder 2a with a finger of one hand and positions the dragging finger on the folder 2b (shared folder), the access authority editing icon 6 is displayed in the vicinity of the ghost icon 4. FIG. 63 shows an example where the edit authority editing icon 6a, the copy authority editing icon 6b, and the print authority editing icon 6c are displayed in the stated order from the upper side.

While the access authority editing icon 6 is displayed in the vicinity of the ghost icon 4, the access authority is "permitted". Therefore, in the example shown in FIG. 63, the edit authority, the copy authority, and the print authority are all "permitted".

As shown in FIG. 64, the user flicks the access authority editing icon 6 in a direction that draws apart from the ghost icon 4. The controller 11 controls display on the screen such that the access authority editing icon 6 moves away from the ghost icon 4 according to the flick operation. As shown in FIG. 65, the flicked access authority editing icon 6 disappears from the screen.

In this case, the controller 11 changes the access authority corresponding to the flicked access authority editing icon 6 from permitted to unpermitted. In FIG. 65, since the print authority editing icon 6c is flicked and disappears from the screen, the print authority is changed from permitted to unpermitted. The user only needs to arbitrarily select the access authority editing icon 6 that the user wishes to set to unpermitted from the plurality of access authority editing icons 6 and flick that access authority editing icon 6.

After that, by the user flicking the crack 5 with a finger of the other hand, a file onto which the access authority selected by the user is reflected is copied in the folder 2b. On the other hand, by the user flicking the file icon 1 at the original drag position toward the ghost icon 4 with a finger of the other hand, a file onto which the access authority selected by the user is reflected is moved to the folder 2b.

Referring to FIG. 66, in the case of the single-touch system, the user drags the file icon 1 in the folder 2a with a finger, positions the dragging finger on the folder 2b (shared folder), and releases the finger from the screen (drop). After that, the user only needs to arbitrarily select the access authority editing icon 6 that the user wishes to set to unpermitted from the plurality of access authority editing icons 6 and flick that access authority editing icon 6.

Conversely, processing of changing the access authority may be executed when the user operation of moving the access authority editing icon 6 closer to the ghost icon 4 is made unlike the examples shown in FIGS. 63 to 66.

Figure 67:
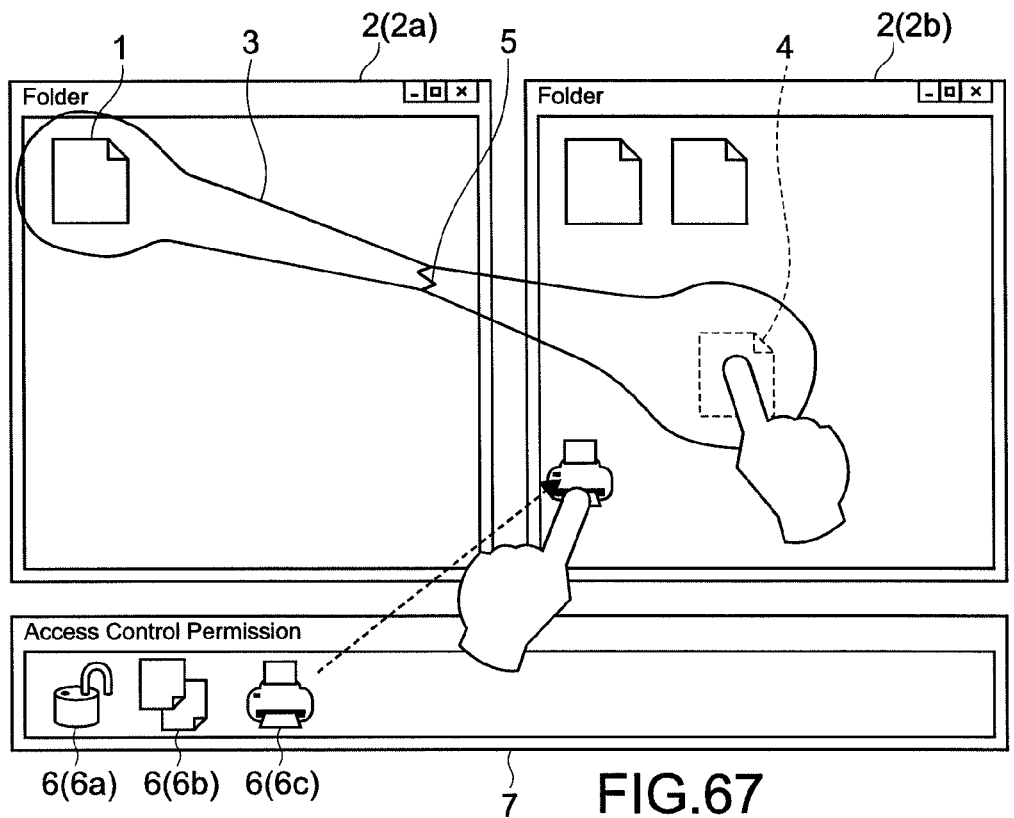
FIG. 67 is a diagram showing a state of the screen in the case where the user drags the access authority editing icon with the finger of the other hand in a direction that approaches the ghost icon.
Figure 68:
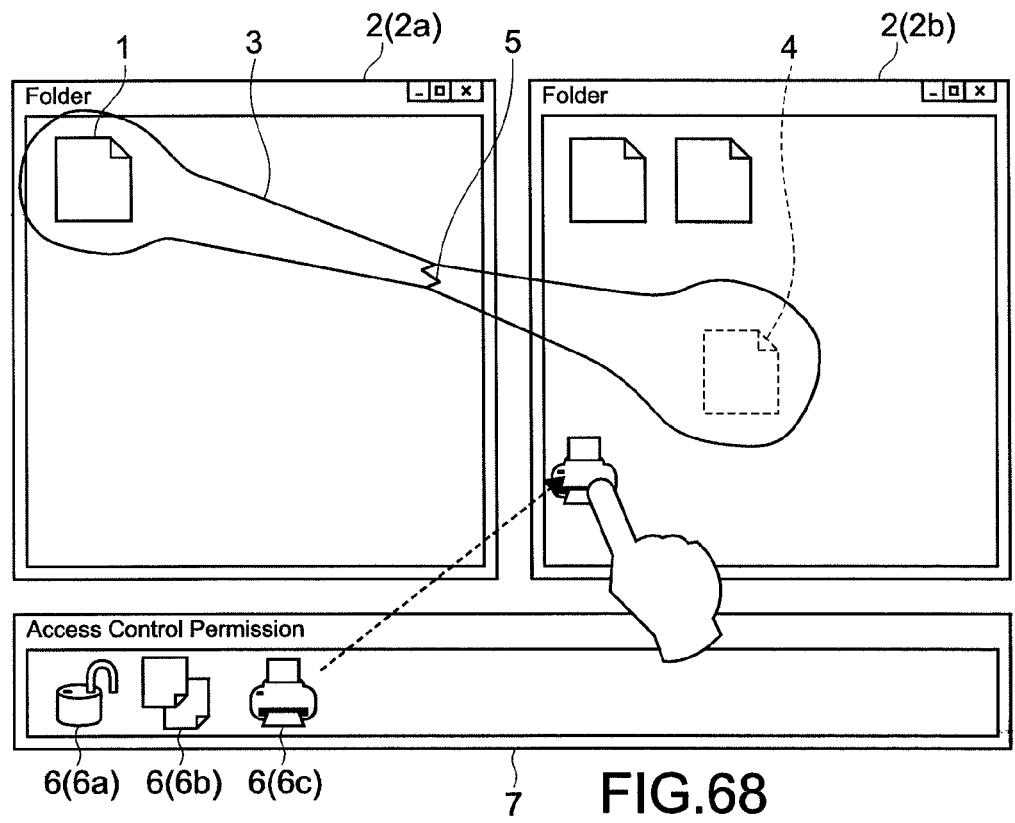
FIG. 68 is a diagram showing a state of the screen in the case where the user drags the access authority editing icon with the finger in the direction that approaches the ghost icon.

FIGS. 67 and 68 each show an example of a case where, when a user operation of moving the access authority editing icon 6 closer to the ghost icon 4 is made, the access authority is changed according to the user operation. FIG. 67 shows an example where a multi-touch system is adopted, and FIG. 68 shows an example where a single-touch system is adopted.

Referring to FIG. 67, when the user drags the file icon 1 in the folder 2a with a finger of one hand and positions the dragging finger on the folder 2b, a palette window 7 that stores the access authority editing icon 6 is displayed by the processing of the controller 11.

When the user drags the access authority editing icon 6 in the palette window 7, positions the dragging finger in the vicinity of the ghost icon 4, and releases the finger from the screen (drop), the access authority corresponding to the dragged access authority editing icon 6 is changed from unpermitted to permitted under control of the controller 11. The user only needs to arbitrarily select the access authority editing icon 6 that the user wishes to set to permitted from the plurality of access authority editing icons 6 and drag that access authority editing icon 6.

Referring to FIG. 68, in the case of a single-touch system, the user drags the file icon 1 in the folder 2a with a finger, positions the dragging finger on the folder 2b (shared folder), and releases the finger from the screen (drop). After that, the user only needs to arbitrarily select the access authority editing icon 6 that the user wishes to set to permitted from the plurality of access authority editing icons 6 and drag that access authority editing icon 6.

Also in the examples shown in FIGS. 63 to 68, as in the embodiments above, by operating the access authority editing icon 6, the user can intuitively and easily change a state of an access authority with respect to a file to be copied or moved.

The descriptions above have been given on the case where a single file icon 1 is a target of a drag operation. However, it is also possible to collectively copy or move a plurality of file icons 1 or collectively change access authorities with respect to the plurality of file icons 1.

Figure 69:
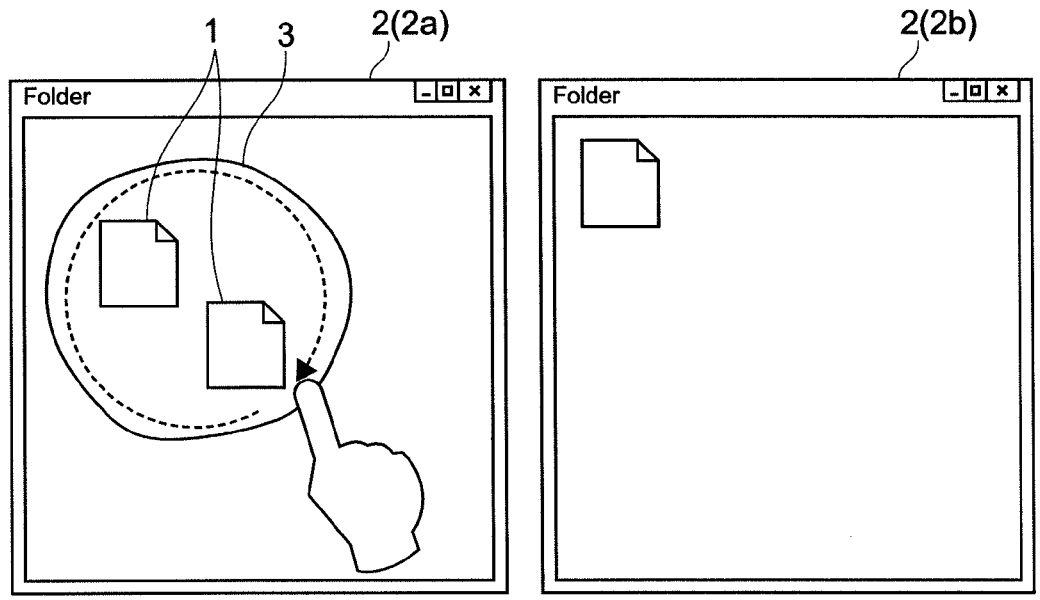
FIG. 69 is a diagram showing an example of a case where a plurality of file icons become targets of the drag operation.
Figure 70:
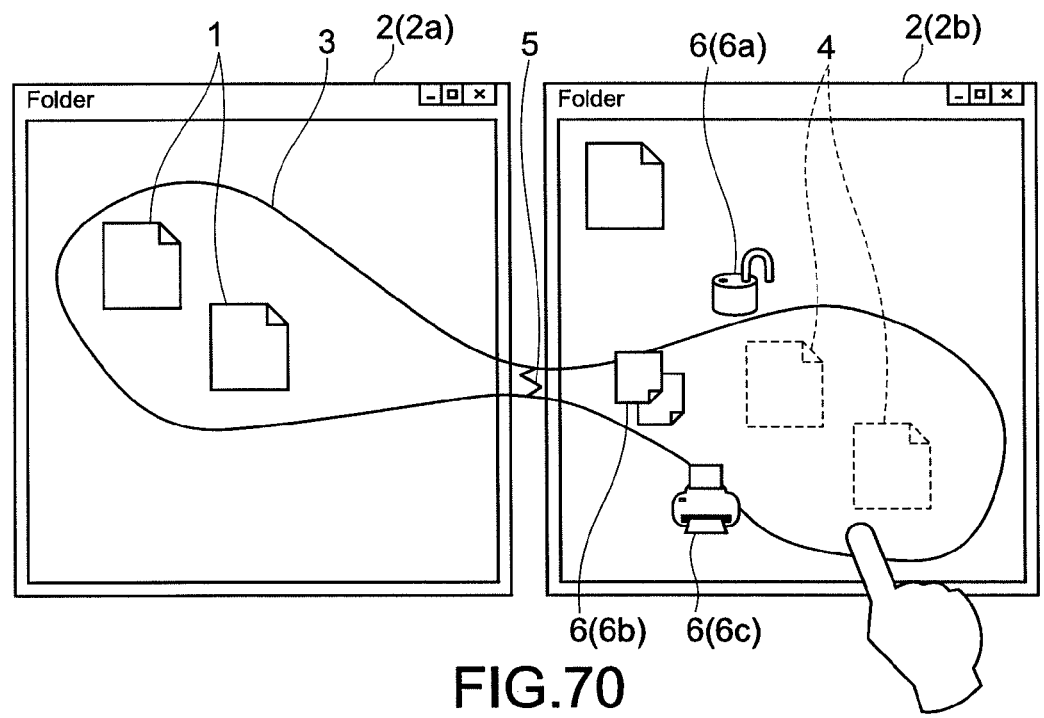
FIG. 70 is a diagram showing an example of the case where the plurality of file icons become the targets of the drag operation.
Figure 71:
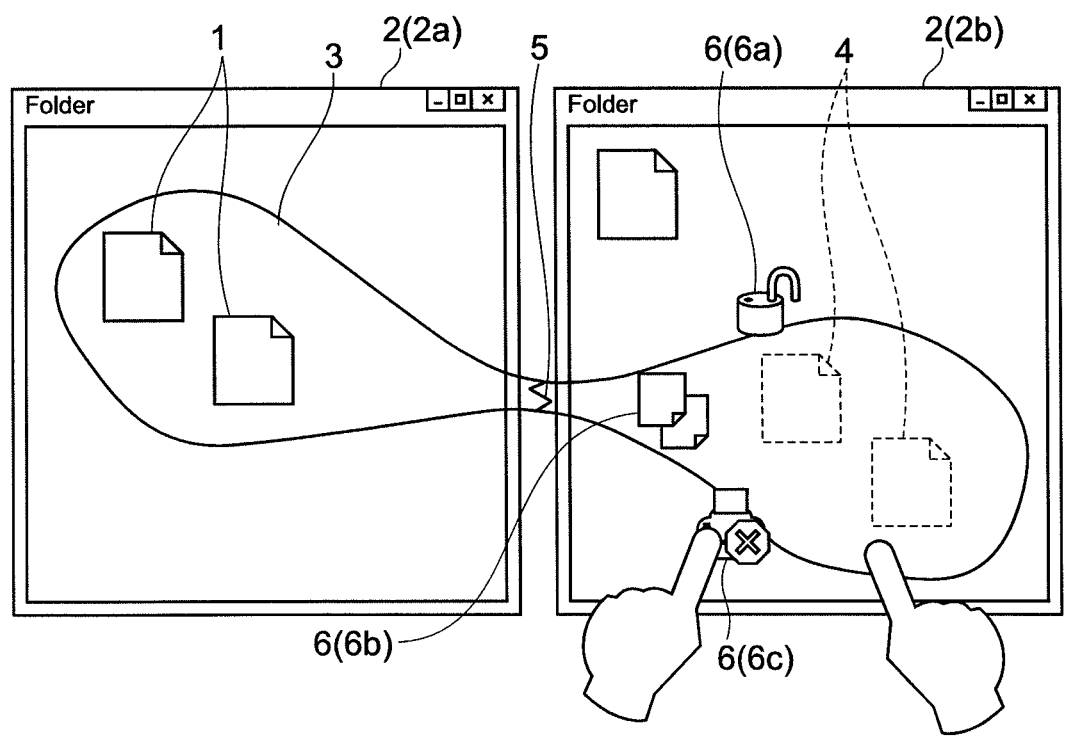
FIG. 71 is a diagram showing an example of the case where the plurality of file icons become the targets of the drag operation.

FIGS. 69 to 71 are each a diagram showing an example of a case where the plurality of file icons 1 are a target of a drag operation.

As shown in FIG. 69, when the user makes an operation on the screen so as to surround the plurality of file icons 1 with a finger of one hand, the plurality of file icons 1 are selected, and the closed curve 3 surrounding the plurality of file icons 1 is displayed under control of the controller 11. When the user slides the finger without releasing it from the screen (drag), a plurality of ghost icons 4 are displayed at the drag position while the plurality of file icons 1 are displayed at the original drag position under control of the controller 11. Further, the closed curve 3 surrounding the plurality of file icons 1 and the plurality of ghost icons 4 is displayed.

As shown in FIG. 70, when the drag position is within an area where a file can be copied or moved, the crack 5 is displayed in the closed curve 3. Moreover, when the drag position is within an area where a file can be opened, the access authority editing icon 6 is displayed in the vicinity of the ghost icon 4. When the user flicks the crack 5 with a finger of the other hand, the plurality of files are copied to the folder 2b at the same time. When the user flicks the plurality of file icons 1 at the original drag position toward to the plurality of ghost icons 4 with a finger of the other hand, the plurality of files are moved to the folder 2b at the same time.

As shown in FIG. 71, when the user taps a position at which the access authority editing icon 6 is displayed with a finger of the other hand, access authorities with respect to the plurality of files to be copied or moved are changed at the same time. When a user operation of moving the access authority editing icon 6 away from the ghost icon 4 is made, processing of changing the access authorities at the same time may be executed according to the user operation (see FIGS. 63 to 66). Alternatively, the processing of changing the access authorities at the same time may be executed when a user operation of moving the access authority editing icon 6 close to the ghost icon 4 is made (see FIGS. 67 and 68).

Although the descriptions have been given on the case where the multi-touch system is adopted in the case where the plurality of file icons 1 are a target of the drag operation, such a case can of course be realized by a single-touch system.

In the examples above, the descriptions have been given while taking the file icon 1 as an example of a data icon to be a target of a drag operation. However, the data icon to be a target of a drag operation may be a file icon 1 indicating a file or a folder icon indicating a folder.

In the examples above, the closed curve 3 has been round as a whole. However, the shape of the closed curve 3 is not limited thereto, and the closed curve 3 may take, for example, a rectangular shape. Moreover, in the examples above, the case where the crack 5 is displayed in the closed curve 3 has been described as an example of the case where the display state of the closed curve 3 changes. However, the change of the display state is not limited thereto, and processing of emphasizing the closed curve 3 or processing of changing a color of the closed curve 3 may be executed according to the drag position of the file icon 1.

In the examples above, the descriptions have been given assuming that the access authority editing icon 6 is displayed when the drag position of the file icon 1 is within an area on the screen where a file can be copied or moved (and within area on screen where file can be opened). However, the access authority editing icon 6 does not always need to be displayed at such a timing. For example, the access authority editing icon 6 may be displayed at a timing the drag of the file icon 1 is started.

In the embodiments above, the tablet PC 100 has been taken as an example of the electronic apparatus 100. However, the electronic apparatus 100 is not limited to the tablet PC 100. Other examples of the electronic apparatus 100 include a desktop PC, a laptop PC, a cellular phone, a portable music player, and a digital camera.

The present disclosure may also take the following structures.

(1) An electronic apparatus, including:
a display unit including a screen;
a sensor configured to detect a user operation with respect to the screen and output a signal corresponding to the user operation; and
a controller configured to cause a data icon to be displayed on the screen, judge a drag operation with respect to the data icon based on the signal from the sensor, judge, based on the signal from the sensor, a user operation different from the drag operation for one of copying and moving data related to the data icon based on the drag operation, and execute processing for one of copying and moving the data according to the user operation.

(2) The electronic apparatus according to (1),
in which the controller causes, while causing the data icon to be displayed at an original drag position, a copy of the data icon to be displayed at a drag position according to the drag operation with respect to the data icon, judges a user operation with respect to a position between the data icon and the copy of the data icon, and executes the processing of copying the data when the user operation is made.

(3) The electronic apparatus according to (2),
in which the controller causes a closed curve surrounding the data icon and the copy of the data icon to be displayed according to the drag operation with respect to the data icon, judges whether the drag position is within an area on the screen where the data can be copied, and changes a display state of the closed curve when the drag position is within the area.

(4) The electronic apparatus according to (3),
in which the controller judges the user operation with respect to the position between the data icon and the copy of the data icon in the closed curve in a state where the display state of the closed curve is changed, and executes processing of copying the data to a location on a computer corresponding to the area when the user operation is made.

(5) The electronic apparatus according to (4),
in which the controller controls display such that, when the user operation with respect to the position between the data icon and the copy of the data icon in the closed curve is made, the closed curve is separated into a first closed curve surrounding the data icon and a second closed curve surrounding the copy of the data icon.

(6) The electronic apparatus according to (5),
in which the controller controls display such that the first closed curve and the second closed curve contract according to a progress state of the data copy.

(7) The electronic apparatus according to any one of (3) to (6),
in which the controller changes, when the drag position is within the area, the display state of the closed curve such that a crack is displayed in the closed curve at the position between the data icon and the copy of the data icon.

(8) The electronic apparatus according to any one of (2) to (7),
in which the controller judges a flick operation with respect to the position between the data icon and the copy of the data icon and executes the processing of copying the data when the flick operation is made.

(9) The electronic apparatus according to (1),
in which the controller causes, while causing the data icon to be displayed at an original drag position, a copy of the data icon to be displayed at a drag position according to the drag operation with respect to the data icon, judges a user operation with respect to the data icon displayed at the original drag position, and executes the processing of moving the data when the user operation is made.

(10) The electronic apparatus according to (9),
in which the controller causes a closed curve surrounding the data icon and the copy of the data icon to be displayed according to the drag operation with respect to the data icon, judges whether the drag position is within an area on the screen where the data can be moved, and changes a display state of the closed curve when the drag position is within the area.

(11) The electronic apparatus according to (10),
in which the controller judges the user operation with respect to the data icon in a state where the display state of the closed curve is changed, and executes processing of moving the data to a location on a computer corresponding to the area when the user operation is made.

(12) The electronic apparatus according to (11),
in which the controller controls display on the screen such that, when the user operation with respect to the data icon is made, the closed curve contracts while the data icon is moved to a position of the copy of the data icon.

(13) The electronic apparatus according to (12),
in which the controller controls display such that the closed curve contracts while the data icon is moved according to a progress state of the data movement.

(14) The electronic apparatus according to any one of (9) to (13),
in which the controller judges a flick operation with respect to the data icon displayed at the original drag position toward the copy of the data icon and executes the processing of moving the data when the flick operation is made.

(15) The electronic apparatus according to any one of (1) to (14),
in which the controller causes an access authority editing icon for editing an access authority with respect to data to be one of copied and moved to be displayed according to the drag operation with respect to the data icon, judges a user operation with respect to the access authority editing icon based on the signal from the sensor, and changes a state of the access authority with respect to the data to be one of copied and moved according to the user operation.

(16) The electronic apparatus according to (15),
in which the controller judges whether a drag position of the drag operation with respect to the data icon is within an area on the screen where the data can be one of copied and moved and causes the access authority editing icon to be displayed on the screen when the drag position is within the area.

(17) A program that causes an electronic apparatus to execute the steps of:
detecting a user operation with respect to a screen of a display unit;
outputting a signal corresponding to the user operation;
displaying a data icon on the screen;
judging a drag operation with respect to the data icon based on the signal;
judging, based on the signal, a user operation different from the drag operation for one of copying and moving data related to the data icon based on the drag operation; and
executing processing for one of copying and moving the data according to the user operation.

(18) A control method, including:
detecting a user operation with respect to a screen of a display unit;
outputting a signal corresponding to the user operation;
displaying a data icon on the screen;
judging a drag operation with respect to the data icon based on the signal;
judging, based on the signal, a user operation different from the drag operation for one of copying and moving data related to the data icon based on the drag operation; and
executing processing for one of copying and moving the data according to the user operation.

The present disclosure contains subject matter related to that disclosed in Japanese Priority Patent Application JP 2011-114174 filed in the Japan Patent Office on May 20, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
a display unit including a screen;
a sensor configured to detect at least one operation made by a user with respect to the screen and output a signal corresponding to the detected at least one operation; and
a controller configured to cause a data icon to be displayed on the screen, judge a drag operation with respect to the data icon based on the signal from the sensor, judge, based on the signal from the sensor, a different user operation that is different from the drag operation for copying data related to the data icon based on the drag operation, and execute processing for copying the data according to the different user operation,
wherein the controller causes, while causing the data icon to be displayed at an original drag position, a copy of the data icon to be displayed at a drag position according to the drag operation with respect to the data icon, judges the different user operation with respect to a position between the data icon and the copy of the data icon, and executes the processing of copying the data when the different user operation is made and
wherein the controller judges, as the different user operation, a flick operation with respect to the position between the data icon and the copy of the data icon and executes the processing of copying the data when the flick operation is made.

2. The electronic apparatus according to claim 1,
wherein the controller causes a closed curve surrounding the data icon and the copy of the data icon to be displayed according to the drag operation with respect to the data icon, judges whether the drag position is within an area on the screen where the data can be copied, and changes a display state of the closed curve when the drag position is within the area.

3. The electronic apparatus according to claim 2,
wherein the controller judges the flick operation with respect to the position between the data icon and the copy of the data icon in the closed curve in a state where the display state of the closed curve is changed, and executes processing of copying the data to a location on a computer corresponding to the area when the flick operation is made.

4. The electronic apparatus according to claim 3,
wherein the controller controls display such that, when the flick operation with respect to the position between the data icon and the copy of the data icon in the closed curve is made, the closed curve is separated into a first closed curve surrounding the data icon and a second closed curve surrounding the copy of the data icon.

5. The electronic apparatus according to claim 4,
wherein the controller controls display such that the first closed curve and the second closed curve contract according to a progress state of the data copy.

6. The electronic apparatus according to claim 2,
wherein the controller changes, when the drag position is within the area, the display state of the closed curve such that a crack is displayed in the closed curve at the position between the data icon and the copy of the data icon.

7. The electronic apparatus according to claim 1,
wherein the controller causes an access authority editing icon for editing an access authority with respect to data to be copied according to the drag operation with respect to the data icon, judges another user operation with respect to the access authority editing icon based on the signal from the sensor, the another user operation being different than the drag operation and the different user operation, and changes a state of the access authority with respect to the data to be copied according to the another user operation.

8. The electronic apparatus according to claim 7,
wherein the controller judges whether a drag position of the drag operation with respect to the data icon is within an area on the screen where the data can be copied and causes the access authority editing icon to be displayed on the screen when the drag position is within the area.

9. The electronic apparatus according to claim 1,
wherein the flick operation represents a cutting of a connection between the data icon and the copy of the data icon.

10. An electronic apparatus, comprising:
a display unit including a screen;
a sensor configured to detect at least one operation made by a user with respect to the screen and output a signal corresponding to the detected at least one operation; and
a controller configured to cause a data icon to be displayed on the screen, judge a drag operation with respect to the data icon based on the signal from the sensor, judge, based on the signal from the sensor, a different user operation that is different from the drag operation for moving data related to the data icon based on the drag operation, and execute processing for moving the data according to the different user operation,
wherein the controller causes, while causing the data icon to be displayed at an original drag position, a copy of the data icon to be displayed at a drag position according to the drag operation with respect to the data icon, judges the different user operation with respect to the data icon displayed at the original drag position, and executes the processing of moving the data when the different user operation is made, and
wherein the controller judges, as the different user operation, a flick operation with respect to the data icon displayed at the original drag position toward the copy of the data icon and executes the processing of moving the data when the flick operation is made.

11. The electronic apparatus according to claim 10,
wherein the controller causes a closed curve surrounding the data icon and the copy of the data icon to be displayed according to the drag operation with respect to the data icon, judges whether the drag position is within an area on the screen where the data can be moved, and changes a display state of the closed curve when the drag position is within the area.

12. The electronic apparatus according to claim 11,
wherein the controller judges the flick operation with respect to the data icon in a state where the display state of the closed curve is changed, and executes processing of moving the data to a location on a computer corresponding to the area when the flick operation is made.

13. The electronic apparatus according to claim 12,
wherein the controller controls display on the screen such that, when the flick operation with respect to the data icon is made, the closed curve contracts while the data icon is moved to a position of the copy of the data icon.

14. The electronic apparatus according to claim 13,
wherein the controller controls display such that the closed curve contracts while the data icon is moved according to a progress state of the data movement.

15. The electronic apparatus according to claim 10,
wherein the flick operation represents a flicking of the data icon towards the copy of the data icon.

16. A non-transitory computer-readable medium having embodied thereon a program, which when executed by a processor of an electronic apparatus causes the electronic apparatus to execute a method, the method comprising:
detecting at least one operation made by a user with respect to a screen of a display unit;
outputting a signal corresponding to the detected at least one operation;
displaying a data icon on the screen;
judging a drag operation with respect to the data icon based on the signal;
judging, based on the signal, a different user operation that is different from the drag operation for one of copying and moving data related to the data icon based on the drag operation; and
executing processing for one of copying and moving the data according to the different user operation,
wherein, while the data icon is displayed at an original drag position, a copy of the data icon is displayed at a drag position according to the drag operation with respect to the data icon, and
when a flick operation is judged with respect to a position between the data icon and the copy of the data icon, the processing of copying the data is executed when the flick operation is made, and
when the flick operation is judged with respect to the data icon displayed at the original drag position, the processing of moving the data is executed when the flick operation is made.

17. The non-transitory computer-readable medium according to claim 16,
wherein the flick operation that is judged with respect to the position between the data icon and the copy of the data icon represents a cutting of a connection between the data icon and the copy of the data icon, and the flick operation that is judged with respect to the data icon displayed at the original drag position represents a flicking of the data icon towards the copy of the data icon.

18. A control method, comprising:
detecting at least one operation made by a user with respect to a screen of a display unit;
outputting a signal corresponding to the detected at least one operation;
displaying a data icon on the screen;
judging a drag operation with respect to the data icon based on the signal;
judging, based on the signal, a different user operation that is different from the drag operation for one of copying and moving data related to the data icon based on the drag operation; and
executing processing for one of copying and moving the data according to the different user operation, wherein, while the data icon is displayed at an original drag position, a copy of the data icon is displayed at a drag position according to the drag operation with respect to the data icon, and when a flick operation is judged with respect to a position between the data icon and the copy of the data icon, the processing of copying the data is executed when the flick operation is made, and when the flick operation is judged with respect to the data icon displayed at the original drag position, the processing of moving the data is executed when the flick operation is made.

19. The control method according to claim 18, wherein the flick operation that is judged with respect to the position between the data icon and the copy of the data icon represents a cutting of a connection between the data icon and the copy of the data icon, and the flick operation that is judged with respect to the data icon displayed at the original drag position represents a flicking of the data icon towards the copy of the data icon.

* * * * *